(12) United States Patent
Yamagishi

(10) Patent No.: US 10,878,076 B2
(45) Date of Patent: Dec. 29, 2020

(54) RECEIVING APPARATUS, TRANSMITTING APPARATUS, AND DATA PROCESSING METHOD

(71) Applicant: Saturn Licensing LLC, New York, NY (US)

(72) Inventor: Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 22 days.

(21) Appl. No.: 15/740,061

(22) PCT Filed: Aug. 3, 2016

(86) PCT No.: PCT/JP2016/072748
§ 371 (c)(1),
(2) Date: Dec. 27, 2017

(87) PCT Pub. No.: WO2017/038353
PCT Pub. Date: Mar. 9, 2017

(65) Prior Publication Data
US 2018/0196935 A1 Jul. 12, 2018

(30) Foreign Application Priority Data
Aug. 28, 2015 (JP) ................... 2015-168521

(51) Int. Cl.
*G06F 21/44* (2013.01)
*H04N 21/434* (2011.01)
(Continued)

(52) U.S. Cl.
CPC ......... *G06F 21/44* (2013.01); *G06Q 30/0261* (2013.01); *H04N 21/23617* (2013.01);
(Continued)

(58) Field of Classification Search
None
See application file for complete search history.

(56) References Cited

U.S. PATENT DOCUMENTS

| 7,134,137 B2 | 11/2006 | Joshi et al. |
| 2012/0042050 A1* | 2/2012 | Chen ............... H04L 65/607 709/219 |

(Continued)

FOREIGN PATENT DOCUMENTS

| CN | 102298709 A | 12/2011 |
| CN | 102460496 A | 5/2012 |

(Continued)

OTHER PUBLICATIONS

International Search Report dated Nov. 1, 2016 in PCT/JP2016/072748, 2 pages.

(Continued)

*Primary Examiner* — Natisha D Cox
(74) *Attorney, Agent, or Firm* — Oblon, McClelland, Maier & Neustadt, L.L.P.

(57) ABSTRACT

There is provided an arrangement for executing an application on the condition that the application has been confirmed as authorized. A transmitting apparatus sends an application and signaling data in which authentication information capable of confirming the application as authorized is recorded. A receiving apparatus receives these data, performs an authentication process based on the authentication information to confirm the application as authorized, and executes the application that has been confirmed as authorized. The application is an application used in a process of selecting advertisement contents depending on user information. It is possible to provide the user reliably with a proper advertisement according to the user information.

18 Claims, 37 Drawing Sheets

(51) Int. Cl.
  *H04N 21/462* (2011.01)
  *H04N 21/6334* (2011.01)
  *H04N 21/236* (2011.01)
  *H04N 21/4627* (2011.01)
  *H04N 21/4722* (2011.01)
  *H04N 21/442* (2011.01)
  *G06Q 30/02* (2012.01)
  *H04L 29/06* (2006.01)

(52) U.S. Cl.
  CPC ..... *H04N 21/434* (2013.01); *H04N 21/44222* (2013.01); *H04N 21/462* (2013.01); *H04N 21/4627* (2013.01); *H04N 21/4722* (2013.01); *H04N 21/6334* (2013.01); *H04L 65/607* (2013.01)

(56) References Cited

U.S. PATENT DOCUMENTS

| | | | |
|---|---|---|---|
| 2012/0042089 A1 | 2/2012 | Chen et al. | |
| 2012/0042090 A1 | 2/2012 | Chen et al. | |
| 2014/0237529 A1* | 8/2014 | Kitahara | H04N 21/23617 725/109 |
| 2014/0344877 A1* | 11/2014 | Ohmata | H04H 60/14 725/110 |
| 2015/0113604 A1* | 4/2015 | Oyman | H04L 65/601 726/4 |
| 2015/0199498 A1 | 7/2015 | Liu et al. | |
| 2016/0055014 A1* | 2/2016 | Gallimore | G06F 9/44521 719/320 |
| 2016/0219346 A1* | 7/2016 | Kitazato | H04N 21/435 |
| 2016/0219347 A1* | 7/2016 | Kitahara | H04N 21/4627 |
| 2016/0337354 A1* | 11/2016 | Smadja | H04W 12/0609 |
| 2017/0034567 A1* | 2/2017 | Kitahara | H04N 21/23617 |
| 2017/0041663 A1 | 2/2017 | Kitazato | |

FOREIGN PATENT DOCUMENTS

| | | |
|---|---|---|
| CN | 102956010 A | 3/2013 |
| CN | 103814390 A | 5/2014 |
| CN | 103988210 A | 8/2014 |
| CN | 104361508 A | 2/2015 |
| JP | 2011-87103 A | 4/2011 |
| JP | 2013-98863 A | 5/2013 |
| JP | 2013-538507 A | 10/2013 |
| JP | 2014-57227 A | 3/2014 |
| JP | 2014-220703 A | 11/2014 |
| JP | 2015-517266 A | 6/2015 |
| WO | WO 99/66722 A1 | 12/1999 |
| WO | WO 2015/104742 A1 | 7/2015 |

OTHER PUBLICATIONS

Extended European Search Report dated Feb. 12, 2019 in corresponding European Patent Application No. 16841385.4, 9 pages.
English translation of the Combined Chinese Office Action and Search Report dated Jan. 2, 2020, in Patent Application No. 201680047696.0, 8 pages.

* cited by examiner

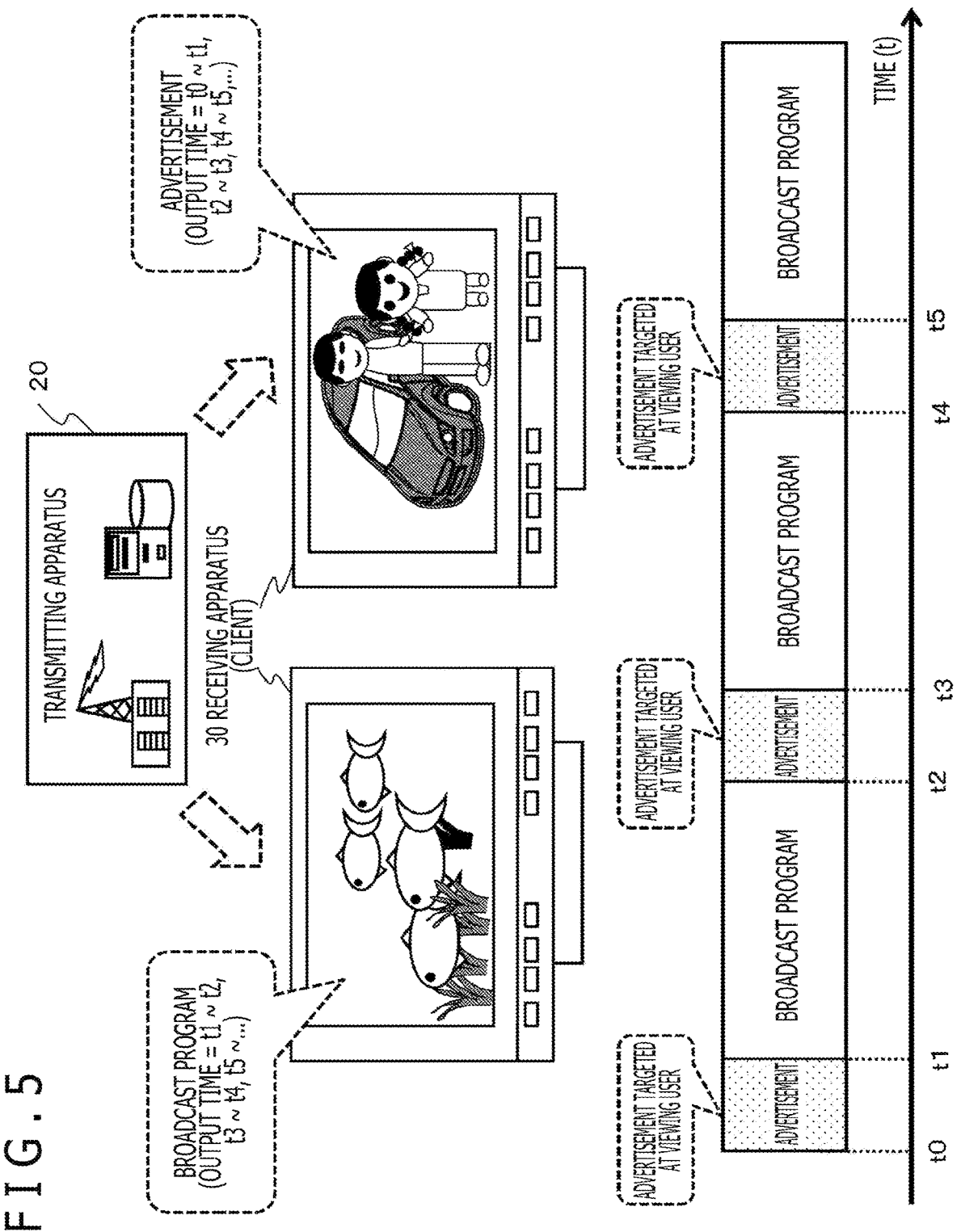

FIG. 6

(A) EXAMPLE OF AGE-SPECIFIC ADVERTISEMENT SETTING

| | |
|---|---|
| AGE (age) = 20 YEARS OR OLDER | ADVERTISEMENT OF ALCOHOLIC DRINKS (LIQUOR) |
| AGE (age) = 15 YEARS OR YOUNGER | ADVERTISEMENT OF TOYS |

(B) EXAMPLE OF DOMICILE-SPECIFIC ADVERTISEMENT SETTING

| | |
|---|---|
| LOCATION (Location) = ALASKA | ADVERTISEMENT OF HEATING APPLIANCES |
| LOCATION (Location) = HAWAII | ADVERTISEMENT OF AIR CONDITIONERS |

(C) EXAMPLE OF AGE- AND DOMICILE-SPECIFIC ADVERTISEMENT SETTING

| | | |
|---|---|---|
| AGE (age) = 18 YEARS OR OLDER | LOCATION (Location) = NEW YORK | ADVERTISEMENT OF RESTAURANTS IN NEW YORK |
| AGE (age) = 15 YEARS OR YOUNGER | LOCATION (Location) = CALIFORNIA | ADVERTISEMENT OF TOYSHOPS IN CALIFORNIA |

FIG. 19

```
<ServiceDescovery ...> ...
  <mhp:ApplicationDescovery ...> ...
    <mhp:ApplicationList ...> ...
      <mhp:Application ...> ...
        <mhp:applicationSpecificDescriptor ...> ...
        <mhp:otherDescriptor ...> ...
        <atsc:applicationAuthenticationInformation>
          <Signature>
            <SignedInfo>
              <CanonicalizationMethod Algorithm="http://www.w3.org/TR/2001/REC-xml-c14n-20010315#WithComments"/>
              <SignatureMethod Algorithm="http://www.w3.org/2000/09/xmldsig#dsa-sha1"/>
              <Reference URI="http://a.com/app.xml">      ← AUTHENTICATION TARGET APPLICATION
                                                            IDENTIFICATION INFORMATION (REFERENCE URI)
                <Transforms><Transform Algorithm="http://www.w3.org/TR/2001/REC-xml-c14n-20010315#WithComments"/></Transforms>
                <DigestMethod Algorithm="http://www.w3.org/2000/09/xmldsig#sha1"/>
                <DigestValue>60NvZvtdTB+7UniLp/H24p7h4bs=</DigestValue>      ← DIGEST VALUE
              </Reference>
            </SignedInfo>
            <SignatureValue>DpEyIhQoiUKBoKWmYfajXO7LZxiDYgVtUtCNyTgwZgoChzorA2nhkQ==</SignatureValue>      ← SIGNATURE VALUE
          </Signature>
        </atsc:applicationAuthenticationInformation> ...
        <mhp:otherDescriptor> ...
        <mhp:applicationSpecificDescriptor> ...
        <mhp:applicationLocation>http://a.com/app.xml</mhp:applicationLocation> ...
      </mhp:Application> ...
    </mhp:ApplicationList> ...
  </mhp:ApplicationDescovery> ...
</ServiceDescovery>
```

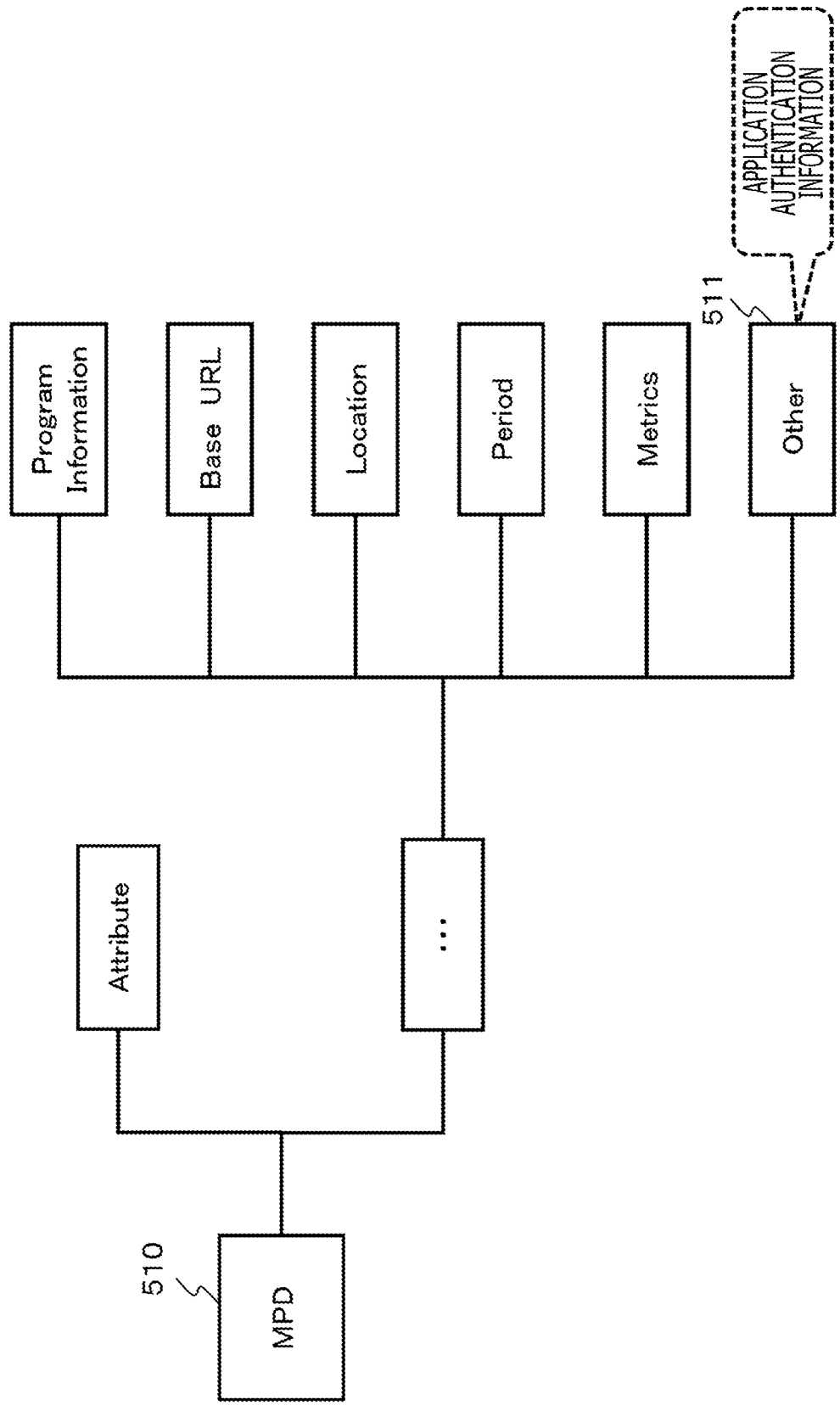

FIG. 29

```
<MPD ... id="12345"> ...
 <Period ... > ...
  <AdaptationSet> ...
  </AdaptationSet> ...
 </Period>
 <Period ... > ...
  <AdaptationSet> ...
  </AdaptationSet> ...
 </Period> ...
 <Signature>
  <SignedInfo>
   <CanonicalizationMethod Algorithm="http://www.w3.org/TR/2001/REC-xml-c14n-20010315#WithComments"/>
   <SignatureMethod Algorithm="http://www.w3.org/2000/09/xmldsig#dsa-sha1"/>
   <Reference URI="http://a.com/app.xml">
    <Transforms><Transform Algorithm="http://www.w3.org/TR/2001/REC-xml-c14n-20010315#WithComments"/></Transforms>
    <DigestMethod Algorithm="http://www.w3.org/2000/09/xmldsig#sha1"/>
    <DigestValue>60NvzvtdTB+7UniLp/H24p7h4bs=</DigestValue>
   </Reference>
   <Reference id="#12345" >
    <Transform Algorithm="http://www.w3.org/2000/09/xmldsig#enveloped-signature">
    <DigestMethod Algorithm="http://www.w3.org/2000/09/xmldsig#sha1"/>
    <DigestValue>60NvtvtdTB+7UniLp/H14p7h4bs=</DigestValue>
   </Reference>
  </SignedInfo>
  <SignatureValue>DpEyIhQoiUKBoKWmZfajXO7LZxiDYgVtUtCNyTgwZgoChzorA2nhkQ==</SignatureValue>
 </Signature>
</MPD >
```

- AUTHENTICATION TARGET APPLICATION IDENTIFICATION INFORMATION (REFERENCE URI)
- DIGEST VALUE
- MPD IDENTIFIER
- SIGNATURE VALUE

FIG. 31

```
<MPD ... > ...
<Period ... > ...
  <AdaptationSet> ...
  </AdaptationSet> ...
</Period> ...
<Period ... xlink:href='http://a.com/adp-1' id="45678"> ...
  <AdaptationSet> ...
  </AdaptationSet> ...
  <Signature>
    <SignedInfo>
      <CanonicalizationMethod Algorithm="http://www.w3.org/TR/2001/REC-xml-c14n-20010315#WithComments"/>
      <SignatureMethod Algorithm="http://www.w3.org/2000/09/xmldsig#dsa-sha1"/>
      <Reference URI="http://a.com/app.xml">    ← AUTHENTICATION TARGET APPLICATION IDENTIFICATION INFORMATION (REFERENCE URI)
        <Transforms><Transform Algorithm="http://www.w3.org/TR/2001/REC-xml-c14n-20010315#WithComments"/></Transforms>
        <DigestMethod Algorithm="http://www.w3.org/2000/09/xmldsig#sha1"/>
        <DigestValue>60NvZvtdTB+7UniLp/H24p7h4bs=</DigestValue>    ← DIGEST VALUE
      </Reference>
      <Reference id="#45678">    ← PERIOD IDENTIFIER
        <Transform Algorithm="http://www.w3.org/2000/09/xmldsig#enveloped-signature"/>
        <DigestMethod Algorithm="http://www.w3.org/2000/09/xmldsig#sha1"/>
        <DigestValue>60NvrvtdTB+7UniLp/H14p7h4bs=</DigestValue>
      </Reference>
    </SignedInfo>
    <SignatureValue>DpEyIhQoiUKBoKWmYfajXO7LZxiDYgVtUtCNyTgwZgoChzorA2nhkQ==</SignatureValue>    ← SIGNATURE VALUE
  </Signature>
</Period> ...
</MPD >
```

RECEIVING APPARATUS, TRANSMITTING APPARATUS, AND DATA PROCESSING METHOD

TECHNICAL FIELD

The present disclosure relates to a receiving apparatus, a transmitting apparatus, and a data processing method. More specifically, the present disclosure relates to a receiving apparatus, a transmitting apparatus, and a communication data-compatible data processing method for performing the reception and transmission of data via broadcasting waves and a network, for example.

BACKGROUND ART

OTT (Over The Top) is available as a data distribution service capable of distributing contents such as image data, sound data, etc. regardless of the form of services provided by communication providers. Contents distributed by OTT are referred to as OTT contents. Distribution services for image (video) data using OTT are called OTT video or OTT-V (Over The Top Video).

There are DASH (Dynamic Adaptive Streaming over HTTP) standards as data streaming distribution standards according to OTT-V. DASH refers to standards with respect to adaptive streaming distribution services using a streaming protocol based on HTTP (HyperText Transfer Protocol).

According to adaptive streaming, a contents distribution server such as a broadcasting station or the like generates manifest files that describe segmented files of moving-image contents at a plurality of bit rates and attribute information and URLs (Uniform Resource Locators) thereof and provides the generated manifest files to various clients, in order to allow the clients as data distribution destinations to reproduce the contents.

A client acquires the manifest file from the server, selects an optimum bit-rate content depending on the size of the display unit of its own device and an available communication band, and receives and reproduces the selected content. As bit rates can dynamically be changed depending on changing network bands, the client is able to switch between and receive optimum contents at any time according to circumstances, making it possible to reproduce a moving-image content with a reduced occurrence of video interruptions. Adaptive streaming is referred to in PTL 1 (JP 2011-87103A), for example.

Currently, efforts are making active progress in the development and standardization of systems for sending and receiving contents such as broadcast programs, etc. using unidirectional communication via broadcasting waves or using bidirectional communication and unidirectional communication via networks such as the Internet, etc. from transmitting apparatus such as broadcasting stations and other contents servers, etc. to receiving apparatus such as TV sets, PCs, and mobile terminals, etc.

Incidentally, PTL 2 (JP 2014-057227A), for example, is available as conventional art disclosing a technology for realizing data distribution via broadcasting waves and networks.

Standardization of ATSC (Advanced Television Systems Committee) 3.0 as standards about data distribution systems via broadcasting waves and networks is now in progress.

ATSC3.0 is addressed to a review of configurations in which broadcast distribution devices (receiving apparatus) that have implemented an ATSC3.0-conformable physical layer (ATSC-PHY) implement middleware for carrying out an ATSC3.0 broadcast receiving process, for thereby receiving signaling data including control information for ATSC broadcasts, etc. to make it possible to perform various control processes according to the signaling data.

Specifically, ATSC3.0 is reviewing configurations that make it possible to perform a process of outputting broadcast contents and a data processing process using various applications provided by broadcasting waves, etc., directly using application programs used on the Internet, etc., i.e., so-called client applications, under control based on signaling data.

For example, ATSC3.0-conformable physical layer (ATSC-PHY) and ATSC3.0 broadcast receiving middleware are implemented in servers (dedicated servers, PCs, TV sets, tablets, smartphones, etc.) installed at home and hot spots for receiving broadcasting services.

After these servers have received ATSC3.0 broadcast services, they transfer received broadcast data to user devices (PCs, TV sets, tablets, smartphones, etc.) via networks (home networks, LAN/WiFi at hot spots, etc.).

When the received broadcast data transferred via the servers are input to the user devices, the user devices can reproduce broadcast contents and execute various applications distributed through broadcasts, using applications (e.g., ATSC3.0 DASH client applications) run on reproduction control units and application control units of the user devices.

Furthermore, 3GPP (Third Generation Partnership Project) which is an international standard specification formulating organization and DASH-IF which is a standardization organization for MPEG-DASH standards that are standards for the adaptive streaming technology are proceeding with efforts to standardize configurations for distributing and reproducing advertisement contents.

Specifically, for example, they are making efforts to standardize configurations for dynamically changing advertisements that are output to receiving apparatus depending on viewing users at the receiving apparatus.

However, no specific details have been available at present as to how such configurations should be realized.

CITATION LIST

Patent Literature

[PTL 1]
JP 2011-87103A
[PTL 2]
JP 2014-057227A

SUMMARY

Technical Problem

The present disclosure has been made in view of the above problems. It is an object of the present disclosure to provide a receiving apparatus, a transmitting apparatus, and a data processing method which confirm the validity of an application to be executed on a receiving apparatus that receives and reproduces a broadcast program or the like and then execute the application, thereby preventing unauthorized data from being reproduced by the processing of an unauthorized application, for example.

It is an object of an embodiment of the present disclosure to provide a receiving apparatus, a transmitting apparatus, and a data processing method which confirm the validity of an application used to selectively output contents targeted on the user, such as an advertisement targeted on the user or the like, and then execute the application, thereby reliably outputting contents targeted on the user, such as an advertisement targeted on the user or the like.

Solution to Problem

According to a first aspect of the present disclosure, there is provided a receiving apparatus including:

a communication unit that receives an application and signaling data in which authentication information for the application is recorded; and a data processor that executes the application;

in which the data processor has an application verifying unit that performs an authentication process based on the authentication information and confirms the application as authorized, and an application executing unit that executes the application that has been confirmed as authorized by the authentication process.

Furthermore, according to a second aspect of the present disclosure, there is provided a transmitting apparatus including a communication unit that sends an application and signaling data in which authentication information capable of confirming the application as authorized is recorded.

Furthermore, according to a third aspect of the present disclosure, there is provided a data processing method to be carried out in a receiving apparatus, in which a communication unit receives an application and signaling data in which authentication information for the application is recorded; and a data processor performs an application verifying process for carrying out an authentication process based on the authentication information to confirm the application as authorized, and executes the application that has been confirmed as authorized by the authentication process.

Furthermore, according to a fourth aspect of the present disclosure, there is provided a data processing method to be carried out in a transmitting apparatus, including sending an application and signaling data in which authentication information capable of confirming the application as authorized is recorded.

Other objects, features, and advantageous effects of the present disclosure will become apparent from a more detailed description based on embodiments of the present disclosure to be described later and accompanying drawings. In the present specification, the term "system" means a logical collection of a plurality of apparatus, and is not limited to the arrangement in which the apparatus are present in the same housing.

Advantageous Effects of Invention

According to an embodiment of the present disclosure, there is realized an arrangement for executing an application on the condition that the application has been confirmed as authorized.

Specifically, a transmitting apparatus sends an application and signaling data in which authentication information capable of confirming the application as authorized is recorded. A receiving apparatus receives these data, performs an authentication process based on the authentication information to confirm the application as authorized, and executes the application that has been confirmed as authorized. The application is an application used in a process of selecting advertisement contents depending on user information. It is possible to provide the user reliably with a proper advertisement according to the user information.

With this arrangement, the receiving apparatus realizes a configuration for executing an application on the condition that the application has been confirmed as authorized.

For example, there is realized a configuration for selecting and outputting contents such as of an advertisement depending on the user of the receiving apparatus without fail, by confirming an application that carries out an advertisement selecting process, as authorized.

Note that the advantageous effects described in the present specification are not restrictive, but illustrative only, and there may be additional advantageous effects.

BRIEF DESCRIPTION OF DRAWINGS

FIG. 5 is a diagram illustrative of an example of data output in the receiving apparatus (client) 30.

FIG. 6 is a diagram illustrative of an example of selected output advertisements using various items of user information.

FIG. 19 is a diagram illustrative of an example of data of the authentication information recorded in the application information table (AIT).

FIG. 28 is a diagram illustrative of the position where the authentication information is recorded in the MPD.

FIG. 29 is a diagram illustrative of an example of data of the authentication information recorded in the MPD.

FIG. 31 is a diagram illustrative of an example of data of the authentication information recorded in the MPD.

DESCRIPTION OF EMBODIMENTS

Details of a receiving apparatus, a transmitting apparatus, and a data processing method according to the present disclosure will be described below with reference to the drawings. The description will be given in the following order:

1. About a configurational example of a communication system;
2. About data communication protocols FLUTE and ROUTE;
3. About an example of a communication processing operation carried out by a transmitting apparatus and a receiving apparatus;
4. About an example of data output in the receiving apparatus;
5. About a configurational example and a processing example of the receiving apparatus;
6. About signaling data per period (Period) using an MPD;
7. About a specific configurational example for performing a process of providing an advertisement depending on user information;
8. About a process of outputting an unauthorized advertisement by an unauthorized application;
9. (Embodiment 1) About a configuration for performing an application authentication process to which application authentication information recorded in an application information table (AIT) is applied;
9-1. About a way in which the authentication information is recorded in the application information table (AIT);
9-2. About a configuration and sequence for performing an application authentication process to which the application information table (AIT) is applied;
10. (Embodiment 2) About a configuration for performing an application authentication process to which application authentication information recorded in an MPD (Media Presentation Description) is applied;
10-1. About a way in which authentication information is recorded in the MPD;
10-2. About a configuration and sequence for performing an application authentication process to which the MPD is applied;
11. About a configurational example of the transmitting apparatus and the receiving apparatus; and
12. A summary of the arrangement of the present disclosure.

1. About a Configurational Example of a Communication System

A configurational example of a communication system for carrying out a processing operation of the present disclosure will first be described below with reference to FIG. 1.

Figure 1:
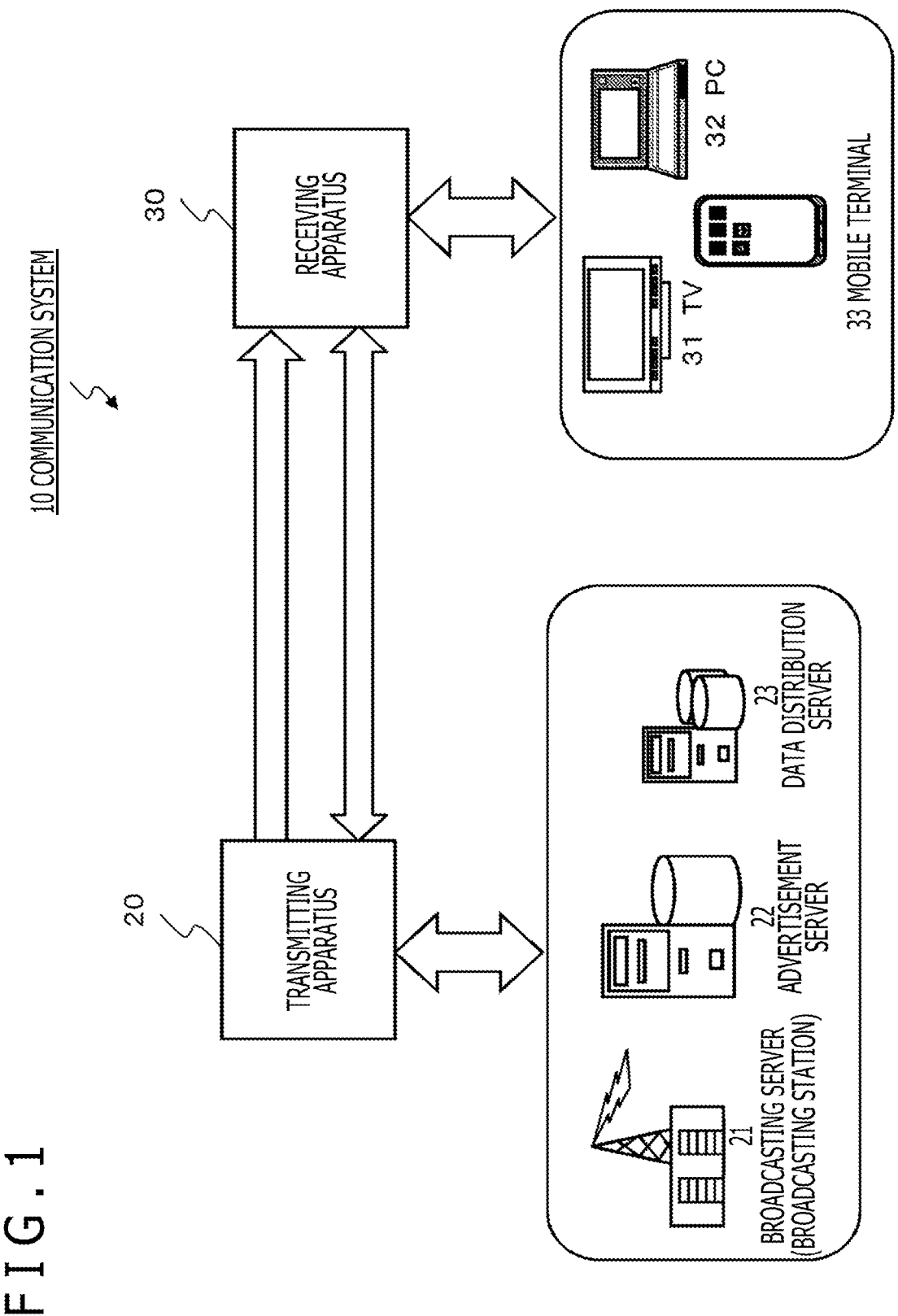
FIG. 1 is a diagram illustrative of a configurational example of a communication system that carries out a processing operation of the present disclosure.

As depicted in FIG. 1, a communication system 10 has a transmitting apparatus 20 which is a communication apparatus for sending contents such image data, sound data, etc. and a receiving apparatus 30 which is a communication apparatus for receiving contents sent by the transmitting apparatus 20.

Specifically, the transmitting apparatus 20 is an apparatus for providing various contents (broadcast programs, advertisements, and other data), such as a broadcasting server (broadcasting station) 21 for primarily sending TV programs or the like, an advertisement server 22 for primary sending advertisement data, a data distribution server 23 for sending various data, or the like, for example.

The receiving apparatus 30 is a client apparatus of a user, and specifically includes a TV set 31, a PC 32, a mobile terminal 33, or the like, for example.

Incidentally, in FIG. 1, the broadcasting server (broadcasting station) 21, the advertisement server 22, and the data distribution server 23 are separately illustrated as examples of the transmitting apparatus 20. However, one server may be arranged to send all of broadcast programs, advertisements, and other data.

Data communication between the transmitting apparatus 20 and the receiving apparatus 30 may be performed as at least either one of bidirectional communication, unidirectional communication via a network such as the Internet, and unidirectional communication using broadcasting waves or the like, or as communication using both of them.

The transmitting apparatus 20 sends contents to the receiving apparatus 30 according to MPEG-DASH standards that are standards for an adaptive streaming technology, for example.

The MPEG-DASH standards include the following two standards:

(a) standards with respect to manifest files (MPD: Media Presentation Description) for describing meta data that represent management information for moving images and sound files; and (b) standards with respect to a file format (segment format) for the transmission of moving image contents.

The transmitting apparatus 20 distributes contents to the receiving apparatus 30 according to the above MPEG-DASH standards.

The transmitting apparatus 20 encodes contents data to generate a data file including encoded data and meta data of the encoded data. The encoding process is carried out according to an MP4 file format prescribed by MPEG, for example. In case the transmitting apparatus 20 generates a data file according to the MP4 format, a file of encoded data is called "mdat" and meta data are called "moon," "moof," or the like.

Contents that are provided from the transmitting apparatus 20 to the receiving apparatus 30 represent various data such as music data, video data such as of movies, TV programs, video, photos, documents, pictures, diagrams, etc., games, and software, for example.

Transmission data of the transmitting apparatus 20 will be described below with reference to FIG. 2.

The transmitting apparatus 20 that performs data transmission according to the MPEG-DASH standards transmits a plurality of kinds of data that are roughly classified as follows:

(a) signaling data 50;

(b) AV segments 60; and (c) other data (ESG, NRT contents, etc.) 70.

The AV segments 60 include image (Video) and sound (Audio) data to be reproduced on the receiving apparatus, namely program contents provided by a broadcasting station, for example. For example, these data include MP4-encoded data (mdat) and meta data (moov, moof) described above. The AV segments are also called DASH segments.

On the other hand, the signaling data 50 include program schedule information such as a program guide, etc., address information (URL (Uniform Resource Locator), etc.) required to acquire programs, information required by a process of reproducing contents, e.g., guide information including codec information (encoding process, etc.), and various control information such as application control information, etc.

The receiving apparatus 30 needs to receive the signaling data 50 before it receives AV segments 60 that store program contents to be reproduced.

The signaling data 50 are sent from the transmitting apparatus 20 as data in the XML (Extensible Markup Language) format, for example.

The signaling data are repeatedly sent from time to time. For example, the signaling data are repeatedly sent frequently at intervals of 100 milliseconds, for example.

This is to allow the receiving apparatus (client) to be able to acquire signaling data immediately at any time.

The client (receiving apparatus) is able to perform, without delay, processes required to receive and reproduce program contents, such as a process of acquiring an address for accessing necessary program contents and a codec setting process, etc., on the basis of signaling data that can be received as needed.

The other data 70 include ESG (Electronic Service Guide), NRT contents, etc., for example.

The ESG, which stands for electronic service guide (Electronic Service Guide), represents guide information such as a program guide, etc., for example.

The NRT contents are non-real-time contents.

The NRT contents include various application files to be executed on the browser of the receiving apparatus 30 as the client, data files of moving images, still images, etc., and the like.

Figure 2:
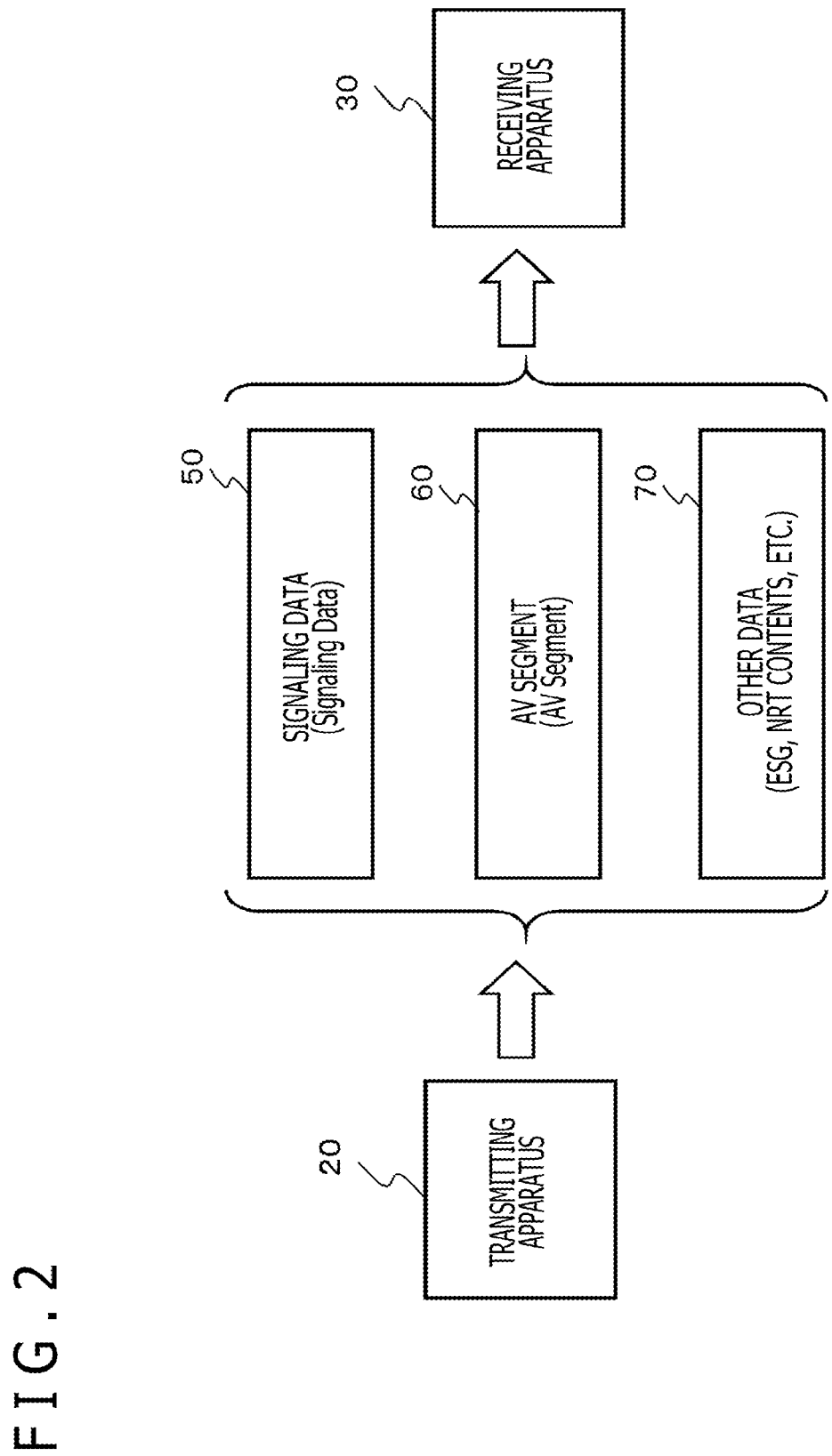
FIG. 2 is a diagram illustrative of transmission data of a transmitting apparatus.

The following data depicted in FIG. 2, i.e., (a) signaling data 50, (b) AV segments 60, and (c) other data (ESG, NRT contents, etc.) 70, are sent according to a data communication protocol: FLUTE (File Delivery over Unidirectional Transport), for example.

2. About Data Communication Protocols FLUTE and ROUTE

The data communication protocol: FLUTE (File Delivery over Unidirectional Transport) is a protocol for performing session management of contents to be transmitted by multicast.

For example, a file (identified by a URL and a version) generated by the server as the transmitting apparatus is sent to the client as the receiving apparatus according to the FLUTE protocol.

The receiving apparatus (client) 30 stores the URL and version of the received file in association with the file in a storage unit (client cache), for example.

A file that has the same URL but is of a different version is regarded as having its contents updated. The FLUTE protocol performs unidirectional file transfer control only, and has no selective filtering function for files in the client. However, the client chooses and refuses files transferred under the control of FLUTE using meta data linked to the files, thereby realizing selective filtering to make it possible to configure and update a local cache in a manner to reflect the user's taste.

Note that the meta data can be extended and incorporated into the FLUTE protocol, and can be described separately according to a protocol such as ESG (Electronic Service Guide) or the like.

FLUTE was originally specified as a file transfer protocol for multicast. FLUTE is configured as a combination of FDT and a multicast protocol for scalable file objects called ALC, or specifically, LCTs and FEC components as its building blocks.

FLUTE in the past was developed mainly for asynchronous file transfer. At present, ATSC (Advanced Television System Committee), which is a standardization organization for data distribution systems for distributing data via broadcasting waves and networks, is making efforts to extend FLUTE to make it adaptable to broadcast live streaming. The extended specifications of FLUTE are referred to as ROUTE (Real-Time Object Delivery over Unidirectional Transport).

Efforts have been currently made to standardize ATSC (Advanced Television Systems Committee) 3.0 as one of the standards for data distribution systems for distributing data via broadcasting waves and networks. ATSC3.0 replaces the conventional FLUTE protocol with ROUTE, and prescribes a stack configuration employed for sending signaling data, ESGs, or asynchronous files, synchronous streams, etc.

3. About an Example of a Communication Processing Operation Carried Out by the Transmitting Apparatus and the Receiving Apparatus An example of a communication processing operation carried out by the transmitting apparatus and the receiving apparatus will be described below.

Figure 3:
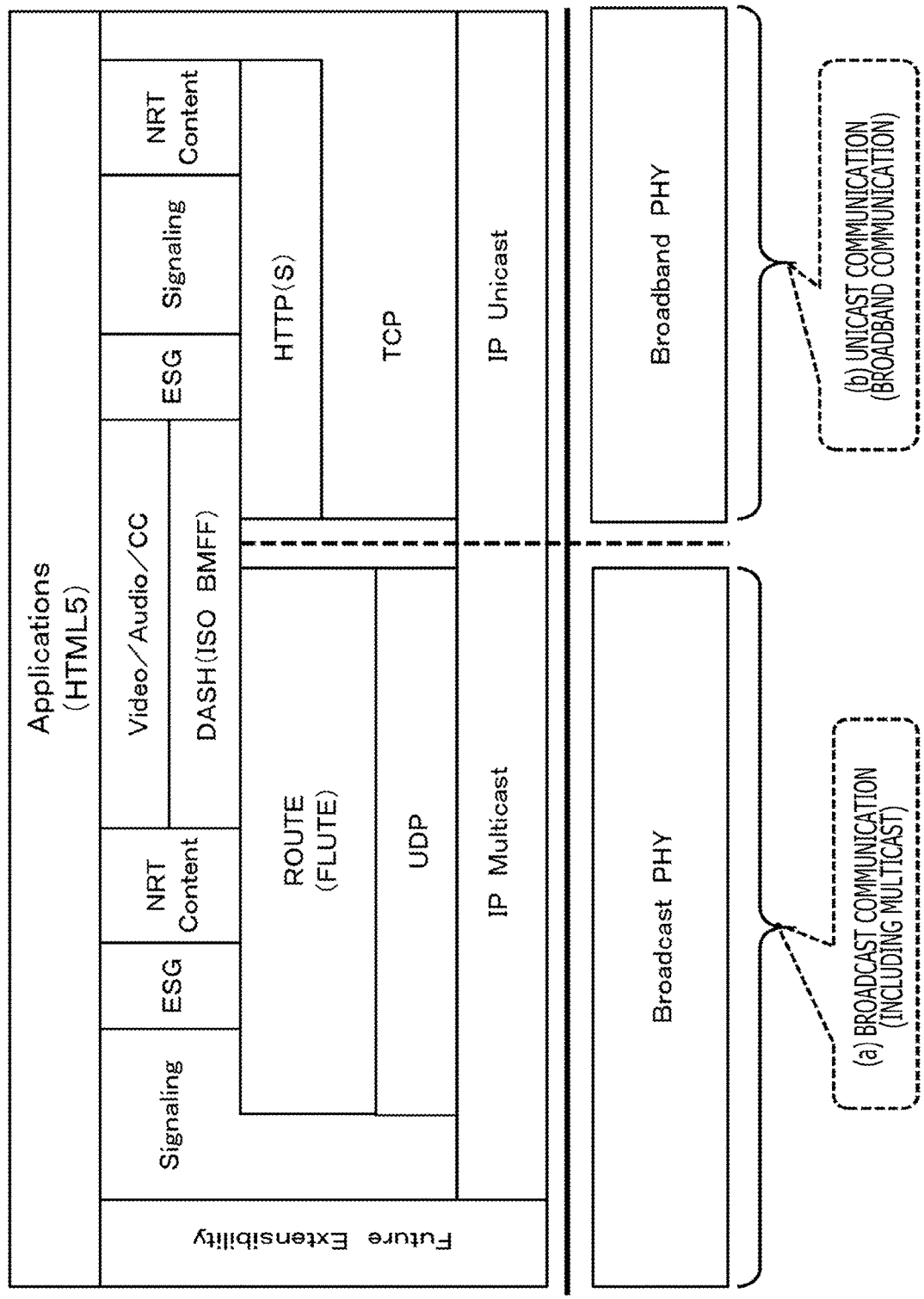
FIG. 3 is a diagram depicting an example of protocol stacks of the transmitting apparatus and a receiving apparatus.

FIG. 3 is a diagram depicting an example of a protocol stacks of the transmitting apparatus and the receiving apparatus.

The example depicted in FIG. 3 has two protocol stacks for processing two communication data indicated below:

(a) Broadcast (including multicast) communication (e.g., broadcasting-type data distribution); and (b) Unicast (broadband) communication (e.g., HTTP-type P2P communication).

Depicted in a left section of FIG. 3 is a protocol stack corresponding to (a) the broadcast communication (e.g., broadcasting-type data distribution).

Depicted in a right section of FIG. 3 is a protocol stack corresponding to (b) the unicast (broadband) communication (e.g., HTTP-type P2P communication).

The protocol stack corresponding to (a) the broadcast communication (e.g., broadcasting-type data distribution) depicted in the left section of FIG. 3 has the following layers arranged successively upwardly from the low-level layer:

(1) broadcast physical layer (Broadcast PHY);
(2) IP multicast layer (IP Multicast);
(3) UDP layer;
(4) ROUTE (=extended FLUTE) layer;
(5) ESG, NRTcontent, DASH (ISO BMFF), and Video/Audio/CC; and
(6) application layer (Applications (HTML5)).

Note that a signaling (Signaling) layer is established as an upper-level layer over (2) the IP multicast layer (IP Multicast).

The signaling layer is a layer applied to the transmission and reception of the signaling data 50 described above with reference to FIG. 2. The signaling data include program schedule information such as a program guide, etc., address information (URL, etc.) required to acquire programs, information required by a process of reproducing contents, e.g., guide information including codec information (encoding process, etc.), and control information.

The signaling data are data including access information for AV segments to be received and reproduced by the receiving apparatus (client), and guide information and control information required for processes such as a decoding process required after AV segments are received, and are data repeatedly sent from time to time from the transmitting apparatus.

The signaling data are available in various kinds depending on information. Specifically, for example, the signaling data include a USD (user service description (User Service Description)) which is signaling data per service.

The USD includes various kinds of control information. Representative control information is an MPD (media presentation description (Media Presentation Description)) which is signaling data having manifest files that store therein various guide information and control information corresponding to contents (AV segments).

The various signaling data are data required by the receiving apparatus (client) for processes of receiving, reproducing, and controlling AV segments and applications (application programs) sent from the transmitting apparatus, and are set as individual files (meta files) in different categories, for example, and sent from the transmitting apparatus.

Incidentally, a layer that can be used by a new protocol in the future (Future Extensibility) is set as an upper-level layer over (1) the broadcast physical layer (Broadcast PHY).

(1) The broadcast physical layer (Broadcast PHY) is a physical layer including a communication control unit for controlling a broadcasting communication unit, for example, that carries out broadcasting communication.

(2) The IP multicast layer (IP Multicast) is a layer for carrying out a data transmission and reception process according to IP multicast.

(3) The UDP layer is a layer for generating and analyzing UDP packets.

(4) The ROUTE layer is a layer for storing and taking out transfer data according to the ROUTE protocol that is the extended FLUTE protocol.

As with FLUTE, ROUTE represents a multicast protocol for scalable file objects called ALC, and specifically includes LCTs and FEC components as its building blocks.

Figure 4:
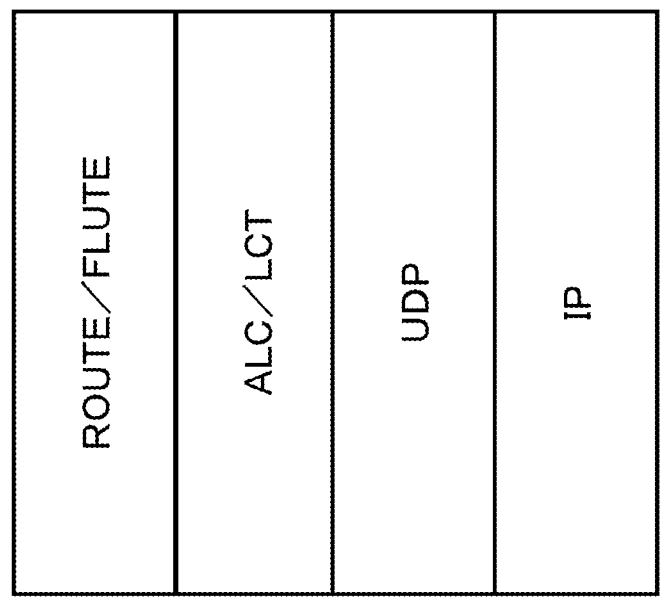
FIG. 4 is a diagram depicting a protocol stack with respect to ROUTE and FLUTE.

FIG. 4 depicts a protocol stack with respect to ROUTE and FLUTE.

(5) The ESG, NRTcontent, DASH (ISO BMFF), and Video/Audio/CC are data transferred according to the ROUTE protocol.

A simultaneous distribution service according to the DASH standards is called MBMS (Multimedia Broadcast Multicast Service). eMBMS (evolved Multimedia Broadcast Multicast Service) is available as a scheme for efficiently realizing MBMS with LTE.

MBMS and eMBMS are simultaneous distribution services, which simultaneously distribute identical data, e.g., movie contents, to a plurality of user terminals (UE) positioned as receiving apparatus in a certain area, with a common bearer. The simultaneous distribution according to MBMS and eMBMS makes it possible to simultaneously provide the same contents to receiving apparatus such as a number of smartphones, PCs, or television sets, etc. that are positioned in a distribution service providing area.

MBMS and eMBMS prescribe a process of downloading files according to a 3GPP file format (ISO-BMFF files, MP4 files) according to the transfer protocol ROUTE or FLUTE.

Many of the following data described above with reference to FIG. 2, i.e., (a) signaling data 50,
(b) AV segments 60, and
(c) other data (ESG, NRT contents, etc.) 70, are sent according to the ROUTE protocol or the FLUTE protocol.

(5) The ESG, NRTcontent, DASH (ISO BMFF), and Video/Audio/CC are data transferred according to the ROUTE protocol.

The ESG represents an electronic service guide (Electronic Service Guide), and is guide information such as a program guide or the like, for example.

The NRTcontent represents non-real-time contents.

As described above, the NRT contents include various application files to be executed on the browser of the receiving apparatus as the client, data files of moving images, still images, etc., and the like.

The Video/Audio/CC represents actual data to be reproduced, such as video and audio data, etc. distributed according to the DASH standards.

(6) The application layer (Applications (HTML5)) is an application layer for generating or analyzing data transferred according to the ROUTE protocol, and performing output control of various data, etc., and performs processes of generating, analyzing, outputting, etc. data to which HTML5 is applied, for example.

The protocol stack corresponding to (b) the unicast (broadband) communication (e.g., HTTP-type P2P communication) depicted in the right section of FIG. 3 has the following layers arranged successively upwardly from the low-level layer:

(1) broadband physical layer (Broaband PHY);
(2) IP unicast layer (IP Unicast);
(3) TCP layer;
(4) HTTP layer;
(5) ESG, Signaling, NRTcontent, DASH (ISO BMFF), and Video/Audio/CC; and
(6) application layer (Applications (HTML5)).

(1) The broadband physical layer (Broaband PHY) is a physical layer including a communication control unit such as a device driver or the like for controlling a communication unit such as a network card or the like, for example, that carries out broadband communication.

(2) The IP unicast layer (IP Unicast) is a layer for carrying out an IP unicast transmission and reception process.

(3) The HTTP layer is a layer for generating and analyzing HTTP packets.

Upper-level layers are similar to those of the stack configuration of (a) the broadcasting communication (e.g., broadcasting-type data distribution) depicted in the left section of FIG. 3.

Note that the transmitting apparatus (server) 20 and the receiving apparatus (client) 30 perform processes according to at least either of the two communication protocol stacks of the two processing systems depicted in FIG. 3 for:

(a) broadcast communication (e.g., broadcasting-type data distribution); and
(b) unicast (broadband) communication (e.g., HTTP-type P2P communication).

In the protocol stack depicted in FIG. 3, attributes (including URLs that are the identifiers of files) of a file group multicast-transferred according to ROUTE (FLUTE) can be described in a control file of ROUTE (FLUTE) or can be described in signaling (Signaling) data that describe a file transfer session. Further detailed attributes of a file transfer session can be described by ESG (applicable to an application for presenting to an end user).

As described above, efforts have been made to standardize ATSC (Advanced Television Systems Committee) 3.0 as one of the standards for data distribution systems for distributing data via broadcasting waves and networks.

In the standardization of a IP-base transport stack according to ATSC3.0, there has been proposed a method of transferring a file based on the file format (ISO-BMFF file, MP4 file) of MPEG-DASH according to the ROUTE (Real-Time Object Delivery over Unidirectional Transport) protocol extended from FLUTE (File Delivery over Unidirectional Transport), and the proposed method has been established as a standard candidate scheme.

By applying the ROUTE protocol, it is possible to transfer a fragmented MP4 (fragmented MP4) file sequence according to the DASH standards, an MPD (Media Presentation Description) that is a control information (signaling data) storage file according to the DASH standards, and USBD/USD, S-TSID (Service based Transport Session Description) representing signaling data for a broadcast distribution, etc.

As described above, the ROUTE protocol is a protocol based on FLUTE. A meta data file that describes transfer control parameters in FLUTE is called an FDT (File Delivery Table), and a meta data file that describes transfer control parameters in ROUTE is called an S-TSID (Service based Transport Session Description). The S-TSID is a superset of FDTs, and includes FDTs.

USBD/USD, S-TSID, MPD, etc. proposed as signaling data for an ATSC3.0 service layer (SLS: Service Layer Signaling) are all transferred in a ROUTE session.

4. About an Example of Data Output in the Receiving Apparatus

Next, an example of data output in the receiving apparatus (client) 30 that receives data from the transmitting apparatus 20 such as the broadcasting server 21, the advertisement server 22, etc. and outputs the received data will be described below.

FIG. 5 is a diagram illustrative of an example of data output in the receiving apparatus (client) 30.

To the receiving apparatus 30, there are alternately output movies, news, other broadcast programs (main contents), and advertisements, for example, according to a timeline (time axis (t)) depicted in a lower section of FIG. 5.

Providing the program start time of a channel selected by the user is t0, broadcast programs and advertisements are alternately output over time as follows:

time period t0~t1: an advertisement
time period t1~t2: a broadcast program
time period t2~t3: an advertisement
time period t3~t4: a broadcast program
time period t4~t5: an advertisement
time period 5~: a broadcast program The advertisements output to the receiving apparatus 30 are advertisements selected from many advertisement contents by the viewing user of the receiving apparatus 30.

Based on user (viewer) information set in the receiving apparatus 30, advertisements optimum for the user are selected and output.

The user information represents various pieces of information, such as user's (viewer's) age, gender, address, hobby and taste, etc., for example.

These pieces of user information have been registered in advance in the storage unit of the receiving apparatus.

Alternatively, the user (viewer) may be prompted to enter user information at the program starting time, and the entered user information may be used.

The user information may be set and used in various ways. For example, it is possible to set and use user information with respect to each program, each channel, all channels.

The user information is stored in the storage unit of the receiving apparatus and used when necessary.

Specific configurations of advertisements using user information will be described later.

Examples of output advertisements selected using various pieces of user information will be described below with reference to FIG. 6.

FIG. 6 depicts specific examples of the following three kinds:

(A) an example of age-specific advertisement setting;
(B) an example of domicile-specific advertisement setting; and
(C) an example of age- and domicile-specific advertisement setting.

(A) The example of age-specific advertisement setting includes the following examples:

The age (age) of the user (viewer)=20 years or older→ an advertisement of alcoholic drinks (liquor) is selected and output.

The age (age) of the user (viewer)=15 years or younger→ an advertisement of toys is selected and output.

In this example, the age of the user is registered as user information in the receiving apparatus 30, and based on the registered user information (viewer's age), the receiving apparatus 30 that is used by the user is caused to output an advertisement depending on the user's age.

(B) The example of domicile-specific advertisement setting includes the following examples:

The address (Location) of the user (viewer)=Alaska→ an advertisement of heating appliances is selected and output.

The address (Location) of the user (viewer)=Hawaii→ an advertisement of air conditioners is selected and output.

In this example, the address of the user is registered as user information in the receiving apparatus 30, and based on the registered user information (viewer's address), the receiving apparatus 30 that is used by the user is caused to output an advertisement depending on the user's address.

(C) The example of age- and domicile-specific advertisement setting includes the following examples:

The age (age) of the user (viewer)=18 years or older, and the address (Location) of the user (viewer)=New York.

If these two conditions are satisfied, the receiving apparatus selects and outputs an advertisement of restaurants in New York.

The age (age) of the user (viewer)=15 years or younger, and the address (Location) of the user (viewer)=California.

If these two conditions are satisfied, the receiving apparatus selects and outputs an advertisement of toyshops in California.

In this example, the age and address of the user is registered as user information in the receiving apparatus 30, and based on the registered user information (viewer's age and address), the receiving apparatus 30 that is used by the user is caused to output an advertisement depending on the user's age and address.

According to the processing operation of the present disclosure, there is realized a configuration that selects and outputs an advertisement that is judged as optimum for the user (viewer), i.e., as having a large advertisement effect, depending on various user information set in the receiving apparatus 30.

A specific processing operation will be described later.

5. About a Configurational Example and a Processing Example of the Receiving Apparatus Next, a configurational example and a processing example of the receiving apparatus 30 will be described below with reference to FIG. 7 and following figures.

Note that, as described above with reference to FIG. 1, the receiving apparatus 30 includes a TV set 31, a PC 32, a mobile terminal 33, or any of other devices, e.g., a smartphone, a tablet terminal, smartwatch, a wearable device, etc.

Figure 7:
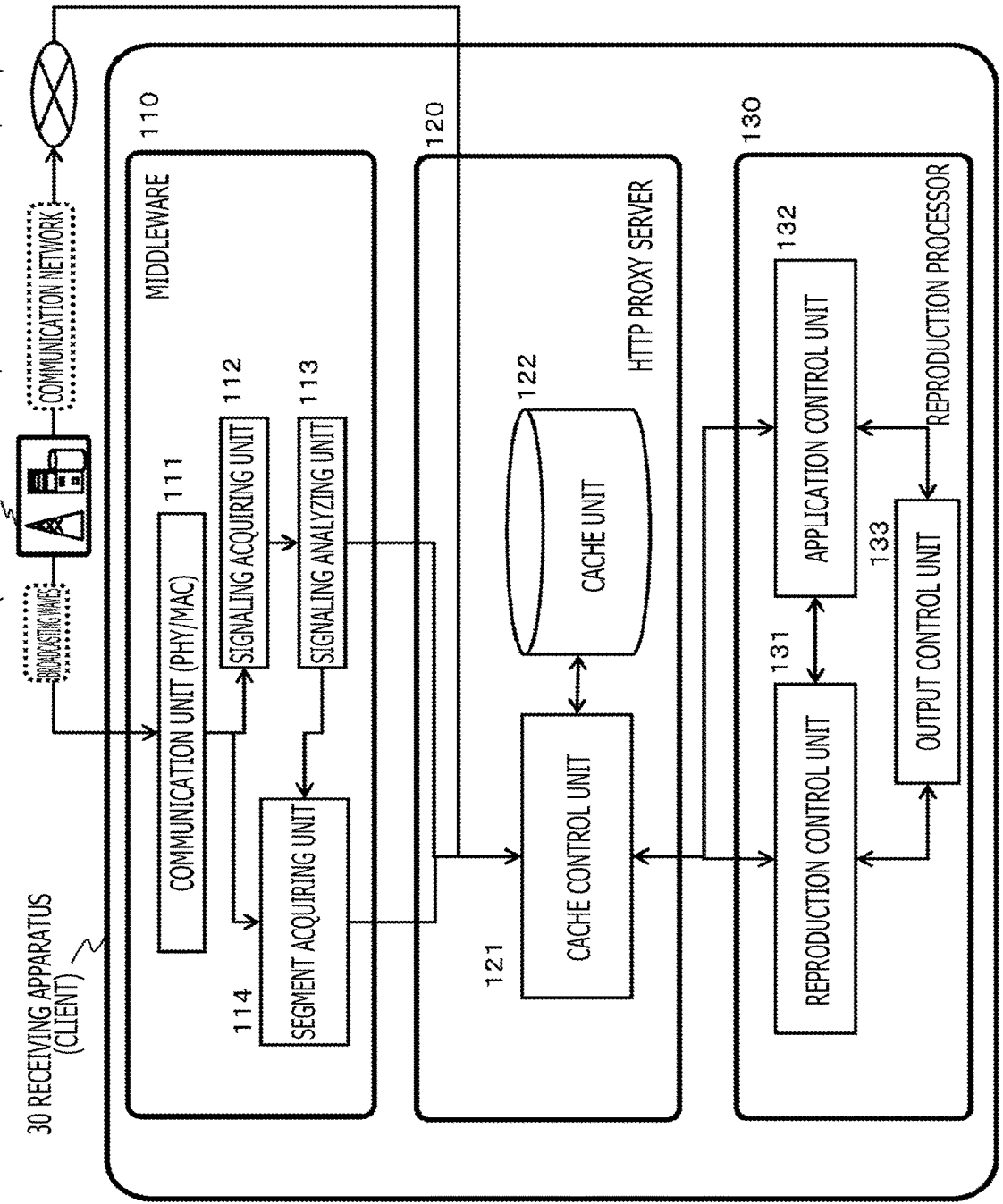
FIG. 7 is a diagram illustrative of a configurational example of the receiving apparatus.

The receiving apparatus 30 depicted in FIG. 7 has middleware 110 for receiving transmission data from the transmitting apparatus 20 such as a broadcasting server, an advertisement server, etc., a proxy server 120 for analyzing received data and performing a cache process, and a reproduction processor 130 for reproducing programs and performing a data reproducing process by carrying out applications.

The transmitting apparatus 20 such as a broadcasting server, an advertisement server, etc. sends AV segments including broadcast contents, etc., applications, signaling data, and other data by way of data communication via broadcasting waves and a communication network such as the Internet.

The middleware 110 of the receiving apparatus 30 depicted in FIG. 7 receives and analyzes the data provided via broadcasting waves from the transmitting apparatus 20.

The middleware 110 has a communication unit (PHY/MAC) 111, a signaling acquiring unit 112 for acquiring signaling data, a signaling analyzing unit 113 for analyzing signaling data, and a segment acquiring unit 114 for acquiring signaling data, program contents data such as video, sound, etc., and data files of NRT contents, etc. such as applications, etc.

The data received by the middleware 110 are stored in a cache unit (proxy cache) 122 through a cache control unit 121 of the proxy server 120. The proxy server 120 also stores data acquired from the transmitting apparatus 20 via the network in the cache unit 122.

The cache control unit 121 of the proxy server 120 receives data acquisition requests from a reproduction control unit ((Embedded) Media Player) 131 and an application control unit 132 of the reproduction processor 130, and provides requested data to the reproduction processor.

For example, the cache control unit 121 performs an address resolving process, etc. in response to data acquisition requests from the reproduction control unit ((Embedded) Media Player) 131 and the application control unit 132, acquires data depending on the address from the cache unit 122, and outputs the acquired data to the reproduction control unit ((Embedded) Media Player) 131 and the application control unit 132 of the reproduction processor 130. If there are no requested data in the cache unit 122, the cache control unit 121 may acquire data from an external source and provide them.

The reproduction control unit ((Embedded) Media Player) 131 of the reproduction processor 130 performs a control process for reproducing contents sent according to the DASH (MPEG-DASH) standards.

As described above, the MPEG-DASH standards include the following two standards:

(a) standards with respect to manifest files (MPD: Media Presentation Description) for describing meta data that represent management information for moving images and sound files; and (b) standards with respect to a file format (segment format) for the transmission of moving image contents.

The transmitting apparatus 20 distributes contents to the receiving apparatus 30 according to the above MPEG-DASH standards.

The contents are sent as segments (AV segments, etc.) represented by divided data in given units according to the MP4 file format prescribed by MPEG, and the reproduction control unit ((Embedded) Media Player) 131 performs a process of acquiring segments storing contents to be reproduced by referring to a manifest file (MPD).

The application control unit 132 controls the execution, start, end, etc. of applications provided from the transmitting apparatus 20, such as applications of weather forecasts, advertisements, etc., described above with reference to FIGS. 5 and 6.

An output control unit 133 acquires program makeup data and application execution data provided by the reproduction control unit 131 and the application control unit 132, and performs a process of decoding the acquired data, a process of outputting the decoded data to a display unit, etc.

Note that the reproduction control unit ((Embedded) Media Player) 131 and the application control unit 132 refers to signaling data sent by the transmitting apparatus 20 (the broadcasting server 21, the advertisement server 22, etc.), acquires necessary data according to information described in the signaling data from the proxy server 120, and performs a reproduction control process and an application control process according to the information described in the signaling data.

As described above with reference to FIG. 2, the signaling data 50 include program schedule information such as a program guide, etc., address information (URL (Uniform Resource Locator), etc.) required to acquire programs, information required by a process of reproducing contents, e.g., guide information including codec information (encoding process, etc.), and various control information such as application control information, etc.

The reproduction control unit ((Embedded) Media Player) 131 and the application control unit 132 acquire signaling data (SLS: Service Layer Signaling) and perform a data acquisition process, a data reproduction control process, an application execution control process, etc. based on the acquired signaling data.

For example, the application control unit 132 performs an application control process based on various signaling data where attribute information and control information corresponding to applications are recorded. Specifically, the application control unit 132 performs an application control process using USBD/USD, S-TSID representing signaling data of ATSC3.0 or an application information table (AIT: Application Information Table) where attribute information and control information corresponding to applications are recorded.

Incidentally, the reproduction control unit ((Embedded) Media Player) 131 and the application control unit 132 perform a process using data stored in the cache unit 122 of the proxy server 120.

The data stored in the cache unit 122 are data received by the middleware (Client Local ATSC Middleware) 110 and data received by the proxy server 120 via the network.

The data that the middleware 110 or the proxy server 120 acquires via broadcasting waves or the communication network represent, for example, DASH-MPD files, DASH segment (segment) files, other general application files, and SLS (Service Layer Signaling) files storing signaling data therein.

These data are stored in the cache unit 122 under the control of the cache control unit 121.

Thereafter, the cache control unit 121 acquires requested data from the cache unit 122 according to requests from the reproduction control unit ((Embedded) Media Player) 131 and the application control unit 132, and provides the acquired data to the reproduction control unit ((Embedded) Media Player) 131 and the application control unit 132 where they are used to render streams and in a data reproduction process such as the execution of applications.

When the reproduction control unit ((Embedded) Media Player) 131 and the application control unit 132 request (HTTP request) the cache control unit 121 of the proxy server 120 to acquire segment (segment) files, other general application files, and signaling data files, the cache control unit 121 of the proxy server 120 acquires data from the cache unit 122 in response to the request. Note that, if there are no data in the cache unit 122, the cache control unit 121 performs a process of acquiring data via broadcasts or the Internet.

Furthermore, the reproduction control unit (DASH Client) 131 and the application control unit 132 reproduce contents and acquire signaling data where application control information, etc. is recorded. These signaling data are acquired by the signaling acquiring unit (SLS Signaling Retriever) 112.

For example, various signaling data such as USBD/USD, AIT, S-TSID, MPD, etc. are acquired and used.

The signaling acquiring unit (SLS Signaling Retriever) 112 extracts signaling data carried by SLS LCT packets that are broadcast and received via the communication unit (ATSC tuner: ATSC3.0 PHY/MAC) 111.

These signaling data are acquired by the signaling acquiring unit 112 of the middleware 110, and analyzed by the signaling analyzing unit (SLS Signaling Parser) 113.

The signaling data include, for example, AV segments required to reproduce programs, and address information (URL) for acquiring various data files (resources), etc. that are required to execute applications. The signaling analyzing unit 113 performs a process of acquiring address information (broadcasting distribution address information) with which to acquire necessary segments and resource files.

Based on the broadcasting distribution address information, LCT packets storing desired files therein are acquired from a broadcast stream, and the acquired data are loaded into the cache unit 122 of the proxy server 120.

Figure 8:
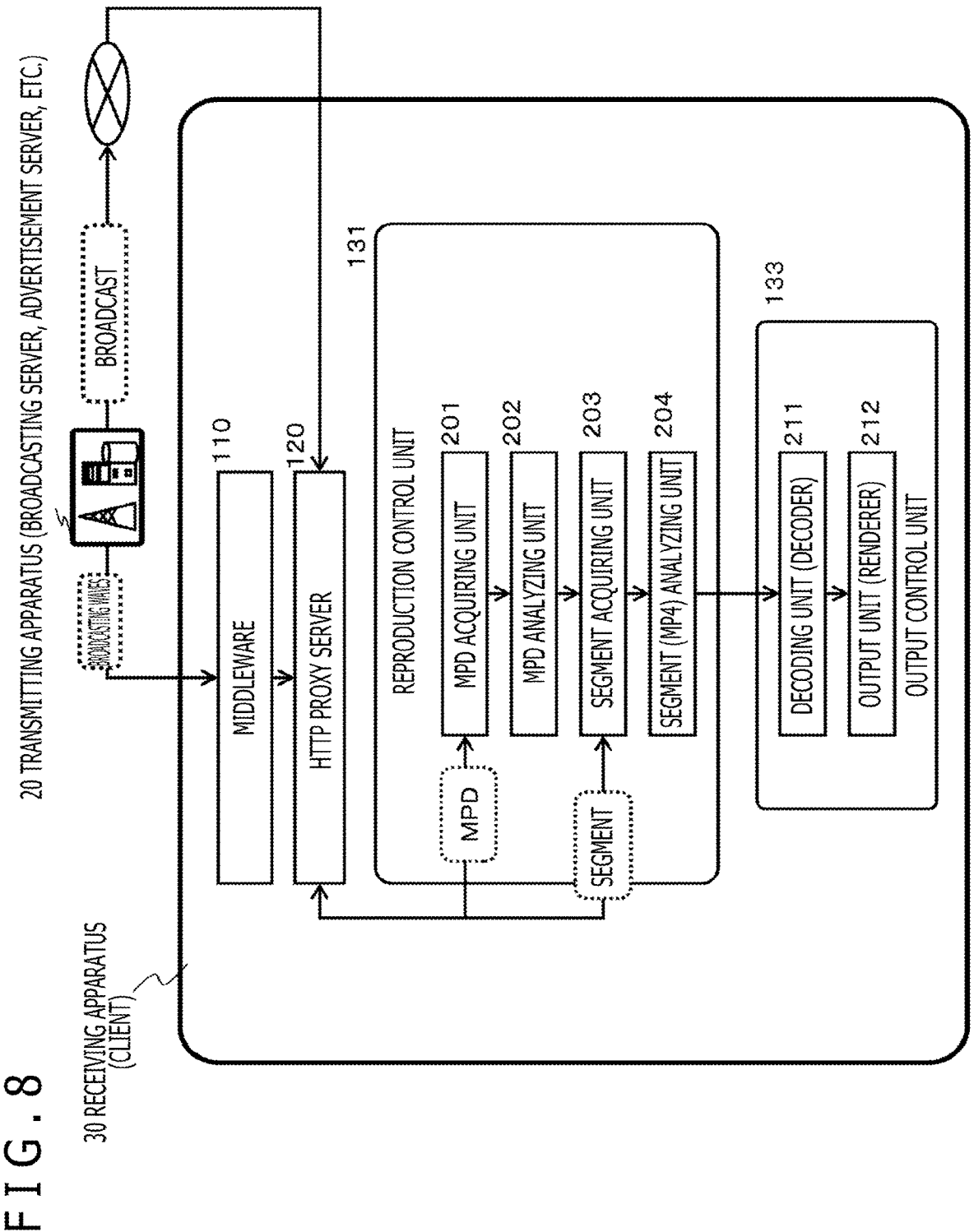
FIG. 8 is a diagram illustrative of a configurational example of the receiving apparatus.

FIG. 8 is a diagram depicting configurational details of the reproduction control unit ((Embedded) Media Player) 131 and the output control unit 133 of the receiving apparatus (client) 30.

The reproduction control unit ((Embedded) Media Player) 131 of the receiving apparatus (client) 30 has an MPD acquiring unit 201, an MPD analyzing unit 202, a segment acquiring unit 203, and a segment (MP4) analyzing unit 204.

As described above, the reproduction control unit ((Embedded) Media Player) 131 performs a control process for reproducing contents sent according to the DASH (MPEG-DASH) standards.

The MPD acquiring unit 201 acquires a manifest file (MPD: Media Presentation Description) which is a management information description file for moving image and sound files.

The MPD is provided by the transmitting apparatus 20 such as the broadcasting server 21, the advertisement server 22, etc., stored in the proxy server 120, and thereafter acquired by the reproduction control unit 131.

The MPD analyzing unit 202 analyzes described contents of the MPD acquired by the MPD acquiring unit 201 and provides information required to acquire segments corresponding to data to be reproduced, etc. to the segment acquiring unit.

The segment acquiring unit 203 acquires segments corresponding to data to be reproduced according to the result of the MPD analysis by the MPD analyzing unit 202.

The segments represent predetermined unit data set according to a file format (segment format) for transmitting contents including AV data.

The segment analyzing unit 204 acquires encoded image data, encoded sound data, etc. from the segments acquired by the segment acquiring unit 203, and outputs the acquired data to a decoding unit (decoder) 211 of the output control unit 133.

The output control unit 133 of the receiving apparatus (client) 30 has the decoding unit (decoder) 211 and an output unit (renderer) 212.

The decoding unit (decoder) 211 carries out a process of decoding the encoded image data and the encoded sound data provided from the segment analyzing unit 204.

The output unit 212 outputs decoded image data and sound data to an output unit (a display, a speaker).

The reproduction control unit ((Embedded) Media Player) 131 of the receiving apparatus (client) 30 is an executing unit for ATSC3.0 client applications (3.0 DASH Client).

The ATSC3.0 client applications are executed on a browser implemented on an ATSC3.0 broadcast receiving client device. Alternatively, the ATSC3.0 client applications may be executed not only as browser applications but also as native applications.

The ATSC3.0 client applications executed by the reproduction control unit ((Embedded) Media Player) 131 include ATSC3.0 DASH client applications (3.0 DASH Client) and ATSC3.0 stream associated applications (3.0 Application).

The ATSC3.0 client applications executed by the reproduction control unit ((Embedded) Media Player) 131 and the output control units 133 and 152 process the data received by the middleware (Client Local ATSC Middleware) 110 and the data received by the proxy server (Client Local HTTP Proxy Server) 120 via the network.

The DASH-MPD files, DASH segment (segment) files, other general application files, and SLS (Service Layer Signaling) files storing signaling data therein that the middleware 110 or the proxy server 120 has acquired are input, and streams are rendered and applications are controlled.

This model makes it possible to enhance the portability of applications because the ATSC3.0 client applications executed by the reproduction control unit ((Embedded) Media Player) 131 and applications executed by a signaling data processor 160 always access the external world through the proxy server 120, and hence do not recognize whether they acquire the file group via broadcasts or the Internet (network transparency is provided).

Therefore, it is not necessary to install applications specific to broadcasts, and applications may be installed irrespectively of which of broadcasts and the Internet is to be used.

When the ATSC3.0 client applications executed by the reproduction control unit ((Embedded) Media Player) 131 request (HTTP request) the acquisition of DASH-MPD files, DASH segment (segment) files, other general application files, and signaling data files, the proxy server 120 decides in an address and link resolver (Address & xlink Resolver) 122 whether to acquire the files via a broadcast receiving stack or the Internet in response to the request.

Information used as the material on which to decide is provided as the result of the analysis of the signaling data. The reproduction control unit 131 requests the signaling acquiring unit (SLS Signaling Retriever) 112 to acquire USBD/USD, S-TSID, etc. which are signaling meta data of ATSC3.0.

The signaling acquiring unit (SLS Signaling Retriever) 112 extracts signaling meta data carried by SLS LCT packets that are broadcast and received via the communication unit (ATSC tuner: ATSC3.0 PHY/MAC) 111.

The signaling analyzing unit (SLS Signaling Parser) 113 also extracts signaling meta data from an URL included in a request for segments and application resources, and resolves broadcast distribution address information for acquiring a target file. When it is found out that broadcast distribution is to be or has been performed, based on the broadcast distribution address information, the signaling analyzing unit (SLS Signaling Parser) 113 acquires LCT packets storing a desired file therein from the broadcast stream, and loads them into cache (Proxy Cache) units 121*a* and 121*b*. The proxy server 120 returns the file (as an HTTP response) to the reproduction control unit 131. If the URL included in the request for the application parts is not in the signaling meta data, then the proxy server 120 acquires the file via an ordinary Internet stack.

6. About Signaling Data Per Period (Period) Using an MPD

As described above with reference to FIG. 2, etc., the transmitting apparatus 20 provides the receiving apparatus 30 with the signaling data 50 that include various pieces of control information.

As described above, the signaling data are available in various kinds depending on information. Specifically, for example, the signaling data include a USD (user service description (User Service Description)) which is signaling data per service such as a program or the like.

The USD includes various kinds of control information. Representative control information is an MPD [media presentation description (Media Presentation Description)] which is signaling data including manifest files that store therein guide information and control information corresponding to contents (AV segments).

The MPD (Media Presentation Description) which is one of signaling data according to the DASH standards is able to provide the receiving apparatus (client) 30 with various control data in units of periods (Period) as time zones into which the broadcasting time of a certain program is divided, for example.

Figure 9:
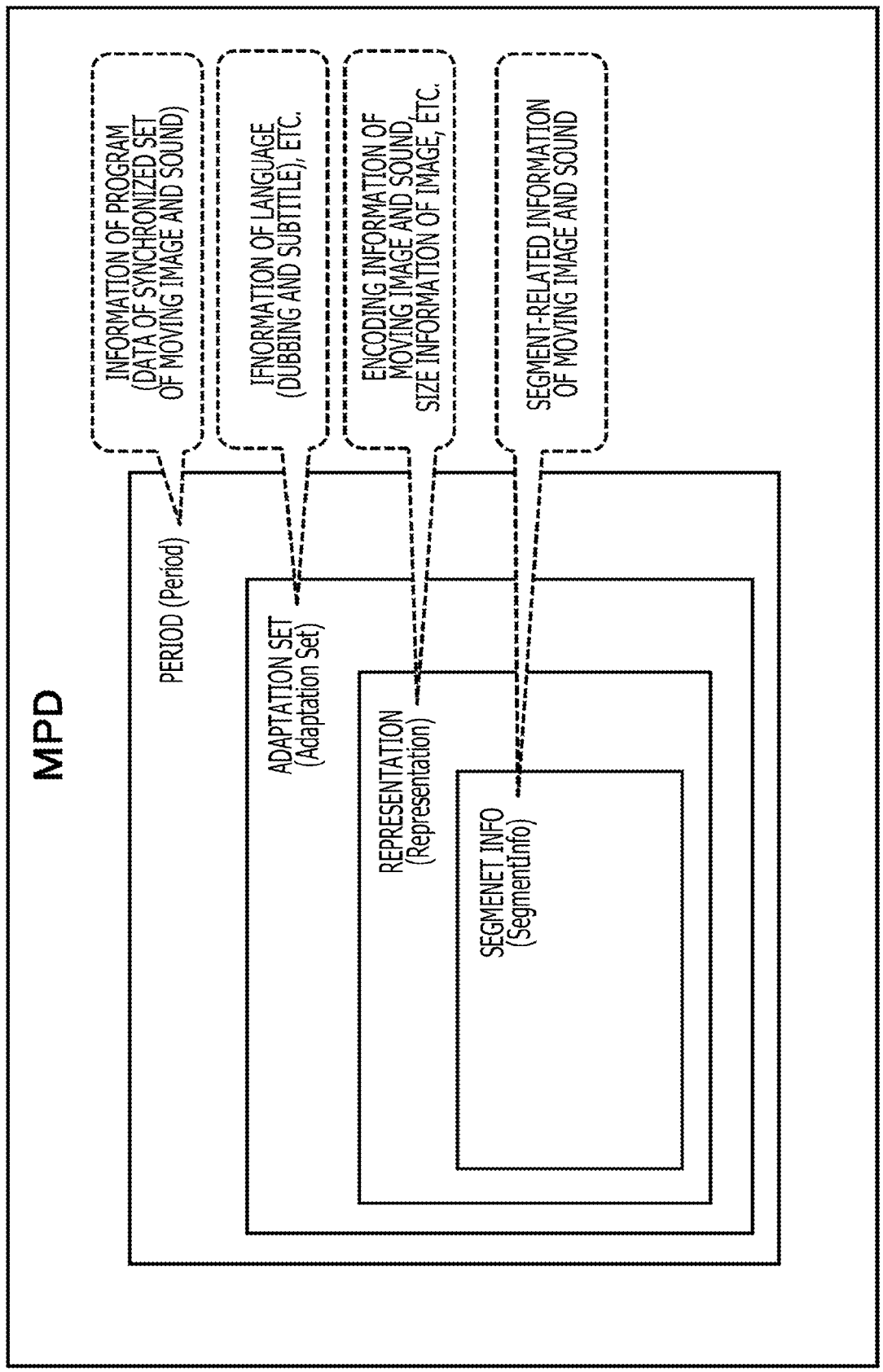
FIG. 9 is a diagram illustrative of a configurational example of an MPD.

FIG. 9 is a diagram depicting an example of the format of the MPD.

The MPD is able to describe information of attributes or the like and control information in units of various prescribed ranges indicated below, for each of streams of image and sound:

(1) a period (Period) that prescribes zones on a time axis;

(2) an adaptation (Adaptation) that prescribes data kinds of image and sound, etc.;

(3) a representation (Representation) that prescribes image types and sound types; and (4) a segment info (SegmentInfo) as an information recording area in units of segments (AV segments) of image and sound.

Figure 10:
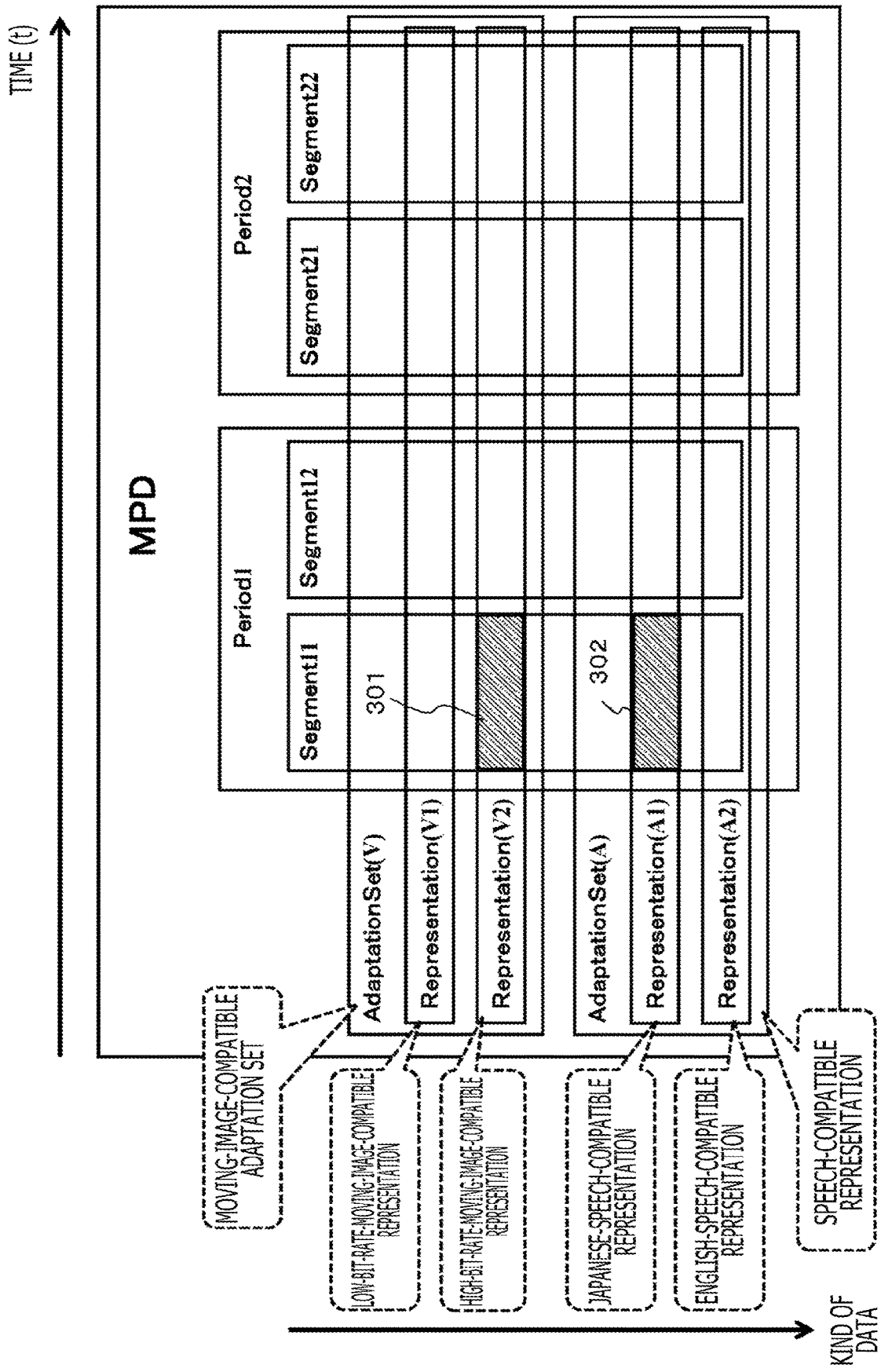
FIG. 10 is a diagram illustrative of a configurational example of the MPD.

FIG. 10 is a diagram depicting a chronologically developed sequence of information (control information, management information, attribute information, and the like) corresponding to AV segments recorded in the MPD.

It is assumed that time passes from the left to the right. The time axis corresponds to the time over which AV contents are reproduced on the receiving apparatus, for example.

Various items of information corresponding to AV segments are recorded in the MPD. Note that the MPD is part of signaling data, and is sent prior to AV segments, for example.

As described above with reference to FIG. 9, the MPD is able to record information in units of data indicated below:

(1) a period (Period) that prescribes zones on a time axis;

(2) an adaptation (Adaptation) that prescribes data kinds of image and sound, etc.;

(3) a representation (Representation) that prescribes image types and sound types; and (4) a segment info (SegmentInfo) as an information recording area in units of segments (AV segments) of image and sound.

FIG. 10 is a diagram depicting these data areas developed over the time axis and according to data types.

FIG. 10 depicts the following two adaptations (Adaptations):

(V) an adaptation V (Adaptation (V)) as an image-compatible information recording area; and (A) an adaptation A (Adaptation (A)) as a sound-compatible information recording area.

(V) The adaptation V (Adaptation (V)) as an image-compatible information recording area has two representations (Representations), indicated below, as information recording areas in units of streams having different attributes:

(V1) a representation (V1) (Representation (V1)) as an information recording area compatible with low-bit-rate images; and (V2) a representation (V2) (Representation (V2)) as an information recording area compatible with high-bit-rate images.

Similarly, (A) the adaptation A (Adaptation (A)) as a sound-compatible information recording area has two representations (Representations), indicated below, as information recording areas in units of streams having different attributes:

(A1) a representation (A1) (Representation (A1)) as an information recording area compatible with Japanese speech; and (A2) a representation (A2) (Representation (A2)) as an information recording area compatible with English speech.

Moreover, each representation (Representation) is arranged to be able to record information in periods on a reproduction time axis and further in units of segments.

For example, a receiving apparatus (client) that selects and reproduces a high-bit-rate image and Japanese speech selects and acquires information about the high-bit-rate image and the Japanese speech to be reproduced from an MPD in reproducing Segment (11) of Period 1.

Recorded information of the MPD to be selected becomes information of segment areas 301 and 302 depicted in the figure.

In this manner, the receiving apparatus selects only information corresponding to data (segment) to be reproduced on its own apparatus from an MPD sent as signaling data from the transmitting apparatus, and refers to the elected information.

Information corresponding to segments according to data kinds and in units of time can thus be recorded in MPDs.

As described above with reference to FIG. 5, in a contents output process of alternatively outputting broadcast programs and advertisements, the transmitting apparatus can control contents (broadcast programs, advertisements) in units of time on the receiving apparatus by using an MPD in which control information in units of given time periods (Period) is recorded. Specifically, it is possible to realize the process of providing advertisements targeted on the user as described above with reference to FIG. 5.

Figure 11:
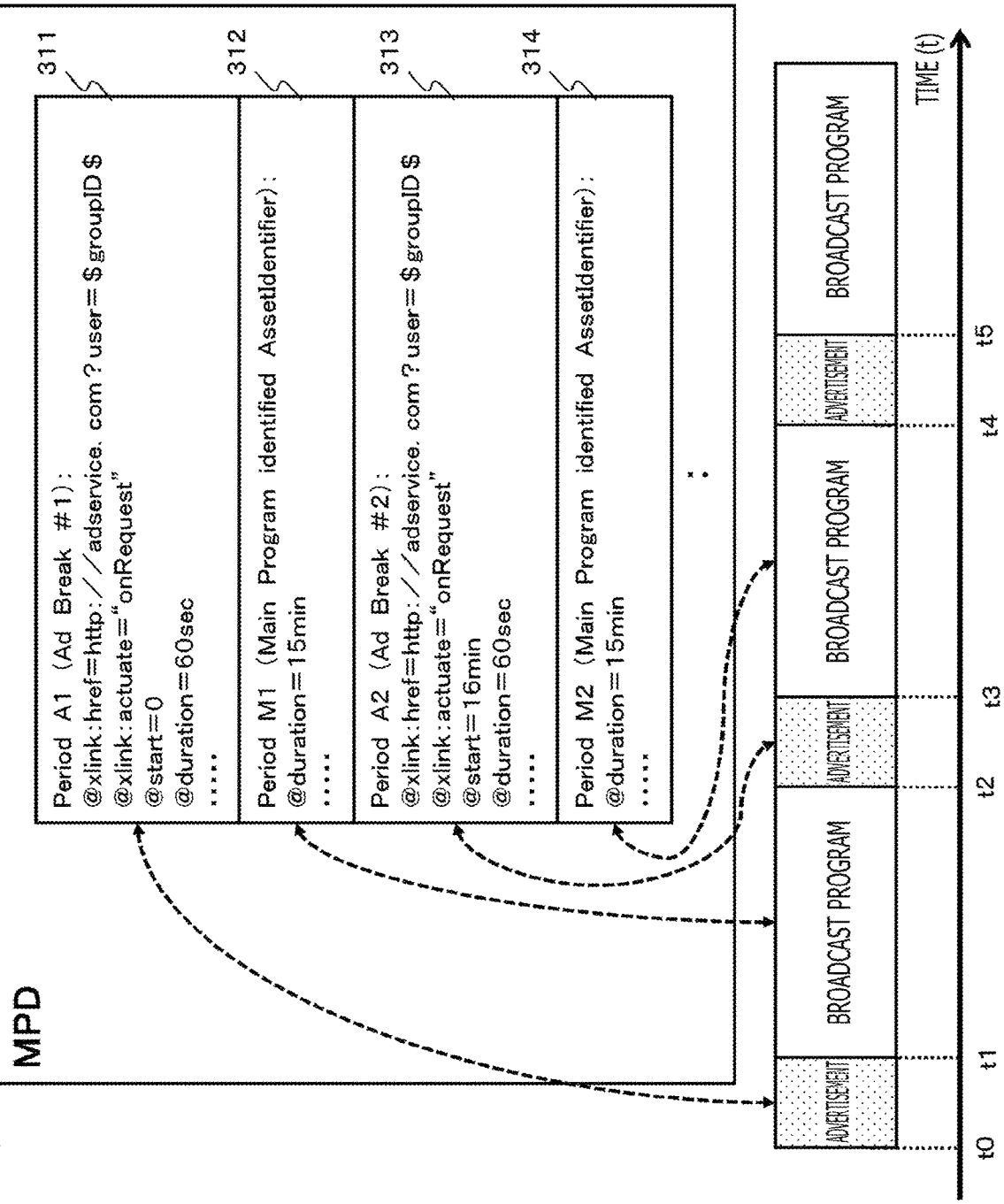
FIG. 11 is a diagram illustrative of a configurational example of the MPD.

FIG. 11 is a diagram depicting a configurational example of an MPD that represents control information description data (signaling data) corresponding to the contents output process of alternatively outputting broadcast programs and advertisements as described above with reference to FIG. 5.

The MPD is divided into period information 311 through 314 for advertisements and broadcast programs corresponding to output contents in given time zones.

The period information 311 represents control information (signaling data) corresponding to an advertisement that is output on the receiving apparatus in time period t0~t1.

The period information 312 represents control information (signaling data) corresponding to a broadcast program that is output on the receiving apparatus in time period t1~t2.

The period information 313 represents control information (signaling data) corresponding to an advertisement that is output on the receiving apparatus in time period t2~t3.

The period information 314 represents control information (signaling data) corresponding to a broadcast program that is output on the receiving apparatus in time period t3~t4.

The period information includes, recorded therein, information required to acquire data (contents) to be output to the receiving apparatus, such as access information (URL) or the like for broadcast programs or advertisements sent from the transmitting apparatus, and various pieces of information required to acquire and output contents on the receiving apparatus, such as a decoding method (codec), etc.

The transmitting apparatus sends the illustrated MPD to the receiving apparatus prior to time to.

The receiving apparatus refers to the MPD, acquires advertisements and broadcast programs via broadcasting waves or the network, performs a decoding process, etc. using the designated codec, and outputs decoded data to the display unit, speaker, etc.

Figure 12:
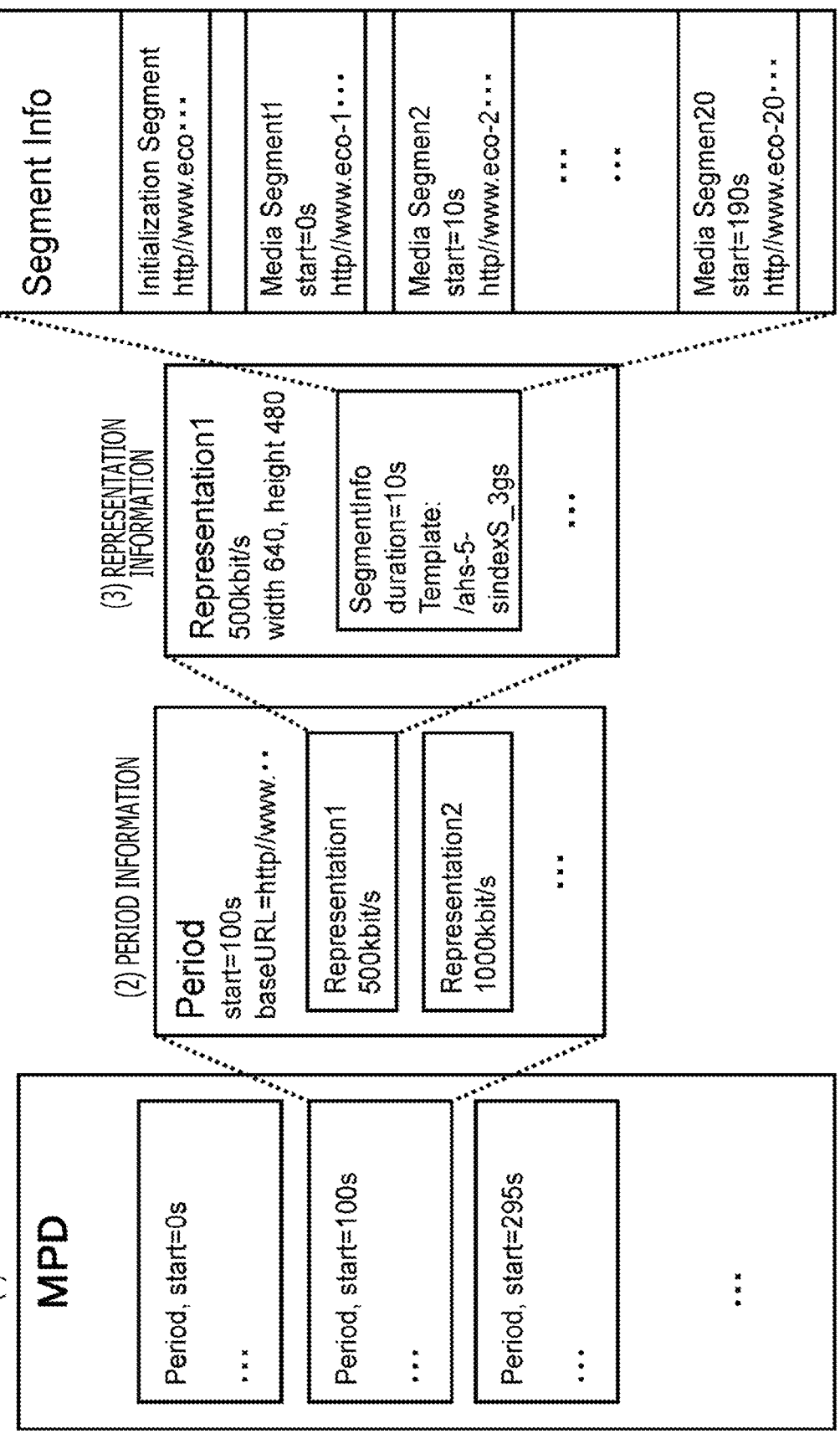
FIG. 12 is a diagram illustrative of an example of a sequence in which the MPD is used.

FIG. 12 is a diagram illustrative of the procedure of an MPD analyzing process (parsing) carried out by the receiving apparatus.

FIG. 12 depicts the following figures:

(1) MPD;
(2) period information;
(3) representation information; and
(4) segment information.

The receiving apparatus (client), which receives AV segments and performs a process of reproducing the AV contents, acquires an MPD contained in signaling data received prior to the reception of the MPD, and acquires, from the MPD, information corresponding to the data to be reproduced by its own apparatus.

First, the receiving apparatus selects (2) period information where information of a particular period (time zone) corresponding to an AV segment reproduction time period is recorded, from (1) MPD depicted in FIG. 10.

Then, the receiving apparatus selects (3) representation information corresponding to the kind of data to be reproduced by its own apparatus (client), and also selects (4) segment information corresponding to a reproduction target segment.

Referring to the data recorded in (4) segment information, the receiving apparatus can acquire an AV segment to be reproduced and various information required to reproduce the AV segment.

7. About a Specific Configurational Example for Performing a Process of Providing an Advertisement Depending on User Information Next, a specific configurational example for performing a process of providing an advertisement depending on user information will be described below.

A configuration of the period information 311 in the MPD depicted in FIG. 11 will be described below with reference to FIG. 13.

As can be seen from FIG. 11, the period information 311 is period information that represents control information corresponding to an advertisement that is output on the receiving apparatus in time period t0~t1.

Figure 13:
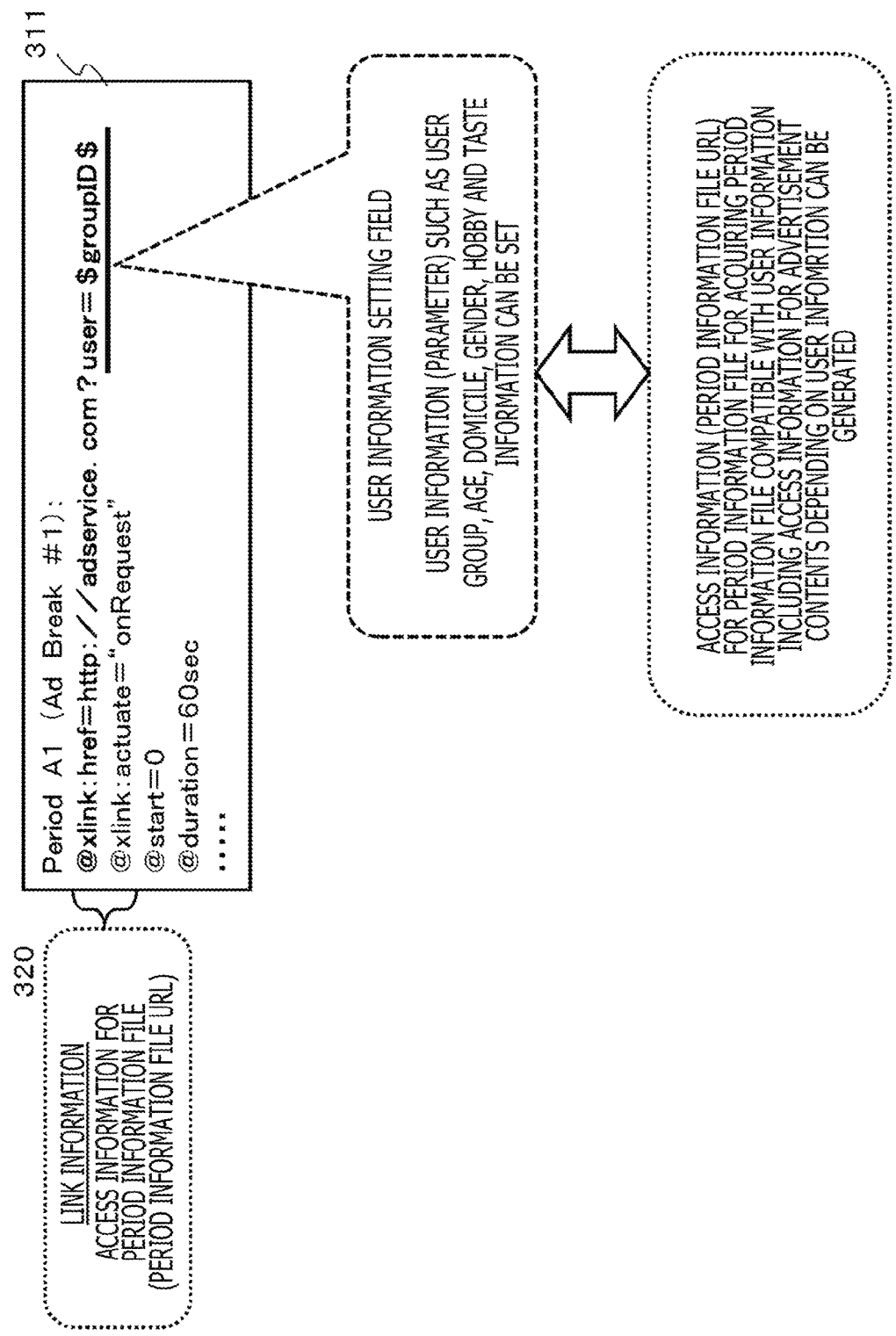
FIG. 13 is a diagram illustrative of a configurational example of advertisement-compatible period information in the MPD.

As depicted in FIG. 13, the advertisement-compatible period information 311 has the following description data.
Period A1 (Ad Break #1):
@xlink:href=http://adservice.com?user=$groupID$
@xlink:actuate="onRequest"
@start=0
@duration=60 sec
. . . .

The advertisement-compatible period information 311 includes, recorded therein,
an adaptation,
a representation,
a segment info, described above with reference to FIGS. 10 and 12, and
link information (xlink) as access information that dispenses with a description of these specific data and which serves to acquire period information carrying a specific description of these data.

The receiving apparatus sets user information (parameter) in a user information setting field (user=$groupID$) included in the link information (xlink) in the advertisement-compatible period information 311 depicted in FIG. 13.

The data where the user information (parameter) is set in the user information setting field (user=$groupID$) (user information set data) serve as access information (URL) for period information (period element) corresponding to the advertisement data corresponding to the user or makeup data of a URL.

In other words, access information (segment URL) for a segment file where advertisement data are stored is not recorded in the advertisement-compatible period information in the MPD depicted in FIGS. 11 and 13.

By setting the user information (parameter) in the user information setting field included in the link information (xlink) in the advertisement-compatible period information in the MPD depicted in FIGS. 11 and 13, there is completed access information (URL) for acquiring true period information (period element) where access information for acquiring advertisement data (segment file) targeted on the user is recorded. Alternatively, data for identifying access information (URL) for acquiring true period information (period element) are completed.

A data makeup of the advertisement-compatible period information 311 depicted in FIG. 13 will be described below.

"Period A1 (Ad Break #1)" represents an area for recording an identifier for the period information, and indicates that it is period information related to an advertisement (Ad) having an identifier (A1).

"@xlink:href=http://adservice.com?user=$groupID$"
This information recording field is a link (xlink) information recording field.

Incidentally, "@xlink:href=" indicates a setting field for a URL to be referred to.

According to the present makeup, specifically, it represents the field where the original period information is recorded, i.e., the following data described with reference to FIGS. 10 and 12:
an adaptation;
a representation;
a segment info; and
access information (URL) for acquiring period information (period element) carrying a specific description of these data are recorded.

However, only when the user information (parameter) is set in the user information setting field (user=$groupID$), there is completed access information (URL) for acquiring true period information (period element) corresponding to advertisement data selected according to the user information.

Viewer's (user's) age, gender, address, hobby and taste, etc., for example, can be set in the user information setting field.

According to an example of age setting, for example, "age=10-19" may be set. This setting indicates that the user's age is in the range from 10 to 19 years.

According to an example of address setting, for example, "location=LA" may be set. This setting indicates that the user lives in Los Angeles (LA).

By setting such user information in the user information setting field (user=$groupID$), there is completed access information (URL) for acquiring true period information (period element) including all control information (an adaptation, a representation, a segment info, etc.) with respect to advertisement data targeted on the user.

'@xlink:actuate="onRequest"'
This information recording field is also a component of the link (xlink) information recording field.

Incidentally, "@xlink:actuate=" represents a field where a timing for acquiring data accessed according to a URL indicated by "@xlink:href=" is prescribed.

According to the present makeup, this field is a field where a timing for acquiring period information (period element) that can be acquired using the above parameter setting URL is prescribed.

The acquisition timing may be set in two ways (a) and (b):
(a) actuate="onRequest"; and
(b) actuate="onLoad."
(a) actuate="onRequest"
This setting indicates that the timing for acquiring period information (period element) that can be acquired using the above parameter setting URL may be at any time up to an advertisement start time (time t0 in the example depicted in FIG. 11).

(b) actuate="onLoad"
This setting requests that period information (period element) that can be acquired using the above parameter setting URL be acquired immediately after the MPD depicted in FIG. 11 has been acquired.

"@start=0"
This information recording field is a field where an output start timing for data (advertisement contents) corresponding to this period information is recorded.

It indicates that the advertisement starts from start (start time)=0 (corresponding to time t0 in the example depicted in FIG. 11).

"@duration=60 sec"
This information recording field is a field where a continuous output time period for data (advertisement contents) corresponding to this period information is recorded.

duration (continuous time period)=60 sec indicates that the advertisement continues for 60 seconds.

As described with reference to FIGS. 11 and 13, according to the present disclosure, period information corresponding to an advertisement output time zone set in an MPD includes a user information setting field, making it possible to dynamically change a provided advertisement depending on user information set in each receiving apparatus (client).

An MPD distributed to the receiving apparatus (client) (e.g., distributed by service signaling) can describe:
access information (URL) of period information (period element) by setting user information in the position of MPD/Period@xlink:href.

This URL can be recognized as particular access information (URL) of period information (period element) where access information for an advertisement selected depending on the set user information, etc. is recorded.

A URL is encoded in a format such as http://a.com?user=$groupID$, for example, and the receiving apparatus (client) inserts a value of group ID (groupID), for example, as user information for identifying an end user in a parameter section of groupID.

For example, http://a.com?user=classA is inserted.

Based on the user information setting URL (=access information of a period element depending on the user information), a process of selecting and acquiring a period element depending on the user information is carried out by a link resolving application (script) provided by the transmitting apparatus, for example.

The link resolving application (script) is executed by the application control unit 132 of the receiving apparatus 30.

The application control unit 132 performs a link resolving process by executing the link resolving application (script). In other words, the application control unit 132 performs a link resolving (xlink Resolver) process for selecting a period element depending on the user information on the basis of the user information setting URL (=access information of a period element depending on the user information).

The application control unit 132 selects a period element depending on the user information by executing the link resolving application (script) and returns the period element that includes the URL of an advertisement segment where an advertisement corresponding to the selected user information is stored, etc. to the reproduction control unit 131 of the receiving apparatus 30.

The reproduction control unit 131 of the receiving apparatus 30 performs a process of acquiring the advertisement segment using the advertisement segment URL recorded in the period element, and reproduces the advertisement.

A processing sequence for the receiving apparatus to perform a process of acquiring advertisement data and outputting (reproducing) them by applying the advertisement data-compatible period information 311 as depicted in FIG. 13 will be described below with reference to sequence diagrams depicted in FIGS. 14 and 15.

Figure 14:
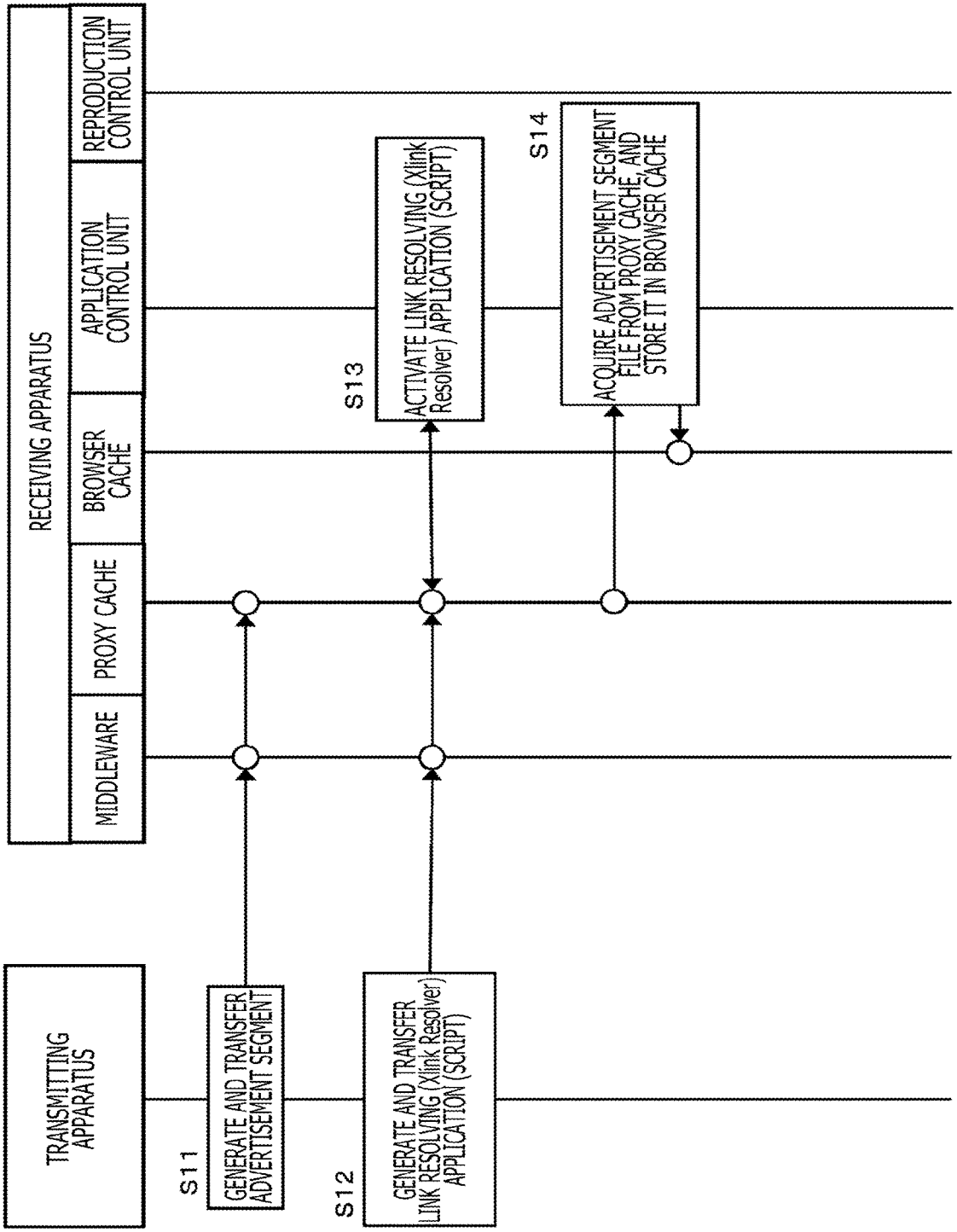
FIG. 14 is a diagram illustrative of a processing sequence using the advertisement-compatible period information in the MPD.
Figure 15:
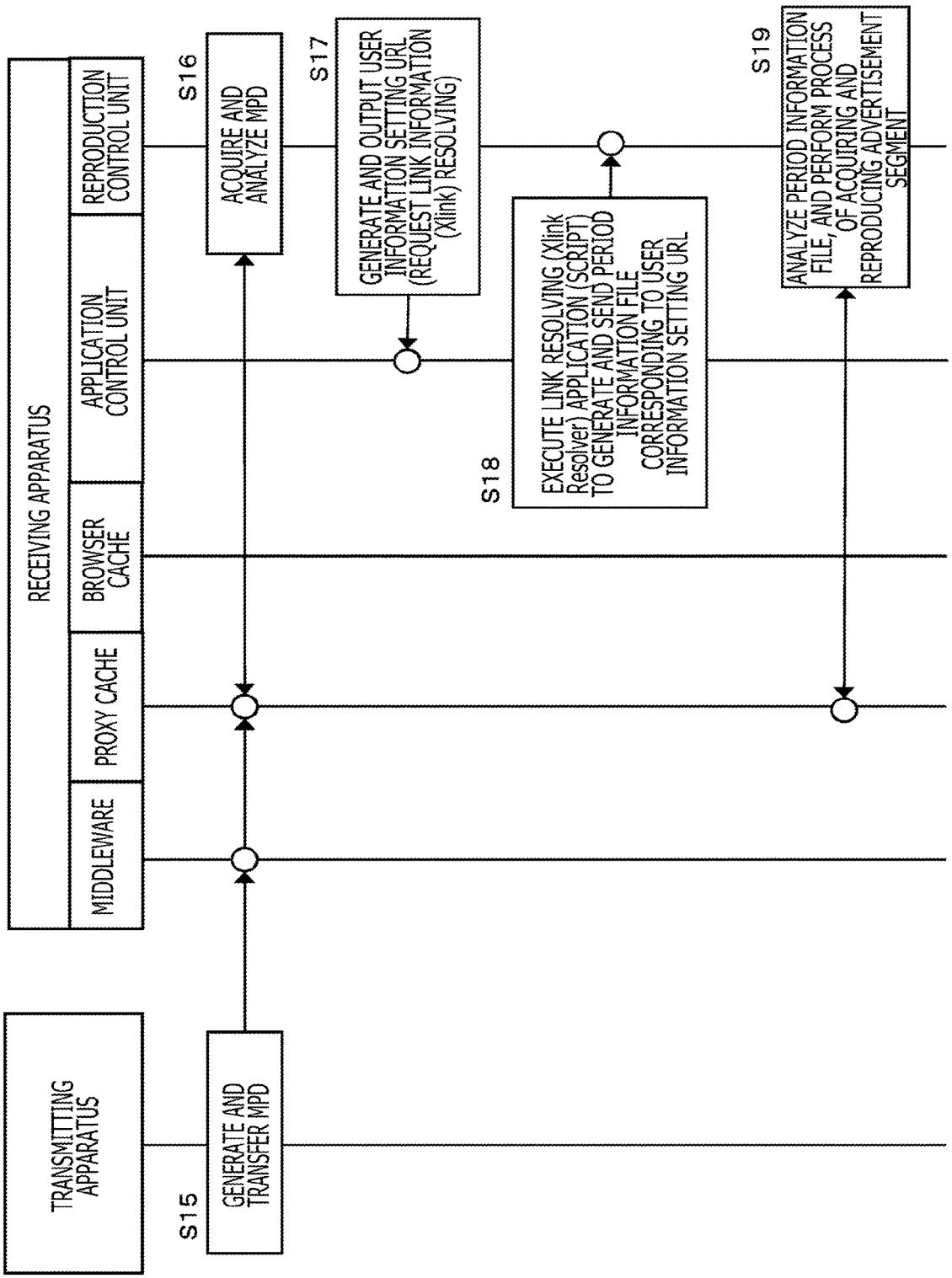
FIG. 15 is a diagram illustrative of a processing sequence using the advertisement-compatible period information in the MPD.

FIGS. 14 and 15 depict various apparatus and components given below, from the left:

(a) a transmitting apparatus;
(b) middleware as a component of the receiving apparatus;
(c) a cache unit (proxy cache) of a proxy server as a component of the receiving apparatus;
(d) a browser cache as a component of the receiving apparatus;
(e) an application (script) control unit as a component of the receiving apparatus; and
(f) a reproduction control unit as a component of the receiving apparatus.

Note that the browser cache is a cache unit used by the application (script) in case an application executed by the application (script) control unit is an application executed on a browser.

The processing operations of respective steps depicted in FIGS. 14 and 15 will be described below.

(Step S11)

In step S11, the transmitting apparatus generates and transfers advertisement segment files storing advertisement contents therein. The transmitting apparatus performs multicast transmission with the receiving apparatus as a transmission target, via broadcasting waves or a network.

Note that advertisements that are sent by the transmitting apparatus include different advertisement contents corresponding to various users. In other words, the transmitting apparatus sends advertisement segment files storing therein various user-dependent advertisement contents to be provided to various different users of various ages and various domiciles. Incidentally, the transmitting apparatus may be set to continuously repeatedly carry out the process of sending advertisement segment files.

(Step S12)

In step S12, the transmitting apparatus generates an application for performing a link resolving process (xlink Resolver), e.g., Java (registered trademark) Script to be executed on a browser, and sends the generated application to the receiving apparatus.

Specifically, the application refers to an application for performing a link resolving process (xlink Resolver) for selecting a period element depending on the user information, on the basis of the user information setting URL (=access information of a period element depending on the user information) described above with reference to FIG. 13.

(Steps S13 and S14)

The processing operations of steps S13 and S14 are processing operations carried out by the application control unit of the receiving apparatus.

In step S13, the application control unit activates the link resolving application (script) received from the transmitting apparatus in step S12.

Furthermore, in step S14, the application control unit executes the link resolving application (script), acquires a period element acquired on the basis of the result of the resolution and an advertisement segment file, and stores them in the browser cache.

(Step S15)

In step S15, the transmitting apparatus performs a process of sending an MPD.

The MPD that is sent is the MPD described with reference to FIGS. 9 through 13, for example. Specifically, the MPD includes advertisement-compatible period information (period element), and the advertisement-compatible period information includes, recorded therein, an uncompleted URL having a field for setting link information (xlink), i.e., user information according to a PDI configuration.

The receiving apparatus sets predetermined user information (parameter) in the user information setting field, thereby generating a user-associated period information (period element) acquisition URL in which access information of particular advertisement contents, etc. is recorded.

(Step S16)

Step S16 is a processing operation carried out by the reproduction control unit of the receiving apparatus.

The reproduction control unit of the receiving apparatus acquires the MPD sent by the transmitting apparatus and analyzes (parses) the acquired MPD.

Note that the MPD is received by the middleware of the receiving apparatus, stored in the cache unit of the proxy server, and thereafter acquired from the cache unit by the reproduction control unit.

(Step S17)

In step S17, the reproduction control unit of the receiving apparatus acquires the link information (xlink) recorded in the advertisement-compatible period information of the MPD acquired in step S16, i.e., the link information (xlink) having the user information setting field, and sets the user information (parameter) in the user information setting field.

The user information that is set may be user information registered (recorded) in advance in the storage unit of the receiving apparatus, or may be user-input information input by the user from time to time.

The reproduction control unit of the receiving apparatus outputs the data in which the user information (parameter) is set in the user information setting field, to the application control unit that executes the link resolving application (script), and requests the application control unit to analyze the link information (xlink) (to resolve the link). The requesting process is carried out as an HTTP-GET request, for example.

(Step S18)

The processing operation of step S18 is a processing operation of the application control unit of the receiving apparatus.

The application control unit analyzes the user information (parameter) setting URL input from the reproduction control unit, extracts a period element corresponding to the user information, and outputs the extracted period element to the reproduction control unit.

The output process is carried out as an HTTP-response, for example.

The period element is a period element depending on the user information (parameter) set by the reproduction control unit in step S17, and a period element in which access information for optimum advertisement contents (advertisement segment URL) to be provided to a particular user selected by the set user information (age, Location, etc.), etc. is recorded.

(Step S19)

Finally, the reproduction control unit of the receiving apparatus reads and analyzes, in step S19, the recorded information of the period element acquired from the application control unit.

The reproduction control unit acquires an advertisement segment file storing advertisement contents therein, using the access information for optimum advertisement contents (advertisement segment URL) included in the recorded information of the period element, and outputs the acquired advertisement segment file via the output unit, such as a display unit, a speaker, etc., of the receiving apparatus.

Note that control information such as a decoding mode, an output time period, etc. of the advertisement contents has been recorded in the period element, and the reproduction control unit carries out a process of outputting the advertisement contents by performing a process according to the information recorded in the period element.

The advertisement contents output to the receiving apparatus represent an advertisement selected depending on the user information set by the reproduction control unit in step S17, and a user-targeted advertisement mainly targeted on a user selected according to user's (viewer's) characteristics such as user's age, domicile, etc., for example.

In this fashion, it is possible to select an optimum advertisement depending on the user information representing each user's attributes, e.g., user's gender, age, domicile, etc., for example, and provide the selected advertisement to the user.

8. About a Process of Outputting an Unauthorized Advertisement by an Unauthorized Application As described above, ATSC3.0 that is being currently developed is reviewing a system for inserting advertisement (Ad) contents between (or before or after) programs provided by contents providers (or contents distribution service providers), such as programs or program-related applications from broadcasting stations or the like.

Moreover, as described above, a review of a system that uses period information (period element) of an MPD as DASH-prescribed signaling data is in progress, and optimization of provided advertisements on the basis of parameters such as demographic attributes, etc., such as gender, age, domicile, etc., of viewers of advertisement contents at clients is being reviewed in order to increase the distribution effect of advertisement contents.

As described above with reference to FIG. 13 and other figures, the insertion of advertisement contents using DASH-prescribed period information is realized by setting user information (parameter) in the user information setting field (user=$groupID$) included in the link information (xlink) in the advertisement-compatible period information 311 depicted in FIG. 13.

In other words, the insertion of advertisement contents using DASH-prescribed period information is realized by using a url added as an xlink:href attribute in the period information, as an address resolved into advertisement contents optimum for the viewer.

The process of resolving the address into optimum advertisement contents (address resolving process/link resolving process) is carried out by, for example, an application program (called a script application a web application, or the like), called a script application (ScriptApp), executed on a browser (or in a script execution environment) provided by a broadcast provider (or an advertisement contents insertion service provider) such as a broadcasting station or the like.

In the sequence diagrams described with reference to FIGS. 14 and 15, the application program is an application executed by the application control unit 132 and is activated in step S13, and the link resolving process is performed in step S18.

Note that the link resolving application (ScriptApp) may be distributed in association with a broadcast program by a unidirectional network (broadcast/multicast) such as a broadcasting network or by a bidirectional network such as the Internet.

As for the distribution timing of the link resolving application (ScriptApp), it may be distributed within the on-air time period of a program into which an advertisement is to be inserted or may be distributed in advance to a receiving device before a program is on air.

Furthermore, when the viewer views a program (the viewer may view the program in real time when it is on air or may record or download the program and view it in a time zone different from the time it is on air), the link resolving application (ScriptApp) is run at the same time that the program is reproduced.

By carrying out the process using the link resolving application (ScriptApp) according to the sequences depicted in FIGS. 14 and 15, it is possible to turn an advertisement output by the receiving apparatus 30 into an advertisement depending on the user information such as the user's age, gender, domicile, and the like.

However, in the sequences depicted in FIGS. 14 and 15, there is a possibility that the link resolving application (ScriptApp) executed by the application control unit may be replaced with an unauthorized application.

In other words, if the application activated by the application control unit 132 is replaced with an unauthorized application in step S13 depicted in FIG. 14, then the processing operation of the unauthorized link resolving application (ScriptApp) is performed.

If the link resolving process is carried out by the unauthorized application, then unauthorized advertisement contents which are not the advertisement contents depending on the true user attributes are selected and reproduced.

The processing operation of step S18 depicted in FIG. 15 is a processing operation in which the application control unit 132 acquires a period element (period information (period element)) corresponding to the URL input from the reproduction control unit 131, i.e., a period element in which access information (advertisement segment URL) of advertisement contents is recorded, and outputs the acquired period element to the reproduction control unit 131.

If the processing operation of step S18 is carried out by an unauthorized application, then a period element in which access information for advertisement contents (advertisement segment URL), which is different from the access information for the advertisement contents depending on the true user attributes, is recorded is supplied to the reproduction control unit 131.

The reproduction control unit 131 then performs a process of acquiring and reproducing segments that store therein advertisement contents by applying the access information for advertisement contents (advertisement segment URL) recorded in the period element acquired from the application control unit 132, possibly outputting an advertisement not related to the user attributes.

If the program for carrying out the link resolving process in the application control unit 132 is replaced with an unauthorized program in this manner, then an advertisement intended by the broadcast provider that has provided the original MPD is not selected, but a wrong unauthorized advertisement may possibly be reproduced.

A configuration for solving this problem will be described below.

9. (Embodiment 1) about a Configuration for Performing an Application Authentication Process to which Application Authentication Information Recorded in an Application Information Table (AIT) is Applied A configuration for performing an application authentication process to which application authentication information recorded in an application information table (AIT) is applied will first be described as Embodiment 1 of the present disclosure.

[9-1. About a Way in which the Authentication Information is Recorded in the Application Information Table (AIT)]

First, a way in which the authentication information is recorded in the application information table (AIT) will be described below.

The transmitting apparatus 20 sends an application to be executed by the receiving apparatus 30 to the receiving apparatus 30, and also provides the receiving apparatus 30 with various signaling data in which access information for the sent application and attribute information, control information of the application are recorded.

The signaling data that the transmitting apparatus 20 provides to the receiving apparatus 30 include the following data, for example:

(1) USBD/USD (User Service Bundle Description/User Service Description);

(2) S-TSID (Service based Transport Session Description); and (3) application information table (AIT: Application Information Table).

As described above, a USD includes information per predetermined service unit such as a broadcasting station or a program, for example, and includes information required to use a service in the receiving apparatus, such as access information (URL or the like) for receiving the service, codec information, reproduction timing information, etc. A USBD represents a bundle of USDs. Both a USD and a USBD are signaling data storing identical control information therein.

An S-TSID refers to additional information per service unit, and records therein additional information, not recorded in a USD.

As described above, a ROUTE protocol is a protocol based on FLUTE. A meta data file that describes transfer control parameters in FLUTE is called an FDT (File Delivery Table), and a meta data file that describes transfer control parameters in ROUTE is called an S-TSID (Service based Transport Session Description). The S-TSID is a superset of FDTs, and includes FDTs.

An application information table (AIT) is application-specific signaling data that are set in association with one or plural applications, and records therein access information (URL) for applications, control information applied to the execution of the applications, etc.

An example of recorded data in an application information table (AIT) will be described below with reference to FIG. 16.

Figure 16:
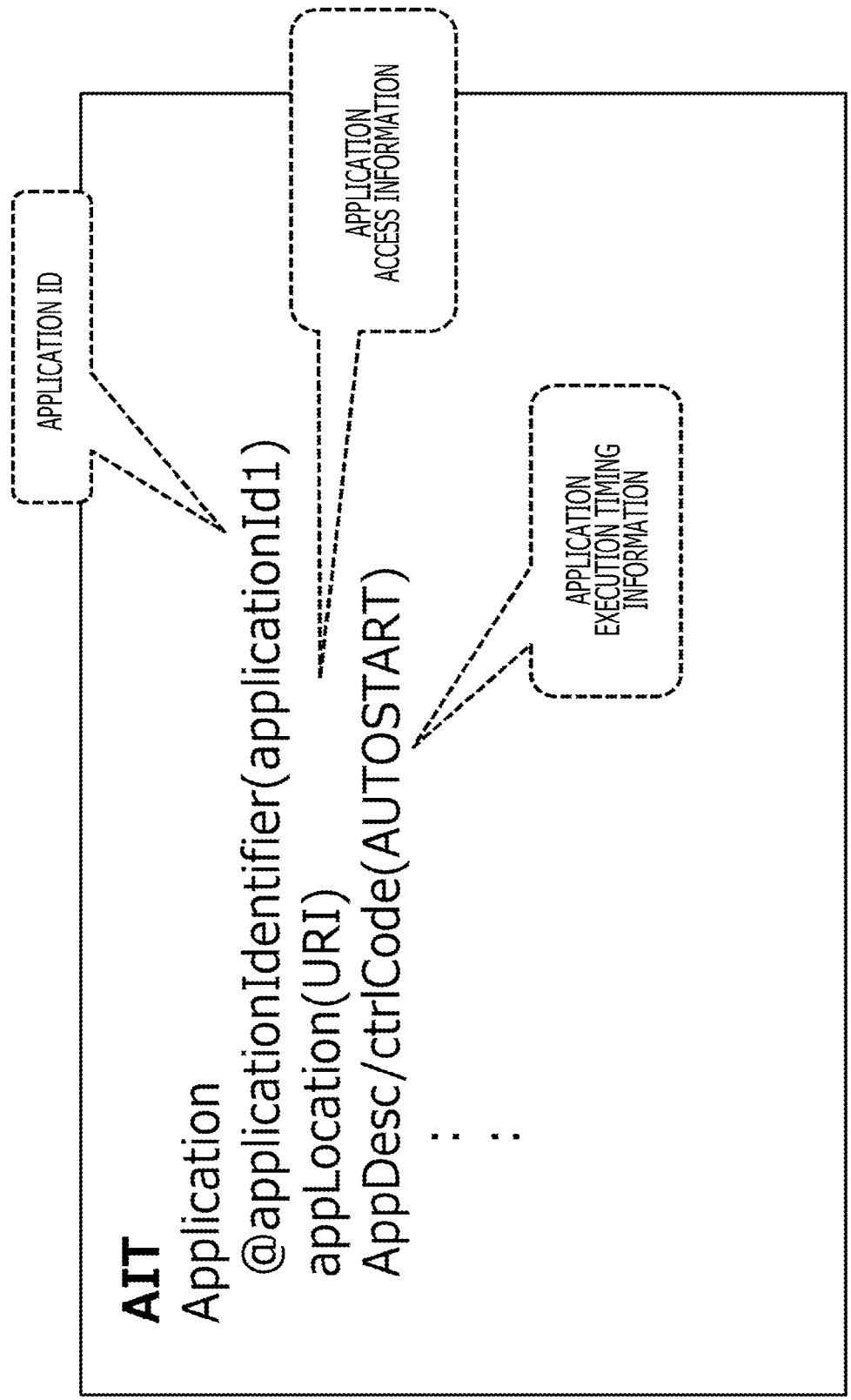
FIG. 16 is a diagram illustrative of a configurational example of an application information table (AIT).

The AIT depicted in FIG. 16 has the following data recorded therein:

an application ID;

application access information (AppLocation (URI)); and application execution timing information.

In addition, attribute information and control information of various applications are also recorded in the AIT.

The application ID represents an application identifier.

The application access information (AppLocation (URI)) represents URI used to acquire an application.

The application execution timing information includes, recorded therein, timings for executing applications in the receiving apparatus 30.

The application control unit 132 of the receiving apparatus 30 depicted in FIG. 7 acquires and controls applications by referring to the application information table (AIT).

The application information table (AIT) is set in association with various applications provided by the transmitting apparatus 20, and is sent from the transmitting apparatus 20.

For example, the application control unit 132 described above with reference to FIGS. 14 and 15 is activated in step S13, and with respect to the link resolving application (script (ScriptApp)) that performs the link resolving process in step S18, an application information table (AIT) in which attributes and control information corresponding to this application is set and provided from the transmitting apparatus 20 to the receiving apparatus 30.

According to present Embodiment 1, authentication information with respect to applications associated with the AIT is stored in the application information table (AIT).

Figure 17:
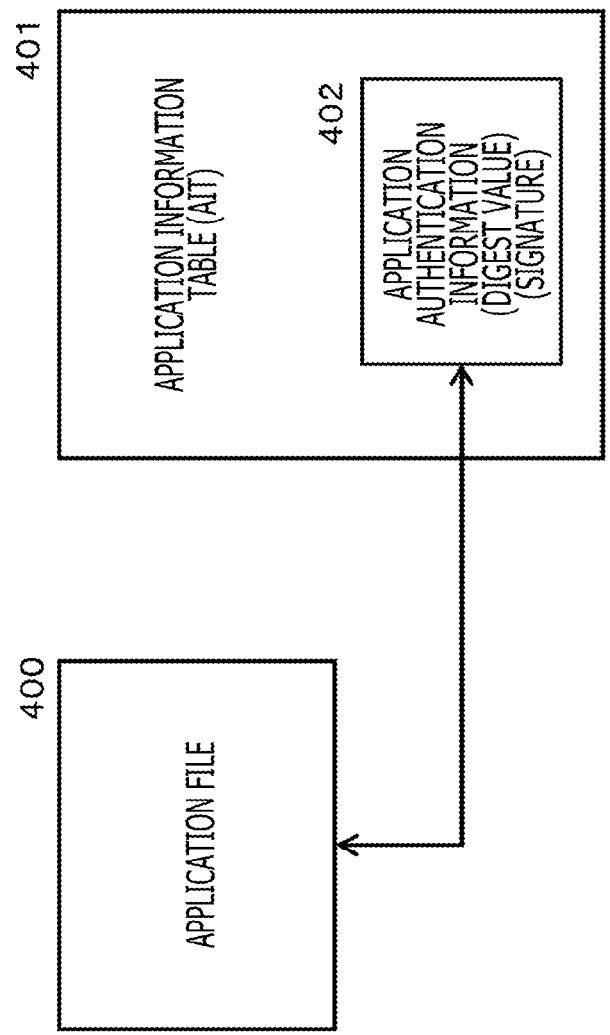
FIG. 17 is a diagram illustrative of a configurational example in which the authentication information of an application is recorded in the application information table (AIT).

As depicted in FIG. 17, application authentication information 402 is recorded in an application information table (AIT) 401 associated with an application 400, in which attribute information and control information of the application 400 are recorded.

Note that the application authentication information 402 includes a digest value (checking digest value) generated on the basis of makeup data of the application 400 to be authenticated, and a signature generated on the basis of authentication information makeup data including the digest value.

Before executing the application 400, the receiving apparatus 30 performs an authentication process to which the authentication information 402 in the application information table (AIT) 401 associated with the application 400 is applied.

Specifically, the receiving apparatus 30 performs a signature verifying process in the authentication information 402. If a signature is verified, then the receiving apparatus 30 performs a process of confirming an agreement between a calculated digest value that is newly calculated on the basis of the application 400 to be executed which is to be verified, and a checking digest value recorded in the authentication information 402.

Only if the application is confirmed as an authorized application that has not been falsified by the authentication process, the execution of the application associated with the AIT is permitted.

For example, when the application control unit 132 of the receiving apparatus 30 activates the link (xlink) resolving application (script application) in step S13 depicted in FIG. 14, the receiving apparatus 30 acquires an application information table (AIT) associated with this application (script application), and performs an authentication process using the authentication information recorded in the AIT.

Only if the application (script application) is confirmed as an authorized application that has not been falsified by the authentication process, the link (xlink) resolving process to which the script application is applied can be carried out.

Note that, if the script application is not confirmed as an authorized application by the authentication process, then the execution of the application in the application control unit is canceled.

According to the present embodiment, as described above with reference to FIG. 17, authentication information for applications is recorded in the application information table (AIT).

An example in which a recording area for authentication information is set in an AIT will be described below with reference to FIG. 18.

Figure 18:
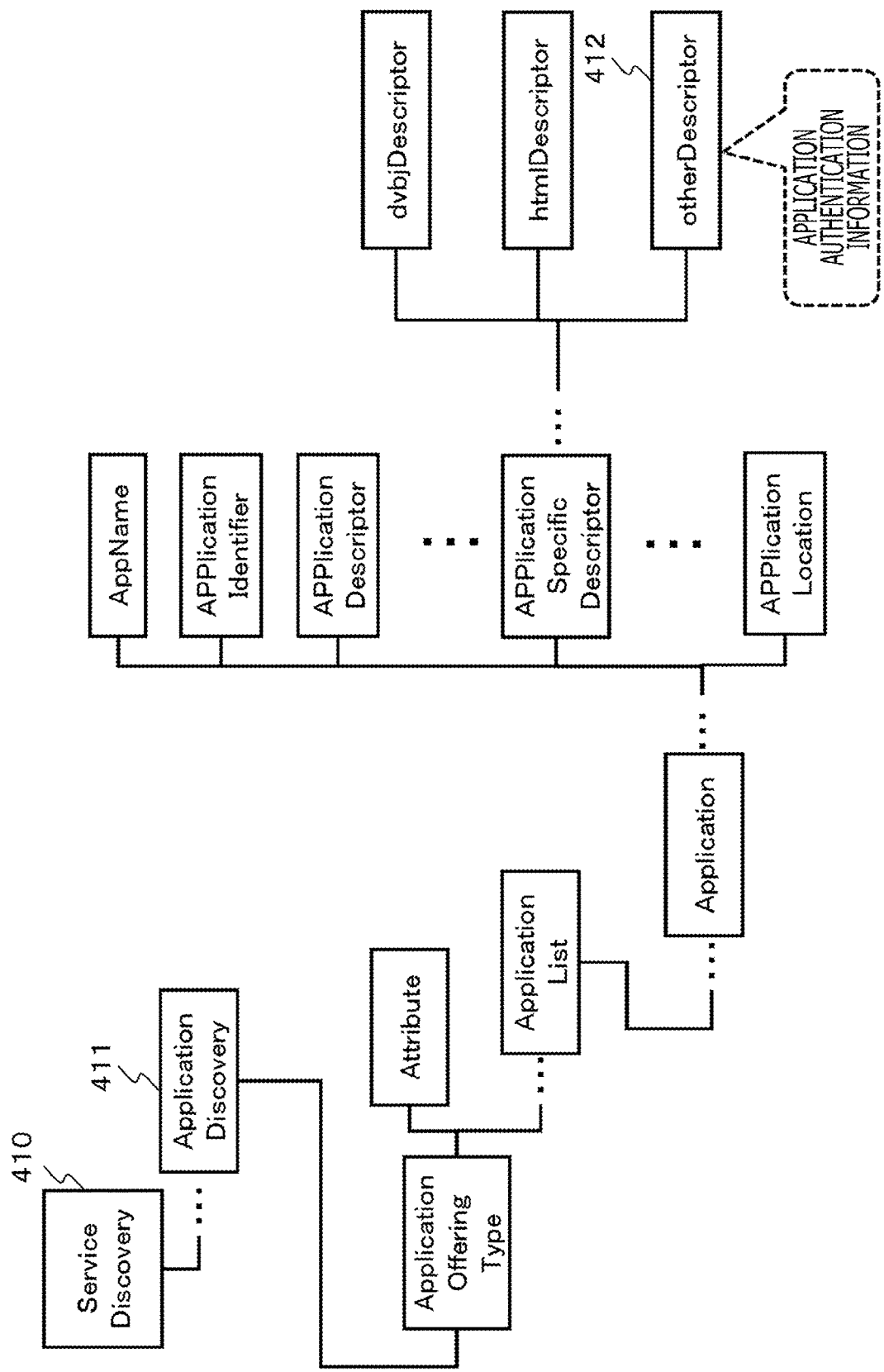
FIG. 18 is a diagram illustrative of the position where the authentication information is recorded in the application information table (AIT).

FIG. 18 is a diagram illustrative of the position where the authentication information is recorded in the application information table (AIT).

The application information table (AIT) is a component of signaling data, and is sent from the transmitting apparatus 20 to the receiving apparatus 30 as an XML document having a service discovery (ServiceDiscovery) element 410 depicted in FIG. 18 as a root element.

Attribute information and control information about applications are recorded in an application discovery element 411 or lower that is established as a lower-level element below the service discovery (ServiceDiscovery) element 410.

The authentication information is set in another identification information (otherDescriptor) element 412 or lower as depicted in FIG. 18, for example.

Specifically, a setting is made to record the authentication information in the following set position.

Below ServiceDescovery/mhp:ApplicationDescovery/mhp:ApplicationList/mhp:Application/mhp:applicationSpecificDescriptor/mh p:otherDescriptor, there is newly introduced an atsc:applicationAuthenticationInformation element which serves as an authentication information recording field.

The application information table (AIT) in which authentication information (ApplicationAuthenticationInformation) is thus set is provided as XML data to the receiving apparatus.

An example of data encoded as XML data is illustrated in FIG. 19 and below.

This example represents a data example of the application information table (AIT) including authentication information (ApplicationAuthenticationInformation).

```
<ServiceDescovery ...> ...
  <mhp:ApplicationDescovery ...> ...
  <mhp:ApplicationList ...> ...
  <mhp:Application ...> ...
  <mhp:applicationSpecificDescriptor ...> ...
  <mhp:otherDescriptor ...> ...
  <atsc:applicationAuthenticationInformation>
  <Signature>
  <Signedinfo>
    <CanonicalizationMethod
Algorithm="http://www.w3.org/TR/2001/REC-xml-c14n-
20010315#WithComments"/>
    <SignatureMethod
Algorithm="http://www.w3.org/2000/09/xmldsig#dsa-sha1"/>
    <Reference URI="http://a.com/app.xml">
    <Transforms><Transform
Algorithm="http://www.w3.org/TR/2001/REC-xml-c14n-
20010315#WithComments"/></Transforms>
    <DigestMethod
Algorithm="http://www.w3.org/2000/09/xmldsig#sha1"/>
    <DigestValue>60NvZvtdTB+7UnlLp/H24p7h4bs=</DigestValue>
    </Reference>
  </SignedInfo>
<SignatureValue>DpEylhQoiUKBoKWmYfajXO7LZxiDYgVtUtCNyTg
wZgoChzorA2nhkQ==</SignatureValue>
  </Signature>
  </atsc:applicationAuthenticationInformation> ...
  </mhp:otherDesctiptor> ...
  </mhp:applicationSpecificDescriptor> ...
</mhp:applicationLocation>http://a.com/app.xml</mhp:application
Location> ...
  </mhp:Application> ...
  </mhp:ApplicationList> ...
  </mhp:ApplicationDescovery> ...
</ServiceDescovery>
```

In the above data, the authentication information is an area of the data zone

"<Signature>~</Signature>."

Further, in the authentication information data, the data '<Reference URI="http://a.com/app.xml">' represent application identification information (reference URI) indicating an application to be authenticated.

Moreover, the data

"<DigestValue>60NvZvtdTB+7UnlLp/H24p7h4bs=</DigestValue>" represent a digest value (checking digest value) making up the authentication information.

Furthermore, the data

"<SignatureValue>DpEylhQoiUKBoKWmYfajX07LZxiDYgVtUtCNyT gwZgoChzorA2nhkQ==</SignatureValue>"

represent a signature. The signature is generated for makeup data of the authentication information except for a signature element, e.g., the data<SignedInfo>~</SignedInfo> in the above data.

The signature is carried out by applying a private key of the transmitting apparatus of a broadcasting station or the like that has performed the generation of the application information table (AIT), for example.

The signature verifying process is carried out using a public key that corresponds to the private key of the transmitting apparatus that has generated a signature value.

The receiving apparatus acquires the public key of the transmitting apparatus in advance, and performs the signature verifying process with the acquired public key.

Incidentally, the signature can also be generated using a common key cryptosystem. In this case, either of the generation and verification of the signature is carried out by applying a common key.

Figure 20:
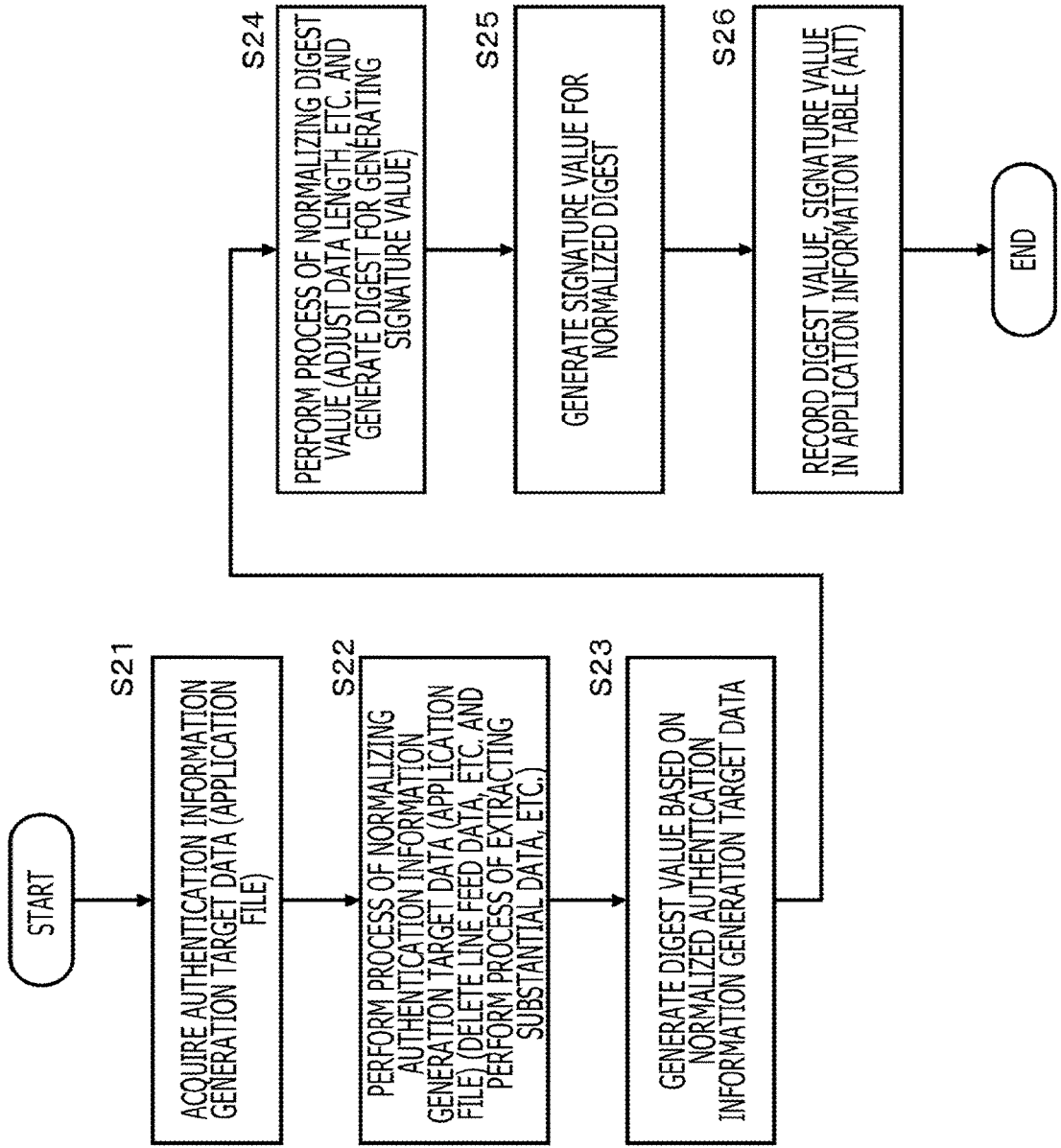
FIG. 20 is a flowchart illustrative of a processing sequence of the transmitting apparatus for recording the authentication information in the application information table (AIT).

A sequence of a process of generating authentication information and a process of recording data in an application information table (AIT), which are carried out in the transmitting apparatus, will be described below with reference to a flowchart depicted in FIG. 20.

(Step S21)

First, in step S21, a data processor of the transmitting apparatus acquires authentication information generation target data, i.e., an application file such as a link resolving application (script application).

(Step S22)

Next, in step S22, the data processor of the transmitting apparatus performs a process of normalizing the authentication information generation target data (application file), e.g., a normalizing process including a process of deleting line feed data and extracting substantial data and a process of adjusting a data length.

(Step S23)

Next, in step S23, the data processor of the transmitting apparatus generates a digest value based on the normalized authentication information generation target data.

For example, the data processor generates a digest value according to a process to which a predetermined hash value generating algorithm or the like is applied, for example.

(Step S24)

Next, in step S24, the data processor of the transmitting apparatus performs a process of normalizing the digest value, i.e., a process of adjusting a data length, thereby generating a digest for generating a signature value.

(Step S25)

Next, in step S25, the data processor of the transmitting apparatus generates a signature value with respect to the normalized digest.

For example, the signature is carried out by applying the private key of the transmitting apparatus of the broadcasting station or the like that has performed the generation of the application information table (AIT), for example.

(Step S26)

Next, in step S26, the data processor of the transmitting apparatus records authentication information including the generated digest value and signature value in the application information table (AIT).

Figure 21:
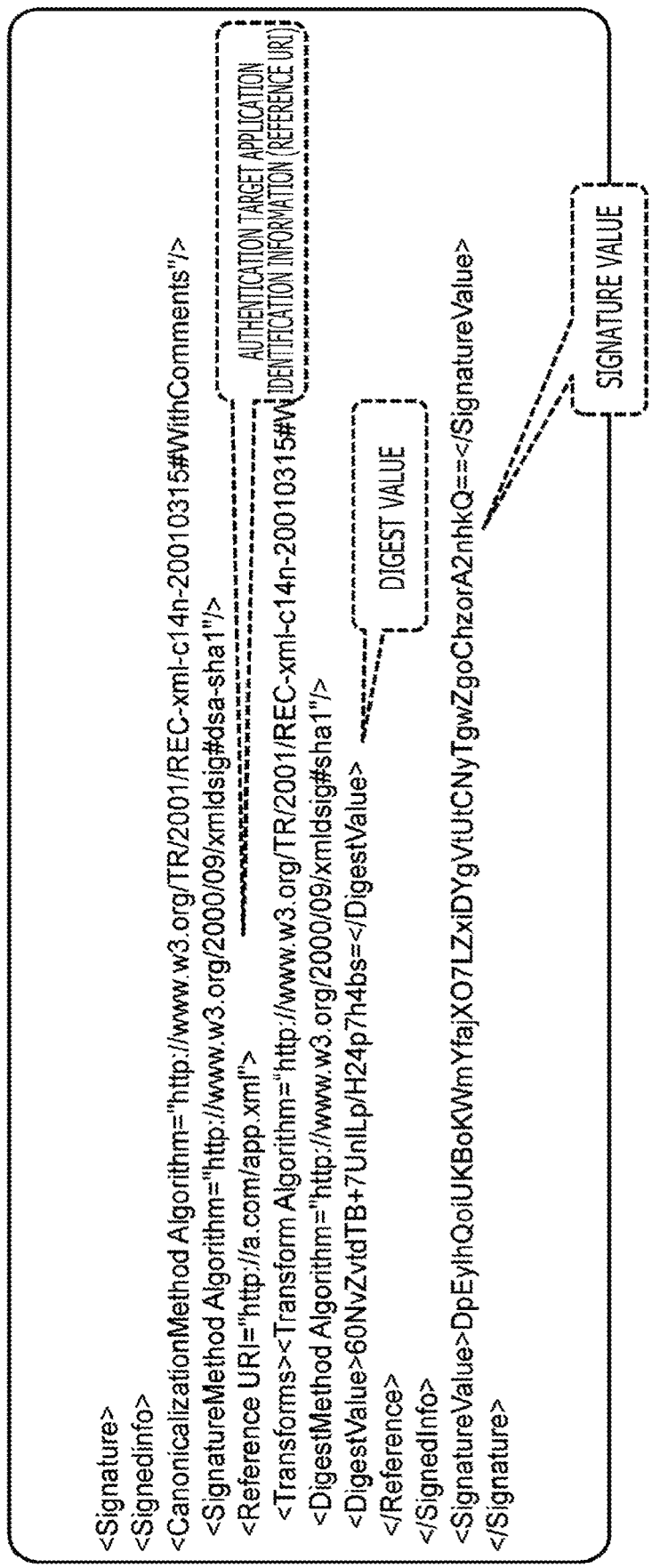
FIG. 21 is a diagram illustrative of an example of data of the authentication information recorded in the application information table (AIT).

An example of authentication information recorded in the application information table (AIT) is illustrated in FIG. 21. The authentication information depicted in FIG. 21 corresponds to part of the recorded data in the application information table (AIT) described above with reference to FIG. 19, i.e., the elements of <Signatuter>~</Signature>.

As depicted in FIG. 21, the authentication information includes the following information:

(a) authentication target application identification information (reference URI);

(b) a digest value; and (c) a signature value.

The makeup of the authentication information depicted in FIG. 21 will briefly be described below.

The Signature element is a root element of an XML signature.

The SignedInfo element is an element indicating a signature target and an algorithm to be used.

The CanonicalizationMethod element is an element indicating an algorithm for normalizing the SignedInfo element before a signature value is calculated.

The SignatureMethod element is an element indicating an algorithm for determining a signature value to be stored in the SignatureValue element from the normalized SignedInfo element.

The Reference element (list) is an element indicating a target resource to be signed with a URI.

The Transforms element is an element indicating a transformation process to be applied to a resource before a hash of a target resource to be stored as a value of the DigestValue element which is a field for recording a digest value is calculated.

The DigestMethod element is an element indicating a digest (hash) algorithm.

The DigestValue element is an element for storing a hash value of a target resource calculated by the hash algorithm indicated by the DigestMethod element.

The SinatureValue element is an element for storing a signature value after the SignedInfo element has been normalized by the algorithm indicated by the CanonicalizationMethod element.

Note that signature target data are the XML data described with reference to FIGS. 19 and 21, and the signature value is also recorded as XML data.

A signature of this type is called an XML signature.

An XML signature is an electronic signature added to various electronic data including an XML document. An XML signature that is added to electronic data including an electronic document serves to guarantee the integrity of the electronic data, and is effective to prevent impersonation and nonrepudiation.

When data are sent and received via a network such as Web sites and the Internet, the data may run the risk of being falsified by a third party while being sent and received. An XML signature is of such a setting that a digest value of electronic data is included in signature target data.

Verifying an XML signature added to data can examine whether the data have been falsified or not. Moreover, a comparison between a digest value (checking digest value) recorded in authentication information and a digest value (calculated digest value) newly calculated from verification target data (e.g., an application) is able to determine whether the verification target data (e.g., an application) have been falsified or not.

Kinds of XML signatures will be described below with reference to FIG. 22.

Figure 22:
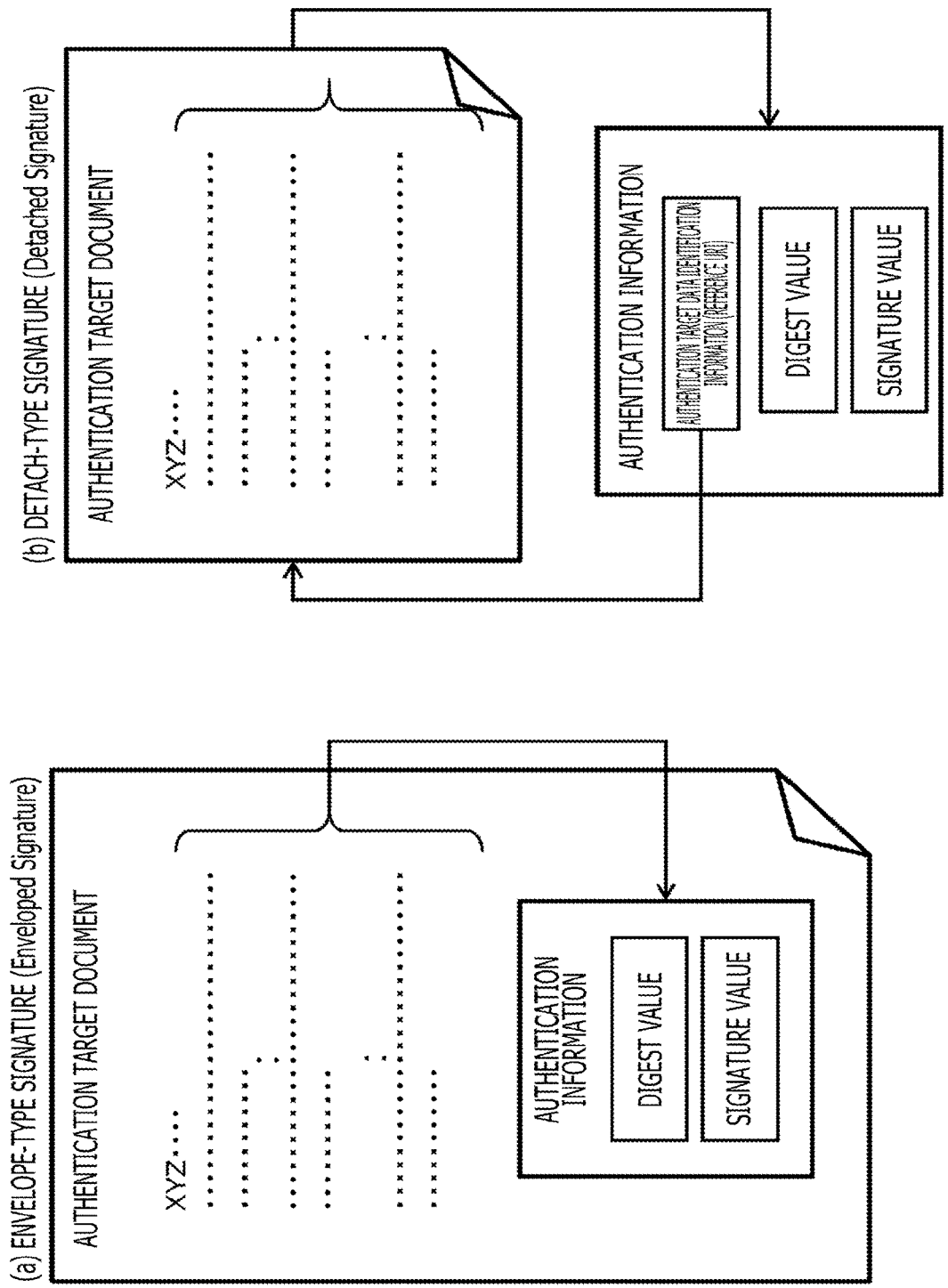
FIG. 22 is a diagram illustrative of an example of an SML signature.

As depicted in FIG. 22, XML signatures are available in these kinds:

(a) envelope-type signatures (Enveloped signatures, Enveloping signatures); and (b) detach-type signatures (Detached signatures).

(a) Envelope-type signatures are of a format in which authentication information is recorded in a document file to be authenticated.

(b) Detach-type signatures (Detached signatures) are of a format in which a document file to be authenticated and authentication information are detached from each other.

According to the present embodiment, authentication target data are an application, and authentication information is recorded in an application information table (AIT) separate from an application.

In other words, authentication target data may use the format of the detach-type signatures (Detached signatures) depicted in FIG. 22.

[9-2. About a Configuration and Sequence for Performing an Application Authentication Process to which the Application Information Table (AIT) is Applied]

Next, a configuration and sequence for performing an application authentication process to which the application information table (AIT) is applied will be described below.

Figure 23:
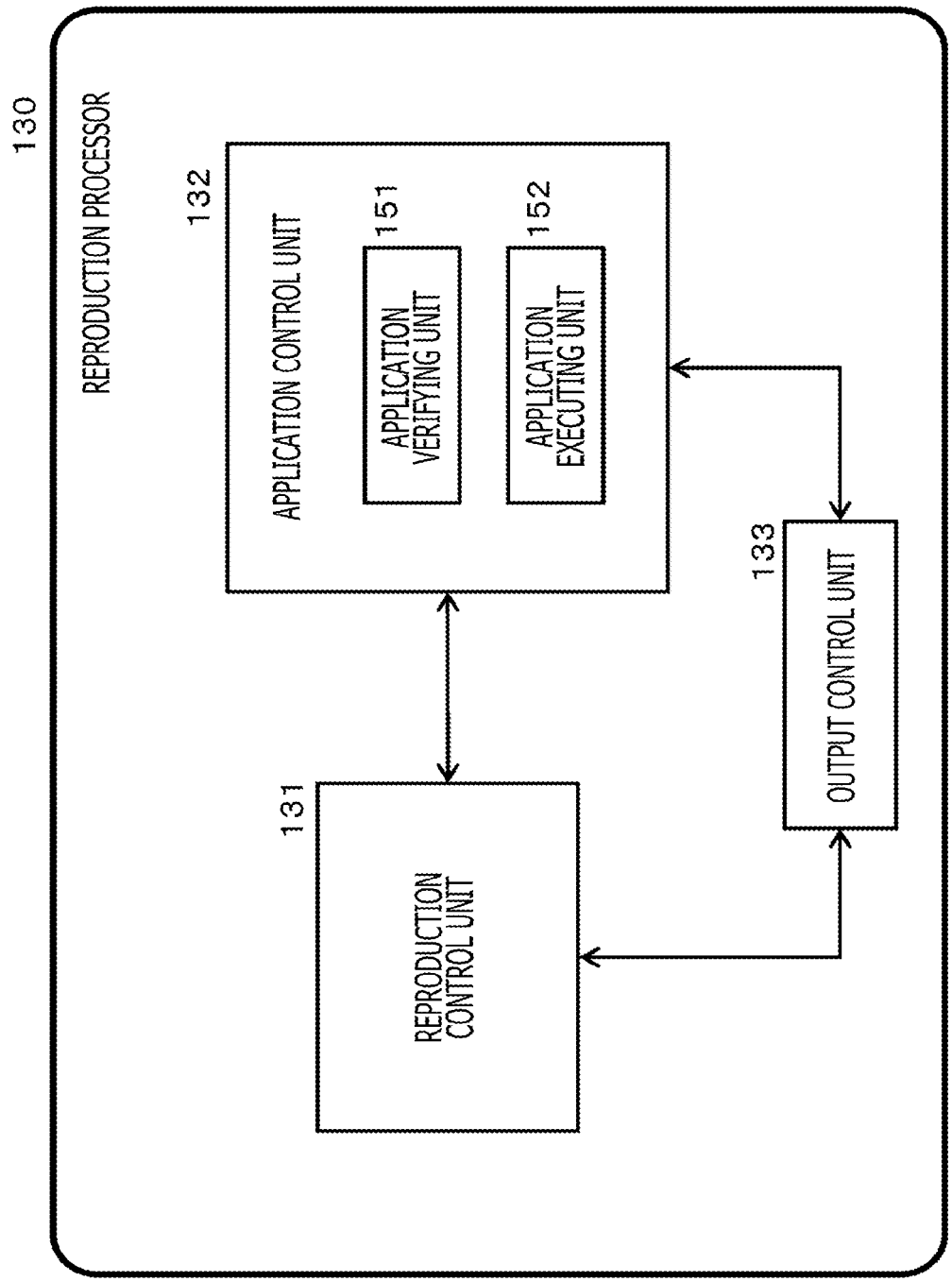
FIG. 23 is a diagram illustrative of a configurational example of the receiving apparatus in which an application verifying unit is set in an application control unit.

FIG. 23 is a diagram illustrative of a configurational example of the reproduction processor 130 of the receiving apparatus 30.

As described above with reference to FIG. 7, the receiving apparatus 30 has the components of the middleware 110, the proxy server 120, and the reproduction processor 130.

FIG. 23 depicts the arrangement of the reproduction processor 130 of the above components.

The reproduction processor has the reproduction control unit ((Embedded) Media Player) 131, the application control unit 132, and the output control unit 133.

As described above with reference to FIGS. 7 and 8, the reproduction control unit ((Embedded) Media Player) 131 performs an analysis of an MPD and performs a process of acquiring segments storing contents to be reproduced therein on the basis of the result of the analysis, for example.

The application control unit 132 controls the execution of an application provided from the transmitting apparatus 20.

The application control unit 132 also performs a process of analyzing an application information table (AIT) associated with the application.

The output control unit 133 acquires program makeup data and application execution data provided by the reproduction control unit 131 and the application control unit 132, and performs a process of decoding the acquired data, a process of outputting the decoded data to a display unit, etc.

As depicted in FIG. 23, the application control unit 132 has the components of an application verifying unit 151, and an application executing unit 152.

The application verifying unit 151 acquires authentication information recorded in an application information table (AIT) associated with an application to be executed, and performs a verifying process of determining whether the application is an authorized application that has not been falsified.

The application executing unit 152 executes only an application that has been determined as an authorized application that has not been falsified as the result of the verifying process carried out by the application verifying unit 151.

The application control unit 132 cancels the execution of an application that has not been determined as an authorized application that has not been falsified as the result of the verifying process carried out by the application verifying unit 151.

Figure 24:
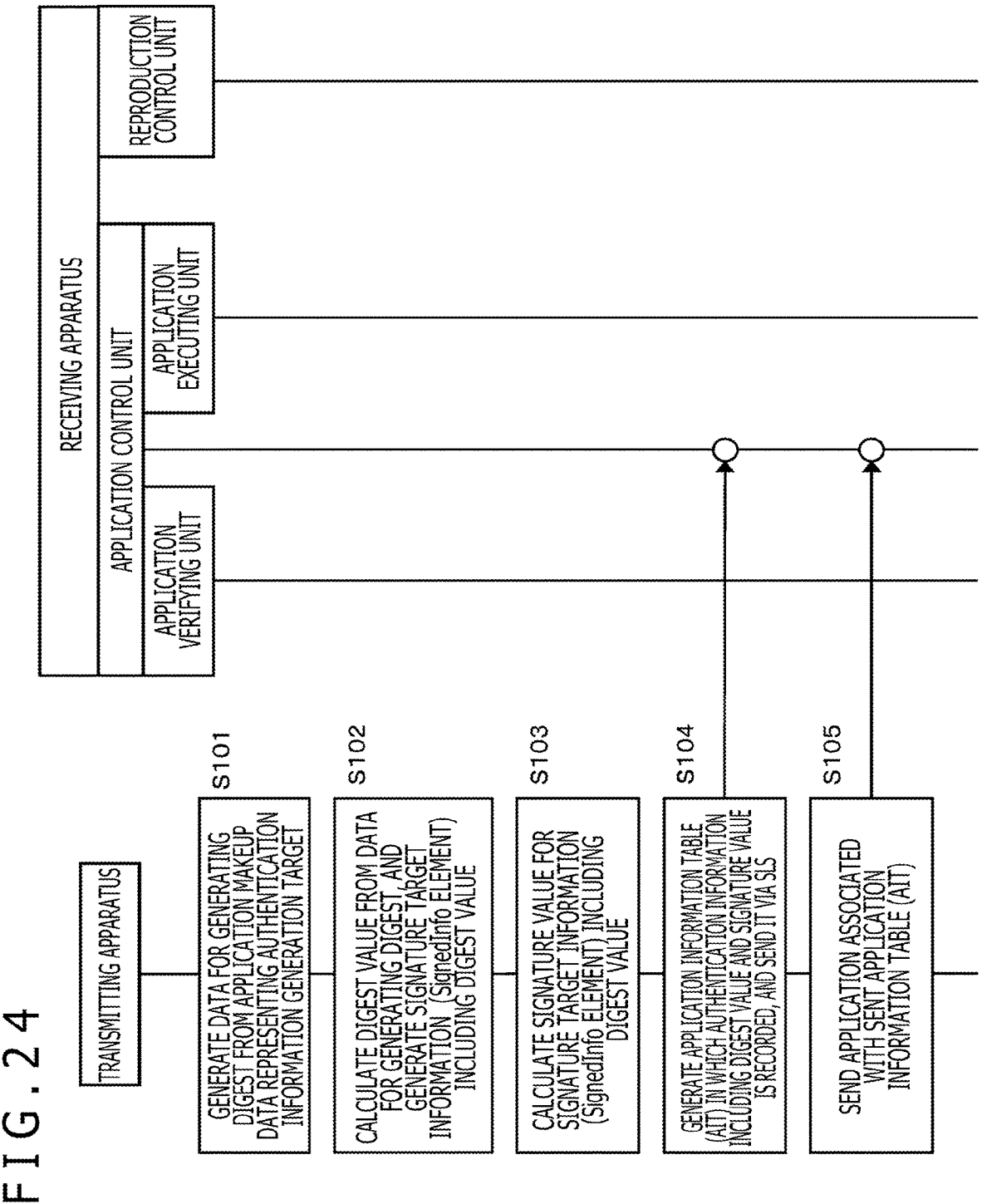
FIG. 24 is a diagram illustrative of a processing sequence using the authentication information in the application information table (AIT).
Figure 25:
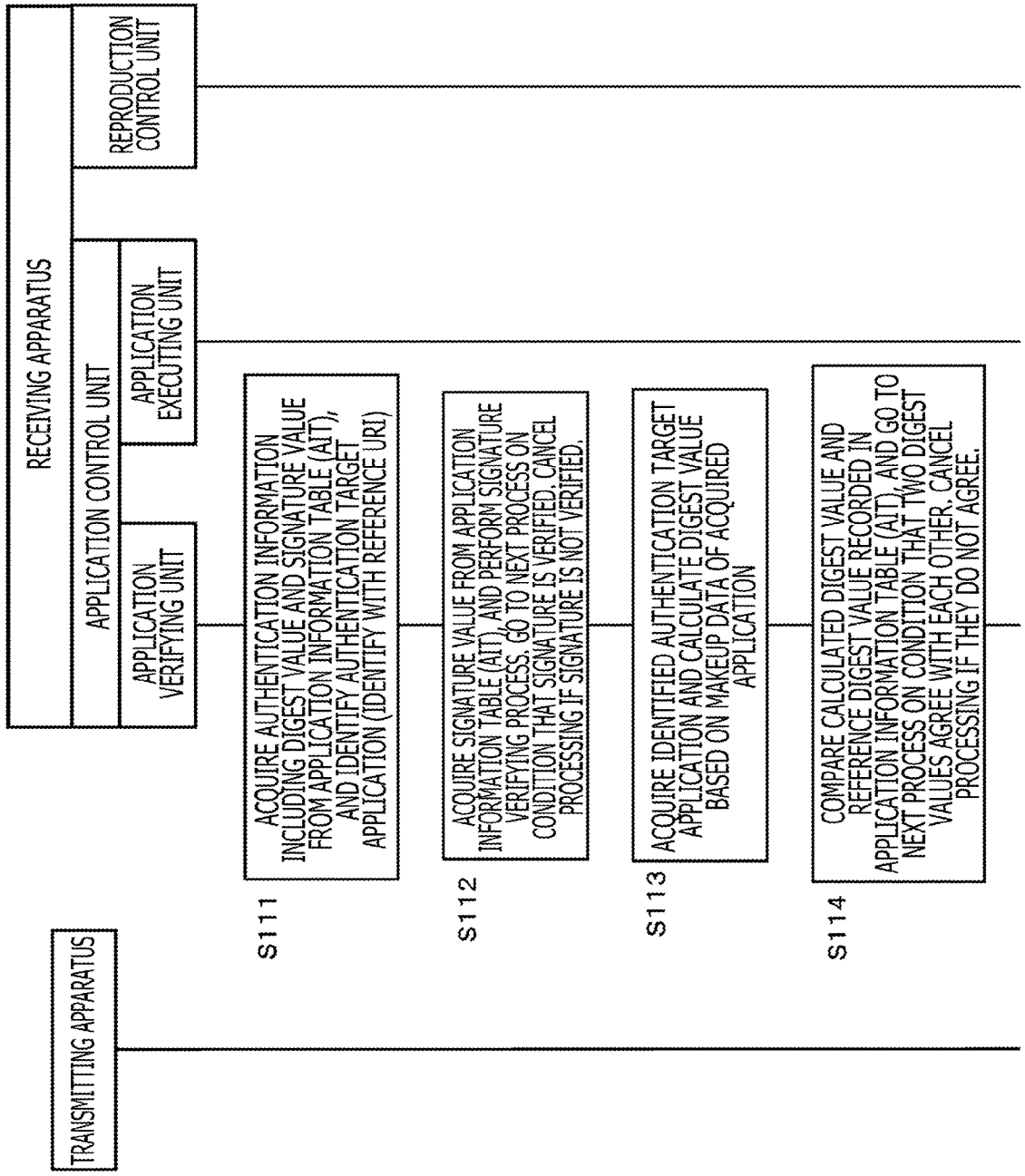
FIG. 25 is a diagram illustrative of a processing sequence using the authentication information in the application information table (AIT).
Figure 26:
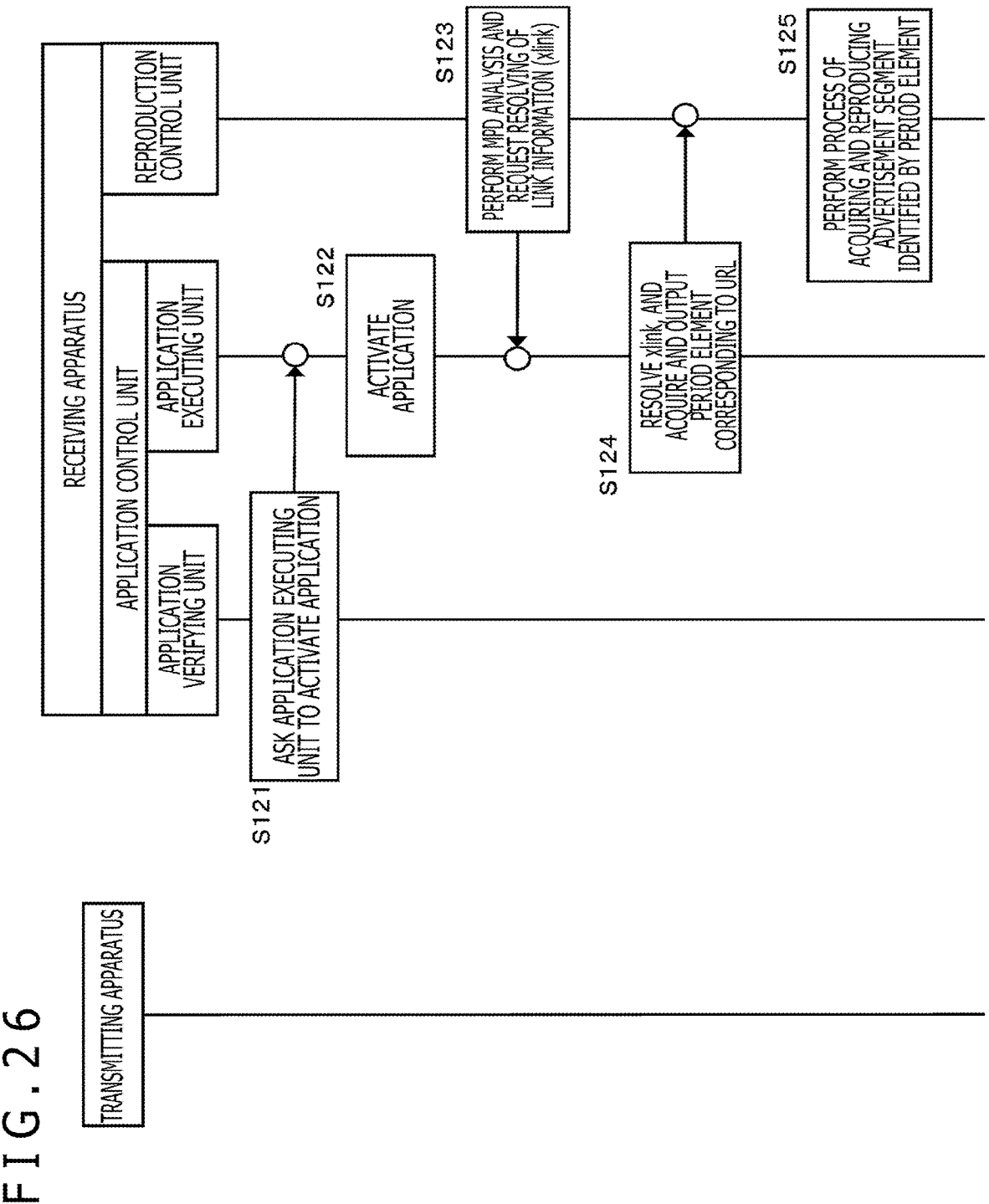
FIG. 26 is a diagram illustrative of a processing sequence using the authentication information in the application information table (AIT).

Next, a processing sequence which includes the generation of an application information table (AIT) in which authentication information is recorded in the transmitting apparatus and the transmission of an application and the application information table (AIT) by the transmitting apparatus, and the verification of the application using authentication information in the AIT in the receiving apparatus and the execution of the application in the receiving apparatus will be described below with reference sequence diagrams depicted in FIGS. 24 through 26.

FIGS. 24 through 26 depict various apparatus and components given below, from the left:

(a) the transmitting apparatus 20;

(b) the application verifying unit 151 as a component of the receiving apparatus 30;

(c) the application executing unit 152 as a component of the receiving apparatus 30; and (d) the reproduction control unit 131 as a component of the receiving apparatus 30.

The processing operations of respective steps depicted in FIGS. 24 through 26 will be described below.

(Step S101)

The processing operations of steps S101 through S105 are processing operations carried out by the transmitting apparatus 20.

Specifically, they represent a sequence which includes the generation of an application information table (AIT) in which authentication information is recorded in the transmitting apparatus 20 and the transmission of an application and the application information table (AIT) by the transmitting apparatus.

First, in step S101, the data processor of the transmitting apparatus acquires authentication information generation target data, e.g., an application file such as a link resolving application (script application) or the like, performs a process of normalizing the authentication information generation target data (application file), e.g., a normalizing process including a process of deleting line feed data, etc. and extracting substantial data and a process of adjusting a data length, thereby generating digest generating data.

(Step S102)

Next, in step S102, the data processor of the transmitting apparatus generates a digest value based on the digest generating data generated in step S101.

For example, the data processor generates a digest value according to a process to which a predetermined hash value generating algorithm or the like is applied, for example.

Moreover, the data processor generates signature target information (SignedInfo element) including the calculated digest value.

Specifically, this is a process of generating makeup data of <SignedInfo>~</SignedInfo> in the authentication information depicted in FIG. 21, for example.

(Step S103)

Next, in step S103, the data processor of the transmitting apparatus carries out a signature for the signature target information (SignedInfo element) including the calculated digest value.

The signature is carried out by applying a private key of the transmitting apparatus of a broadcasting station or the like that performs the generation of the application information table (AIT), for example.

(Step S104)

Next, in step S104, the data processor of the transmitting apparatus records authentication information including the generated digest value and signature value in the application information table (AIT), and sends the generated AIT using SLS (Service Layer Signaling) as signaling data.

As described above, the SLS (Service Layer Signaling) represents signaling data for the ATSC3.0 service layer, and is used to send AIT, USBD/USD, S-TSID, MPD, etc.

Note that, in the present embodiment, this application information table (AIT) is an AIT in which attribute information and control information of a link resolving application (script application (ScriptApp)) for carrying out a link resolving process, for example, are recorded.

(Step S105)

Next, in step S105, the data processor of the transmitting apparatus sends an application associated with the sent application information table (AIT), e.g., a link resolving application (script application (ScriptApp)) for carrying out a link resolving process.

The description of the processing operation of the transmitting apparatus 20 is now finished, and then the processing operation of the receiving apparatus 30 will be described below with reference to FIGS. 25 and 26.

(Step S111)

The processing operations of steps S111 through S114 depicted in FIG. 25 are processing operations carried out by the application verifying unit 151 set in the application control unit 132 of the reproduction processor 130 of the receiving apparatus 30.

First, the application verifying unit 151 of the receiving apparatus 30 acquires the authentication information including the digest value and the signature value from the application information table (AIT) received from the transmitting apparatus 20 in step S111. Furthermore, the application verifying unit 151 identifies an authentication target application.

Note that the process of identifying an authentication target application is performed on the basis of the authentication target application identification information (reference URI) recorded in the authentication information of the AIT, e.g., the authentication target application identification information (reference URI) recorded in the authentication information of the AIT described with reference to FIGS. 19 and 21.

(Step S112)

Next, in step S112, the application verifying unit 151 of the receiving apparatus 30 acquires the signature value from the application information table (AIT), and performs a signature verifying process.

If the signature is generated using a public key cryptosystem, for example, then the signature verifying process is carried out using a public key corresponding to the private key of the transmitting apparatus 20 which has generated the signature value.

If the signature is generated using a common key cryptosystem, then the signature verifying process is carried out by applying a common key.

If the signature is verified in step S112, and the authentication information is confirmed as authorized authentication information that has not been falsified, then control goes to a next processing operation.

If the signature is not verified, then subsequent processing operations are canceled.

In this case, the execution of the application associated with the application information table (AIT) is also canceled.

(Step S113)

Next, in step S113, the application verifying unit 151 of the receiving apparatus 30 acquires the authentication target application identified in step S111.

Specifically, the application verifying unit 151 acquires the authentication target application identified according to the authentication target application identification information (reference URI) recorded in the authentication information of the AIT, and calculates a digest value based on the makeup data of the acquired application.

(Step S114)

Next, in step S114, the application verifying unit 151 of the receiving apparatus 30 compares the calculated digest value calculated from the authentication target application in step S113 and the checking digest value recorded in the application information table (AIT).

If the two digest values agree with each other, then the application verifying unit 151 decides that the authentication target application is an authorized application that has not been falsified. Control then goes to a next processing operation on the condition that such a decision is made.

If the two digest values do not agree with each other, then the application verifying unit 151 decides that the authentication target application is an unauthorized application that has been falsified. If such a decision is made, then subsequent processing operations are canceled.

In this case, the execution of the application associated with the application information table (AIT) is also canceled.

(Step S121)

The processing operations of steps S121 through S125 depicted in FIG. 26 are carried out only if the application authentication based on the authentication information recorded in the application information table (AIT) is established, i.e., only if the application associated with the AIT is decided as an authorized application that has not been falsified, in the processing sequence of the application verifying unit 151 described with reference to FIG. 25.

If the application authentication is established in steps S111 through S114 is established and the application associated with the AIT is decided as an authorized application that has not been falsified, then the application verifying unit 151 of the receiving apparatus 30 requests the application executing unit 152 to activate the application in step S121.

The activation request target application is the application on which the authentication process based on the authentication information recorded in the AIT has been performed and which has been authenticated.

In the present example, the authentication target application is a link resolving application (ScriptApp) for carrying out a link (xlink) resolving process, and the application verifying unit 151 requests the application executing unit 152 to activate the link resolving application (ScriptApp).

(Step S122)

Next, in step S122, the application executing unit 152 of the receiving apparatus 30 activates the application which it has been requested to activate by the application verifying unit 151.

The application executing unit 152 performs a process of activating the link resolving application (ScriptApp) which has been verified as an authorized application.

(Step S123)

Step S123 represents a processing operation of the reproduction control unit of the receiving apparatus.

The reproduction control unit 131 of the receiving apparatus 30 acquires the MPD sent by the transmitting apparatus 20 and performs an analysis of the acquired MPD.

Note that the MPD is received by the middleware of the receiving apparatus 30, stored in the cache unit of the proxy server, and thereafter acquired from the cache unit by the reproduction control unit 131.

In step S123, the reproduction control unit 131 of the receiving apparatus 30 acquires the link information (xlink) recorded in the advertisement-compatible period information of the MPD, i.e., the link information (xlink) having the user information setting field, and sets the user information (parameter) in the user information setting field.

The user information that is set may be user information registered (recorded) in advance in the storage unit of the receiving apparatus 30, or may be user-input information input by the user from time to time.

The reproduction control unit 131 of the receiving apparatus 30 outputs the data in which the user information (parameter) is set in the user information setting field, to the application executing unit 152 that executes the link resolving application (script), and requests the application executing unit 152 to analyze the link information (xlink) (to resolve the link).

The requesting process is carried out as an HTTP-GET request, for example.

(Step S124)

The processing operation of step S124 is a processing operation of the application executing unit 152 of the receiving apparatus 30.

The application executing unit 152 executes the link resolving application (ScriptApp) which has been verified as an authorized application, thereby performing a link resolving process.

Specifically, the application executing unit 152 analyzes the user information (parameter) setting URL input from the reproduction control unit 131, acquires period information (period element) corresponding to the user information, and outputs the extracted period information to the reproduction control unit 131.

The output process is carried out as an HTTP-response, for example.

This period information (period element) is period information (period element) depending on the user information (parameter) set by the reproduction control unit 131 in step S123, and period information (period element) in which access information for optimum advertisement contents (advertisement segment URL) to be provided to a particular user selected by the set user information (age, Location, etc.), etc. is recorded.

(Step S125)

Finally, the reproduction control unit 131 of the receiving apparatus 30 reads and analyzes the recorded information of the period information (period element) acquired from the application executing unit 152 in step S125.

The reproduction control unit 131 acquires an advertisement segment file storing advertisement contents therein, using the access information for optimum advertisement contents (advertisement segment URL) included in the recorded information of the period information (period element), and outputs the acquired advertisement segment file via the output unit, such as a display unit, a speaker, etc., of the receiving apparatus 30.

Note that control information such as a decoding mode, an output time period, etc. of the advertisement contents has been recorded in the period information (period element), and the reproduction control unit carries out a process of outputting the advertisement contents by performing a process according to the information recorded in the period information (period element).

The advertisement contents output to the receiving apparatus 30 represent an advertisement selected depending on the user information set by the reproduction control unit 131 in step S123, and a user-targeted advertisement mainly targeted on a user selected according to user's (viewer's) characteristics such as user's age, domicile, etc., for example.

In this fashion, it is possible to select a proper advertisement depending on the user information representing each user's attributes, e.g., user's gender, age, domicile, etc., for example, and provide the selected advertisement to the user, by executing the link resolving application which has been confirmed as authorized by the authentication process carried out by the application verifying unit 151.

10. (Embodiment 2) about a Configuration for Performing an Application Authentication Process to which Application Authentication Information Recorded in an MPD (Media Presentation Description) is Applied Next, a configuration for performing an application authentication process to which application authentication information recorded in an MPD (media presentation description (Media Presentation Description)), which is one of signaling data sent to the receiving apparatus 30 by the transmitting apparatus 20, is applied according to Embodiment 2 of the present disclosure will be described below.

[10-1. About a Way in which Authentication Information is Recorded in the MPD]

First, a way in which the authentication information is recorded in the MPD will be described below.

The transmitting apparatus 20 sends an application to be executed by the receiving apparatus 30 to the receiving apparatus 30, and also provides the receiving apparatus 30 with various signaling data in which access information for the sent application and attribute information, control information of the application are recorded.

As described above, the signaling data that the transmitting apparatus 20 provides to the receiving apparatus 30 include the following data, for example:

(1) USBD/USD (User Service Bundle Description/User Service Description);

(2) S-TSID (Service based Transport Session Description); and (3) application information table (AIT: Application Information Table).

A USD includes information per predetermined service unit such as a broadcasting station or a program, for example, and includes information required to use a service in the receiving apparatus, such as access information (URL or the like) for receiving the service, codec information, reproduction timing information, etc. A USBD represents a bundle of USDs. Both a USD and a USBD are signaling data storing identical control information therein.

The USD includes various kinds of control information. Representative control information is an MPD (media presentation description (Media Presentation Description)) which is signaling data having manifest files that store therein various guide information and control information corresponding to contents (AV segments).

As described above with reference to FIGS. 7 and 8, the reproduction control unit ((Embedded) Media Player) 131 of the receiving apparatus 30 performs a process of acquiring segments storing contents to be reproduced by analyzing an MPD.

The format of the MPD has been described above with reference to FIGS. 9 through 13.

For example, as described above with reference to FIG. 9, the MPD is able to describe information of attributes or the like and control information in units of various prescribed ranges indicated below, for each of streams of image and sound:

(1) a period (Period) that prescribes zones on a time axis;

(2) an adaptation (Adaptation) that prescribes data kinds of image and sound, etc.;

(3) a representation (Representation) that prescribes image types, sound types; and (4) a segment info (SegmentInfo) as an information recording area in units of segments (AV segments) of image and sound.

According to Embodiment 2, authentication information about an application associated with the MPD is stored in the MPD.

Figure 27:
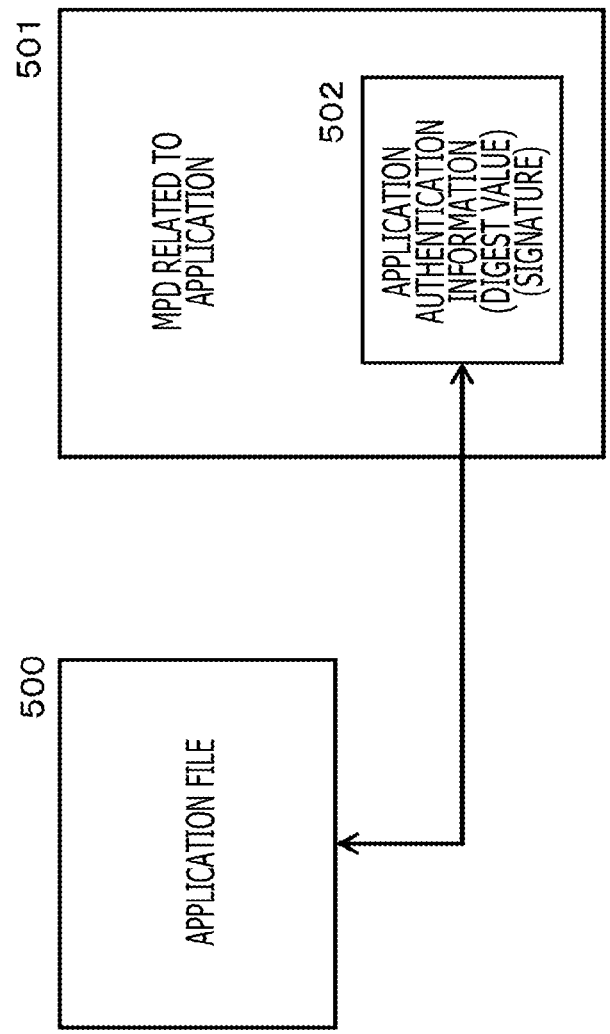
FIG. 27 is a diagram illustrative of a configurational example in which authentication information of an application is recorded in the MPD.

As depicted in FIG. 27, application authentication information 502 is recorded in an MPD 501 associated with an application 500.

Note that the identification information (reference URL) of an application to be authenticated is recorded in the MPD, and one application and the MPD that has recorded therein its authentication information are associated with each other.

The application authentication information 502 includes a digest value (checking digest value) generated on the basis of makeup data of the application 500 to be authenticated, and a signature generated on the basis of authentication information makeup data including the digest value.

Before executing the application 500, the receiving apparatus 30 performs an authentication process to which the authentication information recorded in the MPD 501 associated with the application 500 is applied.

Specifically, the receiving apparatus 30 performs a signature verifying process in the authentication information 502. If a signature is verified, then the receiving apparatus 30 performs a process of confirming an agreement between a calculated digest value that is newly calculated on the basis of the application 500 to be executed which is to be verified, and a checking digest value recorded in the authentication information 502.

Only if the application 500 is confirmed as an authorized application that has not been falsified by the authentication process, the execution of the application associated 500 with the MPD 501 is permitted.

For example, when the application control unit 132 of the receiving apparatus 30 activates a link (xlink) resolving application (script application), the receiving apparatus 30 performs an authentication process using the authentication information recorded in the MPD associated with the application (script application).

Only if the application (script application) is confirmed as an authorized application that has not been falsified by the authentication process, the link (xlink) resolving process to which the script application is applied can be carried out.

Note that, if the script application is not confirmed as an authorized application by the authentication process, then the execution of the application in the application control unit is canceled.

According to the present embodiment, as described above with reference to FIG. 27, authentication information for applications is recorded in the MPD.

An example in which a recording area for authentication information is set in an MPD will be described below with reference to FIG. 28 and subsequent figures.

FIG. 28 is a diagram illustrative of an example of the position where the authentication information is recorded in the MPD.

In the example depicted in FIG. 28, authentication information, i.e., a Signature element, is set at a level lower than an MPD element.

As depicted in FIG. 28, the authentication information is recorded in another element (Other) 511 set at a level lower than an MPD element 510, for example.

The MPD with the authentication information (ApplicationAuthenticationInformation) thus set therein is provided to the receiving apparatus.

An example of XML data of an MPD including authentication information is illustrated in FIG. 29 and below.

```
<MPD..id="12345">..
  <Period..>..
    <AdaptationSet>..
    </AdaptationSet>..
  </Period>..
  <Period..>..
    <AdaptationSet>..
    </AdaptationSet>..
```

-continued

```
  </Period>..
  <Signature>
    <SignedInfo>
      <CanonicalizationMethod
Algorithm="http://www.w3.org/TR/2001/REC-xml-c14n-
20010315#WithComments"/>
      <SignatureMethod
Algorithm="http://www.w3.org/2000/09/xmldsig#dsa-sha1"/>
      <Reference URI="http://a.com/app.xml">
        <Transforms><Transform
Algorithm="http://www.w3.org/TR/2001/REC-xml-c14n-
20010315#WithComments"/></Transforms>
        <DigestMethod
Algorithm="http://www.w3.org/2000/09/xmldsig#sha1"/>
        <DigestValue>60NvZvtdTB+7UnlLp/H24p7h4bs=</DigestValue>
      </Reference>
      <Reference id="#12345">
        <Transform
Algorithm="http://www.w3.org/2000/09/xmldsig#enveloped-
signature">
        <DigestMethod
Algorithm="http://www.w3.org/2000/09/xmldsig#sha1"/>
        <DigestValue>60NvtvtdTB+7UnlLp/H14p7h4bs=</DigestValue>
      </Reference>
    </SignedInfo>
    <SignatureValue>DpEylhQoiUKBoKWmZfajXO7LZxiDYgVtUtCNyTg
wZgoChzorA2nhkQ==</SignatureValue>
  </Signature>
</MPD>
```

In the above data, the authentication information is an area of the data zone "<Signature>~</Signature>."

Further, in the authentication information data, the data '<Reference URI="http://a.com/app.xml">' represent application identification information (reference URI) indicating an application to be authenticated.

Moreover, the data '<Reference id="12345">' represent the identification information (ID) of the MPD.

Furthermore, the data "<DigestValue>60NvZvtdTB+7UnlLp/H24p7h4bs=</DigestValue>" represent a digest value (checking digest value) making up the authentication information.

In addition, the data

"<SignatureValue>DpEylhQoiUKBoKWmYfajXO7LZxiDYgVtUtCNyT gwZgoChzorA2nhkQ==</SignatureValue>"

represent a signature. The signature is generated for makeup data of the authentication information except for a signature element, e.g., the data<SignedInfo>~</SignedInfo> in the above data.

The signature is carried out by applying a private key of the transmitting apparatus of a broadcasting station or the like that has performed the generation of the MPD, for example.

The signature verifying process is carried out using a public key that corresponds to the private key of the transmitting apparatus that has generated a signature value.

The receiving apparatus acquires the public key of the transmitting apparatus in advance, and performs the signature verifying process with the acquired public key.

Incidentally, the signature can also be generated using a common key cryptosystem. In this case, either of the generation and verification of the signature is carried out by applying a common key.

Figure 30:
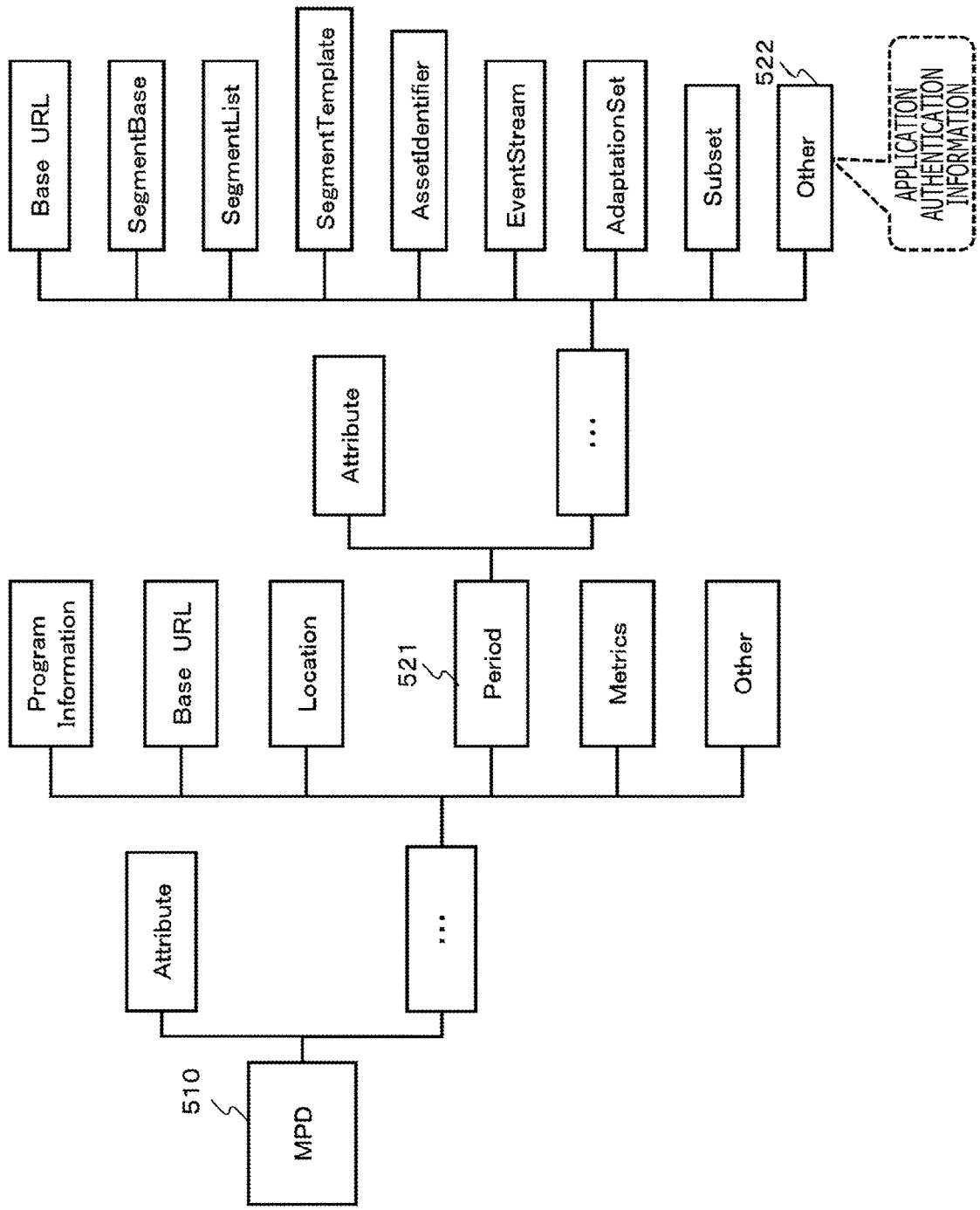
FIG. 30 is a diagram illustrative of the position where the authentication information is recorded in the MPD.

FIG. 30 is a diagram illustrative of a second example of the position where the authentication information is recorded in the MPD.

In the example depicted in FIG. 30, authentication information, i.e., a Signature element, is set in a period (Period) element at a level lower than an MPD element.

As depicted in FIG. 30, the authentication information is recorded in another element (other) 522 set at a level lower than a period (Period) element 521 that is set at a level lower than an MPD element 510.

The MPD with the authentication information (ApplicationAuthenticationInformation) thus set at a level lower than the period element may be provided to the receiving apparatus.

An example of XML data of an MPD including authentication information is illustrated in FIG. 31 and below.

```
<MPD..>..
  <Period..>..
    <AdaptationSet>..
    </AdaptationSet>..
  </Period>..
  <Period..xlink:href='http://a.com/adp-1' id="45678">..
    <AdaptationSet>..
    </AdaptationSet>..
    <Signature>
    <SignedInfo>
    <CanonicalizationMethod
Algorithm="http://www.w3.org/TR/2001/REC-xml-c14n-
20010315#WithComments"/>
    <SignatureMethod
Algorithm="http://www.w3.org/2000/09/xmldsig#dsa-sha1"/>
      <Reference URI="http://a.com/app.xml">
      <Transforms><Transform
Algorithm="http://www.w3.org/TR/2001/REC-xml-c14n-
20010315#WithComments"/></Transforms>
      <DigestMethod
Algorithm="http://www.w3.org/2000/09/xmldsig#sha1"/>
      <DigestValue>60NvZvtdTB+7UnlLp/H24p7h4bs=</DigestValue>
      </Reference>
      <Reference id="#45678">
      <Transform
Algorithm="http://www.w3.org/2000/09/xmldsig#enveloped-
signature">
      <DigestMethod
Algorithm="http://www.w3.org/2000/09/xmldsig#sha1"/>
      <DigestValue>60NvtvtdTB+7UnlLp/H14p7h4bs=</DigestValue>
      </Reference>
    </Signedinfo>
<SignatureValue>DpEylhQoiUKBoKWmZfajXO7LZxiDYgVtUtCNyTg
wZgoChzorA2nhkQ==</SignatureValue>
    </Signature>
  </Period>..
</MPD>
```

In the above data, the authentication information is an area of the data zone "<Signature>~</Signature>."

Further, in the authentication information data, the data

'<Reference URI="http://a.com/app.xml">' represent application identification information (reference URI) indicating an application to be authenticated.

Moreover, the data

'<Reference id="#45678">' represent the identification information (ID) of one period of the MPD in which the authentication information is recorded.

Furthermore, the data

"<DigestValue>60NvZvtdTB+7UnlLp/H24p7h4bs=</DigestValue>"

represent a digest value (checking digest value) making up the authentication information.

In addition, the data

```
"<SignatureValue>DpEylhQoiUKBoKWmYfajXO7LZxiDYgVtUtCNyT
gwZgoChzorA2nhkQ==</SignatureValue>"
``` represent a signature. The signature is generated for makeup data of the authentication information except for a signature element, e.g., the data<SignedInfo>~</SignedInfo> in the above data.

The signature is carried out by applying a private key of the transmitting apparatus of a broadcasting station or the like that has performed the generation of the MPD, for example.

The signature verifying process is carried out using a public key that corresponds to the private key of the transmitting apparatus that has generated a signature value.

The receiving apparatus acquires the public key of the transmitting apparatus in advance, and performs the signature verifying process with the acquired public key.

Incidentally, the signature can also be generated using a common key cryptosystem. In this case, either of the generation and verification of the signature is carried out by applying a common key.

As with the authentication information recorded in the AIT described above, the components of the authentication information recorded in the MPDs depicted in FIGS. 29 and 31 include the following information:

(a) authentication target application identification information (reference URI);

(b) a digest value; and (c) a signature value.

In addition, the similar data to the data described above with reference to FIG. 21, e.g., data of a signature algorithm, a normalizing algorithm, a digest value generating algorithm, etc., are recorded.

Note that the XML signatures described above with reference to FIG. 22 are used for the signature.

As depicted in FIG. 22, XML signatures are available in these types:

(a) envelope-type signatures (Enveloped signatures, Enveloping signatures); and (b) detach-type signatures (Detached signatures).

[10-2. About a Configuration and Sequence for Performing an Application Authentication Process to which the MPD is Applied]

Next, a configuration and sequence for performing an application authentication process to which the MPD is applied will be described below.

Figure 32:
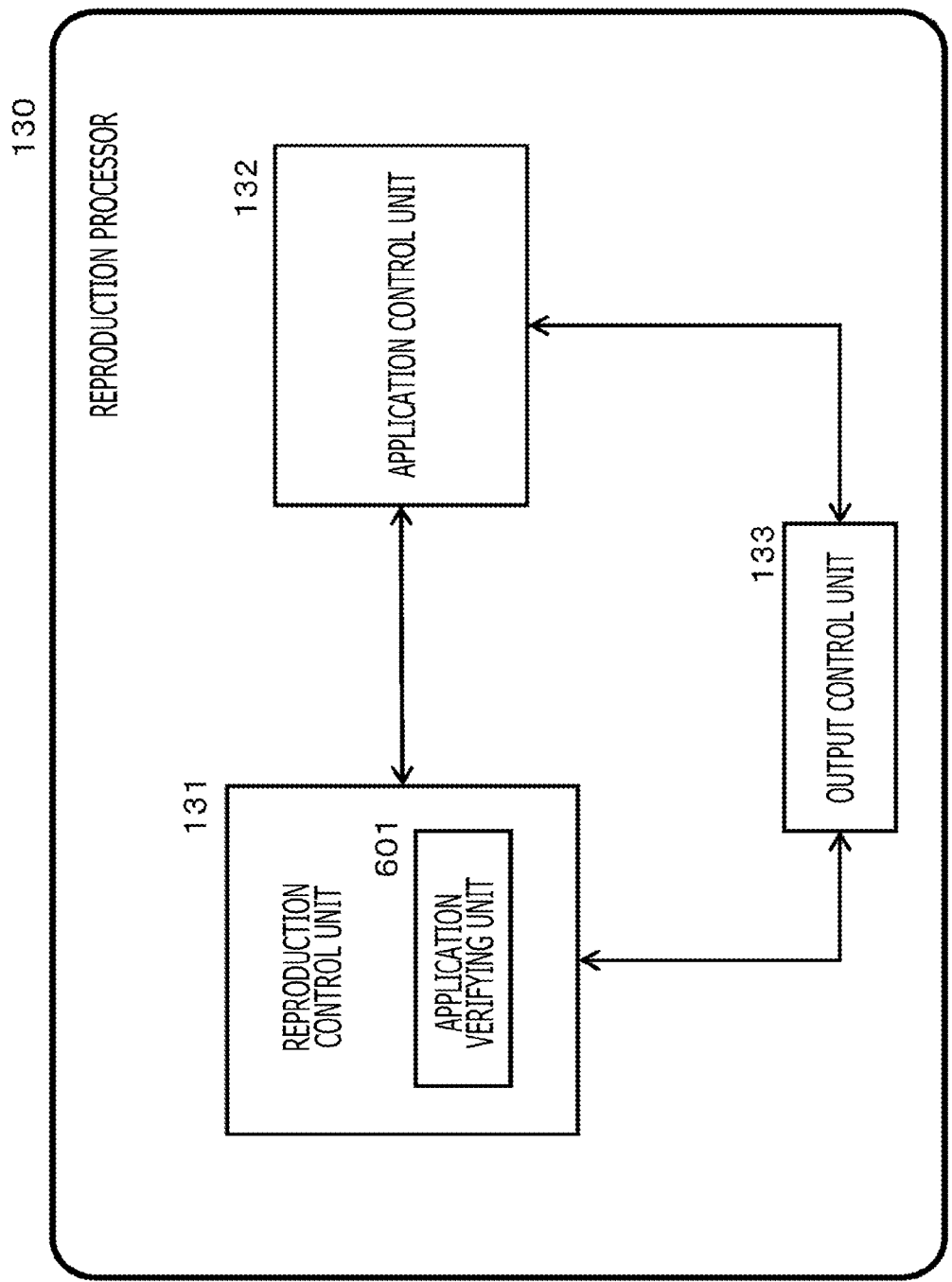
FIG. 32 is a diagram illustrative of a configurational example of the receiving apparatus in which an application verifying unit is set in a reproduction control unit.

FIG. 32 is a diagram illustrative of a configurational example of the reproduction processor 130 of the receiving apparatus 30.

As described above with reference to FIG. 7, the receiving apparatus 30 has the components of the middleware 110, the proxy server 120, and the reproduction processor 130.

FIG. 32 depicts the arrangement of the reproduction processor 130 of the above components.

The reproduction processor has the reproduction control unit ((Embedded) Media Player) 131, the application control unit 132, and the output control unit 133.

As described above with reference to FIGS. 7 and 8, the reproduction control unit ((Embedded) Media Player) 131 performs an analysis of an MPD and performs a process of acquiring segments storing contents to be reproduced therein on the basis of the result of the analysis, for example.

The application control unit 132 controls the execution of an application provided from the transmitting apparatus 20.

The application control unit 132 also performs a process of analyzing an MPD associated with the application.

The output control unit 133 acquires program makeup data and application execution data provided by the reproduction control unit 131 and the application control unit 132, and performs a process of decoding the acquired data, a process of outputting the decoded data to a display unit, etc.

As depicted in FIG. 32, in the present embodiment, the reproduction control unit 131 that carries out an MPD analysis has an application verifying unit 601.

The application verifying unit 601 acquires authentication information recorded in an MPD associated with an application to be executed, and performs a verifying process of determining whether the application is an authorized application that has not been falsified.

The application control unit 132 executes only an application that has been determined as an authorized application that has not been falsified as the result of the verifying process carried out by the application verifying unit 601.

The application control unit 132 cancels the execution of an application that has not been determined as an authorized application that has not been falsified as the result of the verifying process carried out by the application verifying unit 601.

Next, a processing sequence which includes the generation of an MPD in which authentication information is recorded in the transmitting apparatus and the transmission of an application and the MPD by the transmitting apparatus, and the verification of the application using authentication information in the MPD in the receiving apparatus and the execution of the application in the receiving apparatus will be described below with reference sequence diagrams depicted in FIGS. 33 through 35.

Figure 33:
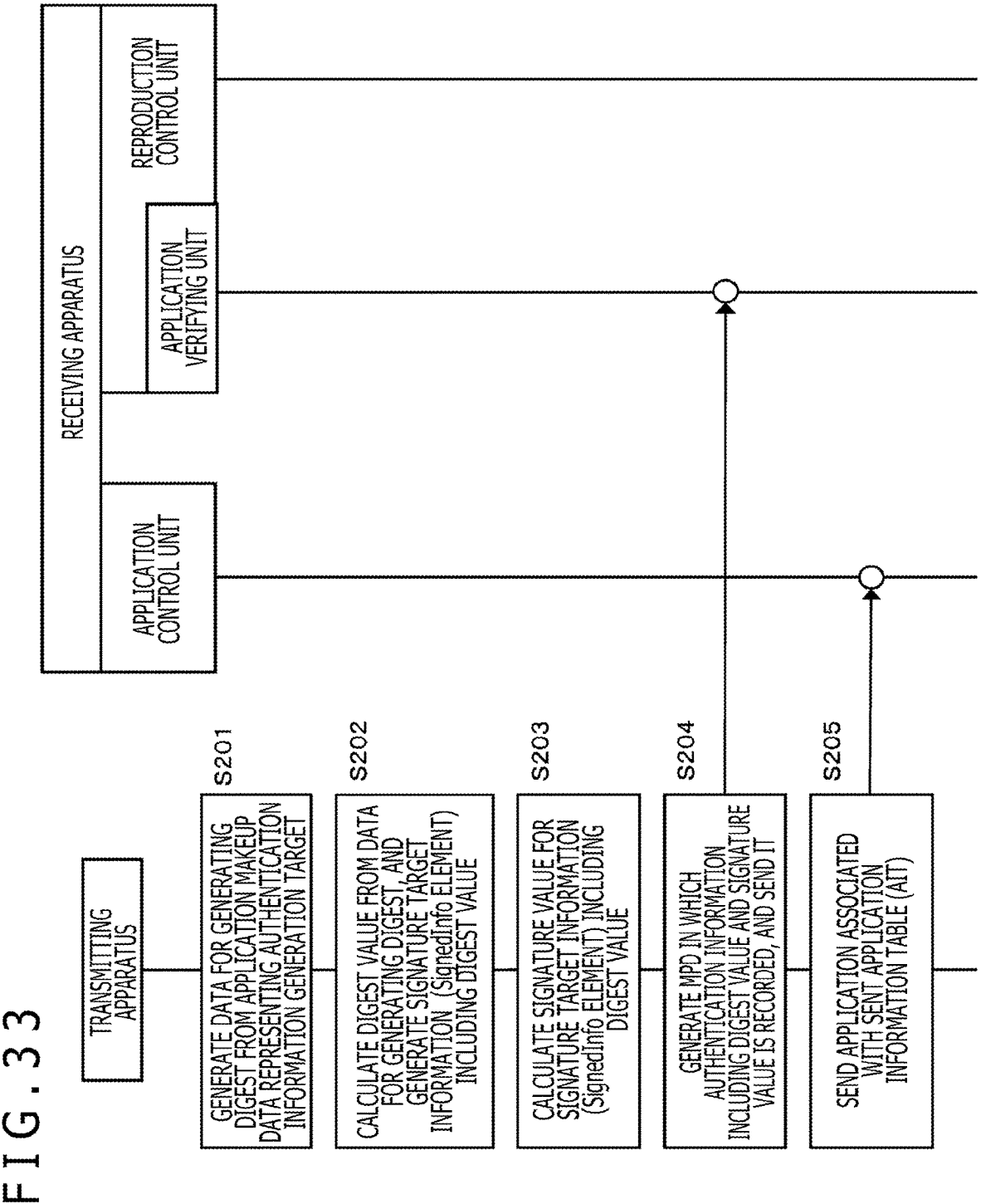
FIG. 33 is a diagram illustrative of a processing sequence using the authentication information in the MPD.
Figure 34:
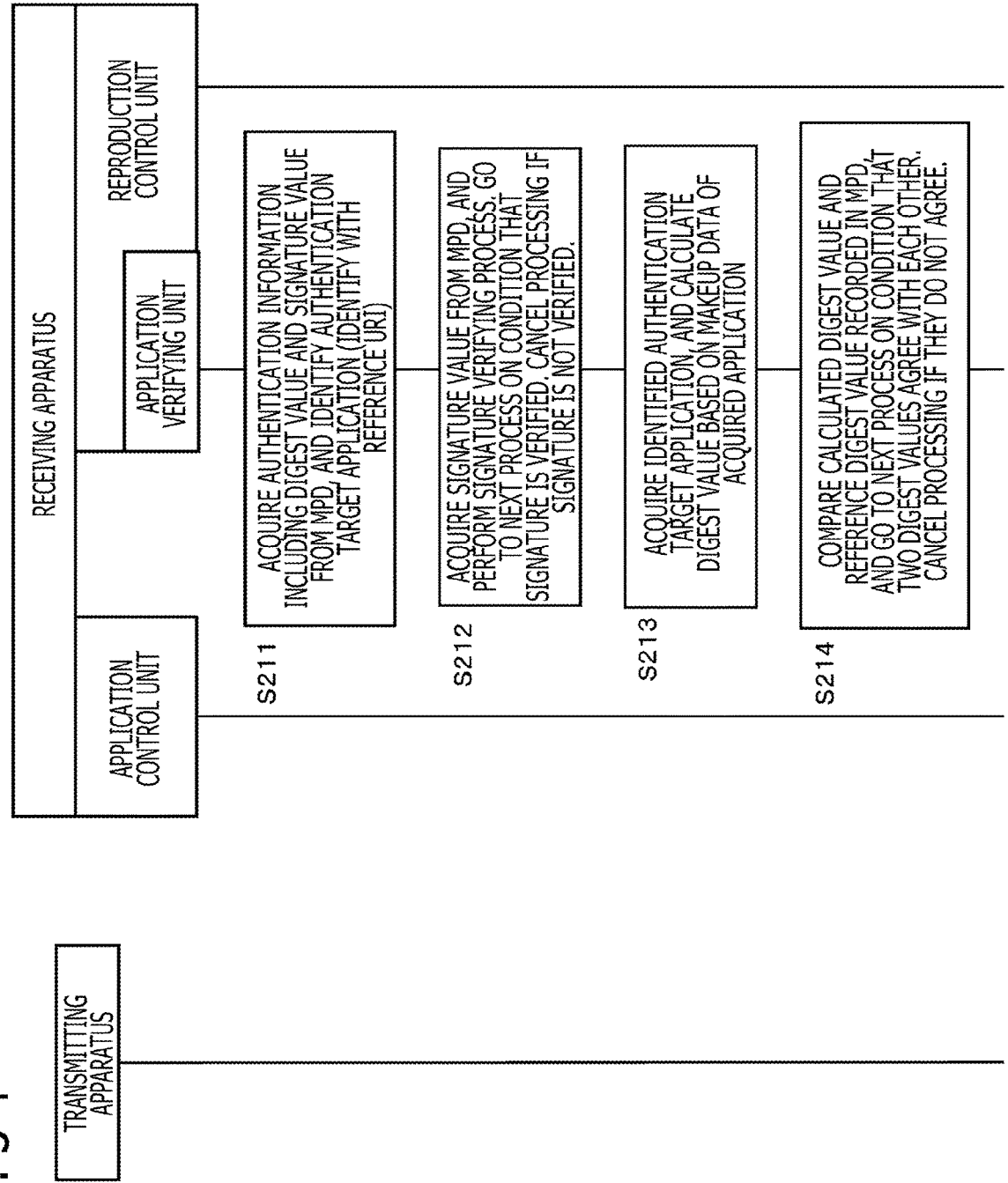
FIG. 34 is a diagram illustrative of a processing sequence using the authentication information in the MPD.
Figure 35:
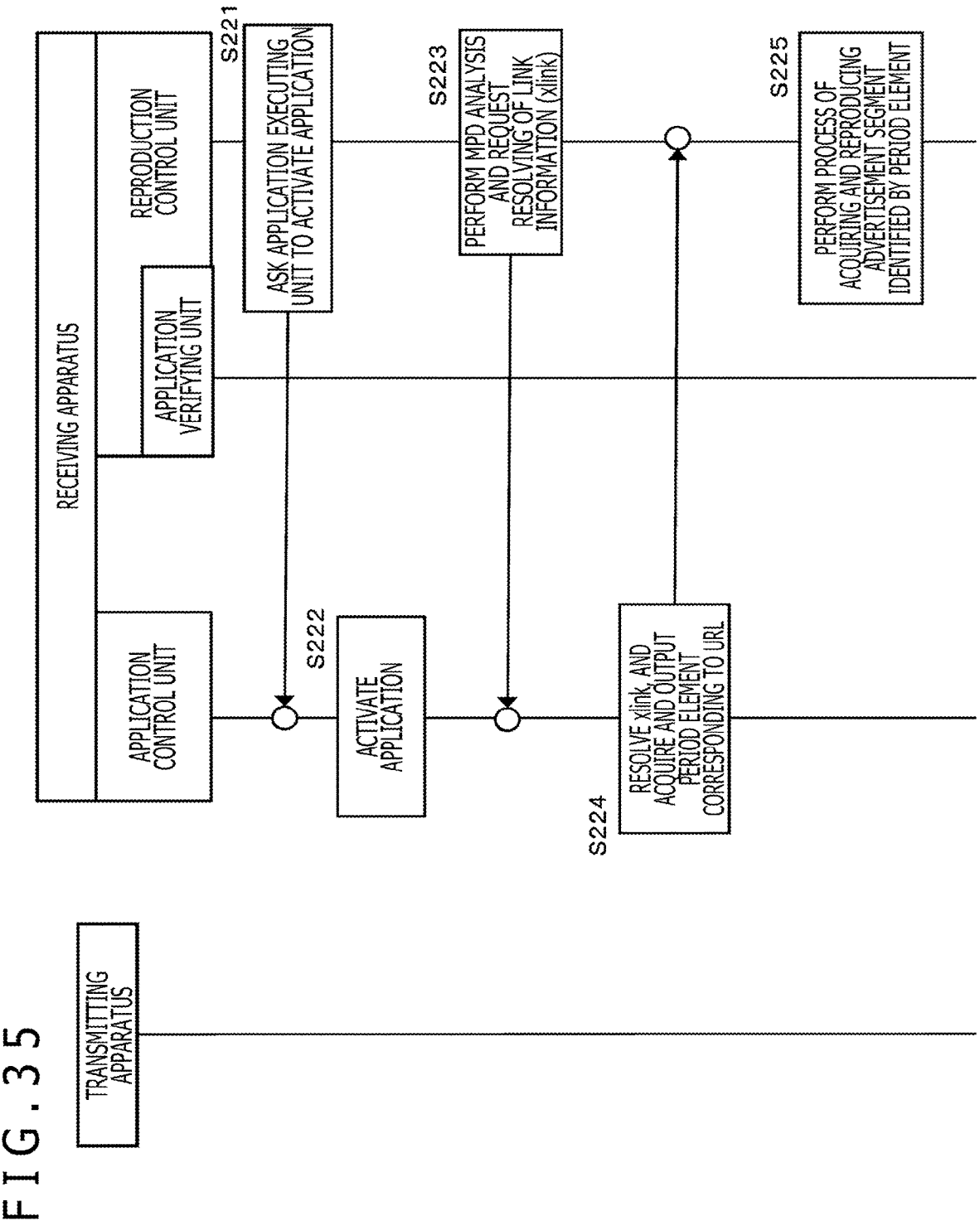
FIG. 35 is a diagram illustrative of a processing sequence using the authentication information in the MPD.

FIGS. 33 through 35 depict various apparatus and components given below, from the left:

(a) the transmitting apparatus 20;

(b) the application control unit 132 as a component of the receiving apparatus 30;

(c) the application verifying unit 601 of the reproduction control unit 131 as a component of the receiving apparatus 30; and (d) the reproduction control unit 131 as a component of the receiving apparatus 30.

The processing operations of respective steps depicted in FIGS. 33 through 35 will be described below.

(Step S201)

The processing operations of steps S201 through S205 are processing operations carried out by the transmitting apparatus 20.

Specifically, they represent a sequence which includes the generation of an MPD in which authentication information is recorded in the transmitting apparatus 20 and the transmission of an application and the MPD by the transmitting apparatus.

First, in step S201, the data processor of the transmitting apparatus acquires authentication information generation target data, e.g., an application file such as a link resolving application (script application) or the like, performs a process of normalizing the authentication information generation target data (application file), e.g., a normalizing process including a process of deleting line feed data, etc. and extracting substantial data and a process of adjusting a data length, thereby generating digest generating data.

(Step S202)

Next, in step S202, the data processor of the transmitting apparatus generates a digest value based on the digest generating data generated in step S201.

For example, the data processor generates a digest value according to a process to which a predetermined hash value generating algorithm or the like is applied, for example.

Moreover, the data processor generates signature target information (SignedInfo element) including the calculated digest value.

Specifically, this is a process of generating makeup data of <SignedInfo>~</SignedInfo> in the authentication information depicted in FIGS. 29 and 31, for example.

(Step S203)

Next, in step S203, the data processor of the transmitting apparatus carries out a signature for the signature target information (SignedInfo element) including the calculated digest value.

The signature is carried out by applying a private key of the transmitting apparatus of a broadcasting station or the like that performs the generation of the MPD, for example.

(Step S204)

Next, in step S204, the data processor of the transmitting apparatus records authentication information including the generated digest value and signature value in the MPD, and sends the generated MPD using SLS (Service Layer Signaling) as signaling data.

As described above, the SLS (Service Layer Signaling) represents signaling data for the ATSC3.0 service layer, and is used to send MPD, USBD/USD, S-TSID, MPD, etc.

Note that, in the present embodiment, this MPD is an MPD in which attribute information and control information of a link resolving application (script application (ScriptApp)) for carrying out a link resolving process, for example, are recorded.

(Step S205)

Next, in step S205, the data processor of the transmitting apparatus sends an application associated with the sent MPD, e.g., a link resolving application (script application (ScriptApp)) for carrying out a link resolving process.

The description of the processing operation of the transmitting apparatus 20 is now finished, and then the processing operation of the receiving apparatus 30 will be described below with reference to FIGS. 34 and 35.

(Step S211)

The processing operations of steps S211 through S214 depicted in FIG. 34 are processing operations carried out by the application verifying unit 601 set in the reproduction control unit 131 of the reproduction processor 130 of the receiving apparatus 30.

First, the application verifying unit 601 of the receiving apparatus 30 acquires the authentication information including the digest value and the signature value from the MPD received from the transmitting apparatus 20 in step S211. Furthermore, the application verifying unit 601 identifies an authentication target application.

Note that the process of identifying an authentication target application is performed on the basis of the authentication target application identification information (reference URI) recorded in the authentication information of the MPD, e.g., the authentication target application identification information (reference URI) recorded in the authentication information of the MPD described with reference to FIGS. 29 and 31.

(Step S212)

Next, in step S212, the application verifying unit 601 of the receiving apparatus 30 acquires the signature value from the MPD, and performs a signature verifying process.

If the signature is generated using a public key cryptosystem, for example, then the signature verifying process is carried out using a public key corresponding to the private key of the transmitting apparatus 20 which has generated the signature value.

If the signature is generated using a common key cryptosystem, then the signature verifying process is carried out by applying a common key.

If the signature is verified in step S212, and the authentication information is confirmed as authorized authentication information that has not been falsified, then control goes to a next processing operation.

If the signature is not verified, then subsequent processing operations are canceled.

In this case, the execution of the application associated with the MPD is also canceled.

(Step S213)

Next, in step S213, the application verifying unit 601 of the receiving apparatus 30 acquires the authentication target application identified in step S211.

Specifically, the application verifying unit 601 acquires the authentication target application identified according to the authentication target application identification information (reference URI) recorded in the authentication information of the MPD, and calculates a digest value based on the makeup data of the acquired application.

(Step S214)

Next, in step S214, the application verifying unit 601 of the receiving apparatus 30 compares the calculated digest value calculated from the authentication target application in step S213 and the checking digest value recorded in the MPD.

If the two digest values agree with each other, then the application verifying unit 601 decides that the authentication target application is an authorized application that has not been falsified. Control then goes to a next processing operation on the condition that such a decision is made.

If the two digest values do not agree with each other, then the application verifying unit 601 decides that the authentication target application is an unauthorized application that has been falsified. If such a decision is made, then subsequent processing operations are canceled.

In this case, the execution of the application associated with the MPD is also canceled.

(Step S221)

The processing operations of steps S221 through S225 depicted in FIG. 35 are carried out only if the application authentication based on the authentication information recorded in the MPD is established, i.e., only if the application associated with the MPD is decided as an authorized application that has not been falsified, in the processing sequence of the application verifying unit 601 described with reference to FIG. 34.

If the application authentication is established in steps S211 through S214 is established and the application associated with the MPD is decided as an authorized application that has not been falsified, then the application verifying unit 601 of the receiving apparatus 30 requests the application control unit 132 to activate the application in step S221.

The activation request target application is the application on which the authentication process based on the authentication information recorded in the MPD has been performed and which has been authenticated.

In the present example, the authentication target application is a link resolving application (ScriptApp) for carrying out a link (xlink) resolving process, and the application verifying unit 601 requests the application control unit 132 to activate the link resolving application (ScriptApp).

(Step S222)

Next, in step S222, the application control unit 132 of the receiving apparatus 30 activates the application which it has been requested to activate by the application verifying unit 601.

The application control unit 132 performs a process of activating the link resolving application (ScriptApp) which has been verified as an authorized application.

(Step S223)

Step S223 represents a processing operation of the reproduction control unit 131 of the receiving apparatus.

The reproduction control unit 131 of the receiving apparatus 30 acquires the MPD sent by the transmitting apparatus 20 and performs an analysis of the acquired MPD.

The MPD is the same as the MPD that has verified the application on the basis of the authentication information in steps S211 through S214, i.e., the same as the MPD in which the authentication information is recorded.

In step S223, the reproduction control unit 131 of the receiving apparatus 30 acquires the link information (xlink) recorded in the advertisement-compatible period information of the MPD, i.e., the link information (xlink) having the user information setting field, and sets the user information (parameter) in the user information setting field.

The user information that is set may be user information registered (recorded) in advance in the storage unit of the receiving apparatus 30, or may be user-input information input by the user from time to time.

The reproduction control unit 131 of the receiving apparatus 30 outputs the data in which the user information (parameter) is set in the user information setting field, to the application control unit 132 that executes the link resolving application (script), and requests the application control unit 132 to analyze the link information (xlink) (to resolve the link).

The requesting process is carried out as an HTTP-GET request, for example.

(Step S224)

The processing operation of step S224 is a processing operation of the application control unit 132 of the receiving apparatus 30.

The application control unit 132 executes the link resolving application (ScriptApp) which has been verified as an authorized application, thereby performing a link resolving process.

Specifically, the application control unit 132 analyzes the user information (parameter) setting URL input from the reproduction control unit 131, acquires period information (period element) corresponding to the user information, and outputs the extracted period information to the reproduction control unit 131.

The output process is carried out as an HTTP-response, for example.

This period information (period element) is period information (period element) depending on the user information (parameter) set by the reproduction control unit 131 in step S223, and period information (period element) in which access information for optimum advertisement contents (advertisement segment URL) to be provided to a particular user selected by the set user information (age, Location, etc.), etc. is recorded.

(Step S225)

Finally, the reproduction control unit 131 of the receiving apparatus 30 reads and analyzes the recorded information of the period information (period element) acquired from the application control unit 132 in step S225.

The reproduction control unit 131 acquires an advertisement segment file storing advertisement contents therein, using the access information for optimum advertisement contents (advertisement segment URL) included in the recorded information of the period information (period element), and outputs the acquired advertisement segment file via the output unit, such as a display unit, a speaker, etc., of the receiving apparatus 30.

Note that control information such as a decoding mode, an output time period, etc. of the advertisement contents has been recorded in the period information (period element), and the reproduction control unit carries out a process of outputting the advertisement contents by performing a process according to the information recorded in the period information (period element).

The advertisement contents output to the receiving apparatus 30 represent an advertisement selected depending on the user information set by the reproduction control unit 131 in step S223, and a user-targeted advertisement mainly targeted on a user selected according to user's (viewer's) characteristics such as user's age, domicile, etc., for example.

In this fashion, it is possible to select a proper advertisement depending on the user information representing each user's attributes, e.g., user's gender, age, domicile, etc., for example, and provide the selected advertisement to the user, by executing the link resolving application which has been confirmed as authorized by the authentication process carried out by the application verifying unit 601.

11. About a Configurational Example of the Transmitting Apparatus and the Receiving Apparatus Next, a configurational example of the transmitting apparatus (server) 20 and the receiving apparatus (client) 30, which serve as communication apparatus, will be described below with reference to FIGS. 36 and 37.

Figure 36:
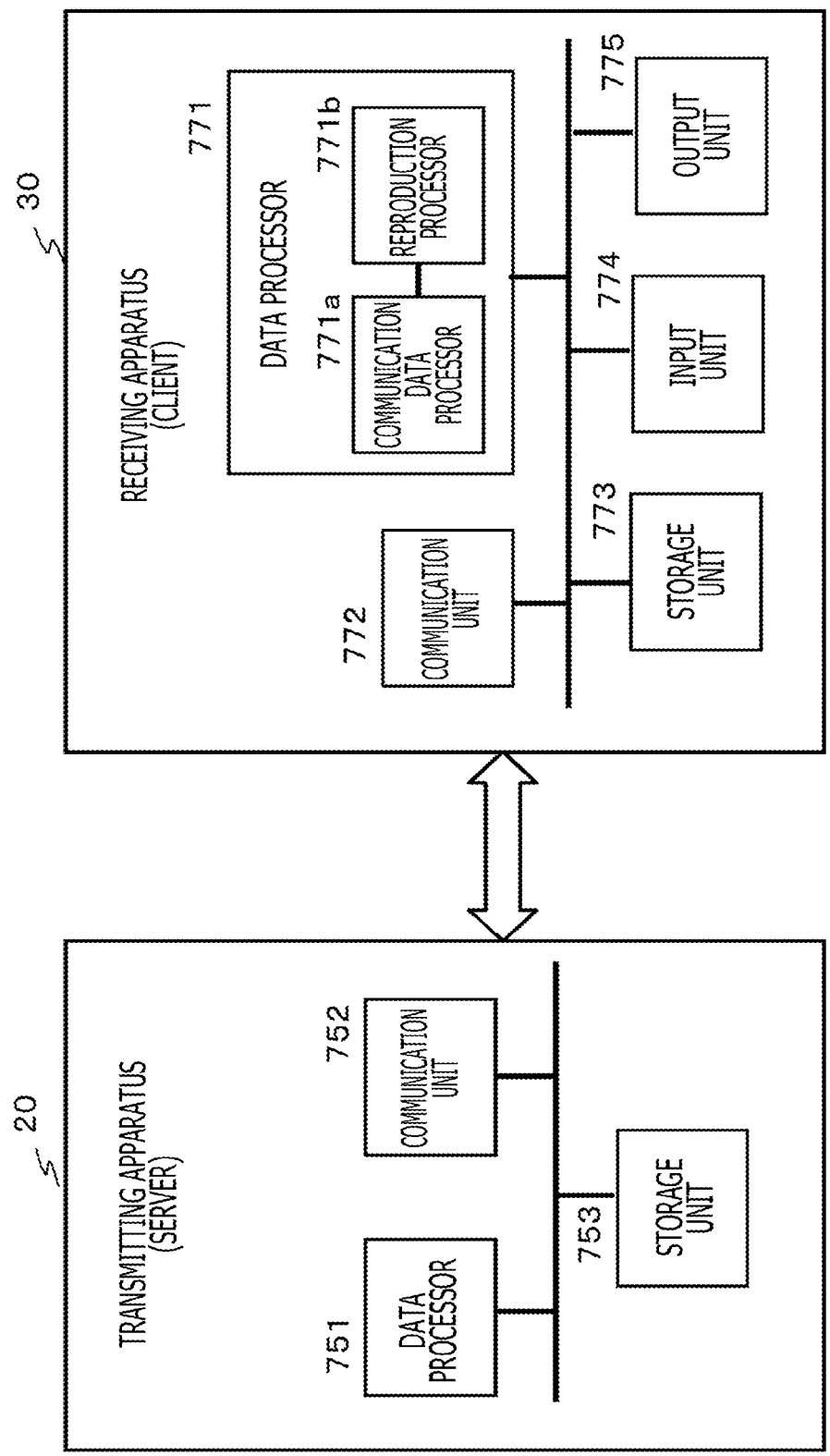
FIG. 36 is a diagram illustrative of a configurational example of the transmitting apparatus and the receiving apparatus which are communication apparatus.

FIG. 36 depicts a configurational example of the transmitting apparatus (server) 20 and the receiving apparatus (client) 30.

The transmitting apparatus (server) 20 has a data processor 751, a communication unit 752, and a storage unit 753.

The receiving apparatus (client) 30 has a data processor 771, a communication unit 772, a storage unit 773, an input unit 774, and an output unit 775.

The data processor includes a communication data processor 771*a* and a reproduction processor 771*b*.

The data processor 751 of the transmitting apparatus (server) 20 performs various data processing processes for carrying out data distribution services. For example, the data processor 751 performs a process of controlling the generation and transmission of configuration data of the data distribution services. Furthermore, the data processor 751 performs a process of generating and sending contents, applications, various other data, and signaling data to be provided to the receiving apparatus (client) 30.

The communication unit 752 performs a communication process for distributing AV segments, applications, various other data, signaling data, and the like.

The storage unit 753 stores therein AV segments to be distributed, applications, data used by applications, signaling data, and the like.

In addition, the storage unit 753 is used as a work area for data processing processes carried out by the data processor 751, and also as a storage area for various parameters.

The receiving apparatus (client) 30 has the data processor 771, the communication unit 772, the storage unit 773, the input unit 774, and the output unit 775.

The communication unit 772 receives data distributed from the transmitting apparatus (server) 20, e.g., AV segments, applications, data utilized by the applications, signaling data, and the like.

The data processor 771 has the communication data processor 771*a* and the reproduction processor 771*b*, and performs the processes, etc. according to the embodiments described above.

Specifically, the data processor 771 carries out the verification of applications, data processing using applications, etc.

Instruction commands from the user, e.g., various commands for selecting channels, activating applications, and installing applications, etc. are input through the input unit 774.

Reproduced data are output to the output unit 775 which includes a display unit, a speaker, or the like.

The storage unit 773 stores therein AV segments, applications, data used by applications, signaling data, and the like.

In addition, the storage unit 773 is used as a work area for data processing processes carried out by the data processor 771, and also as a storage area for various parameters.

Figure 37:
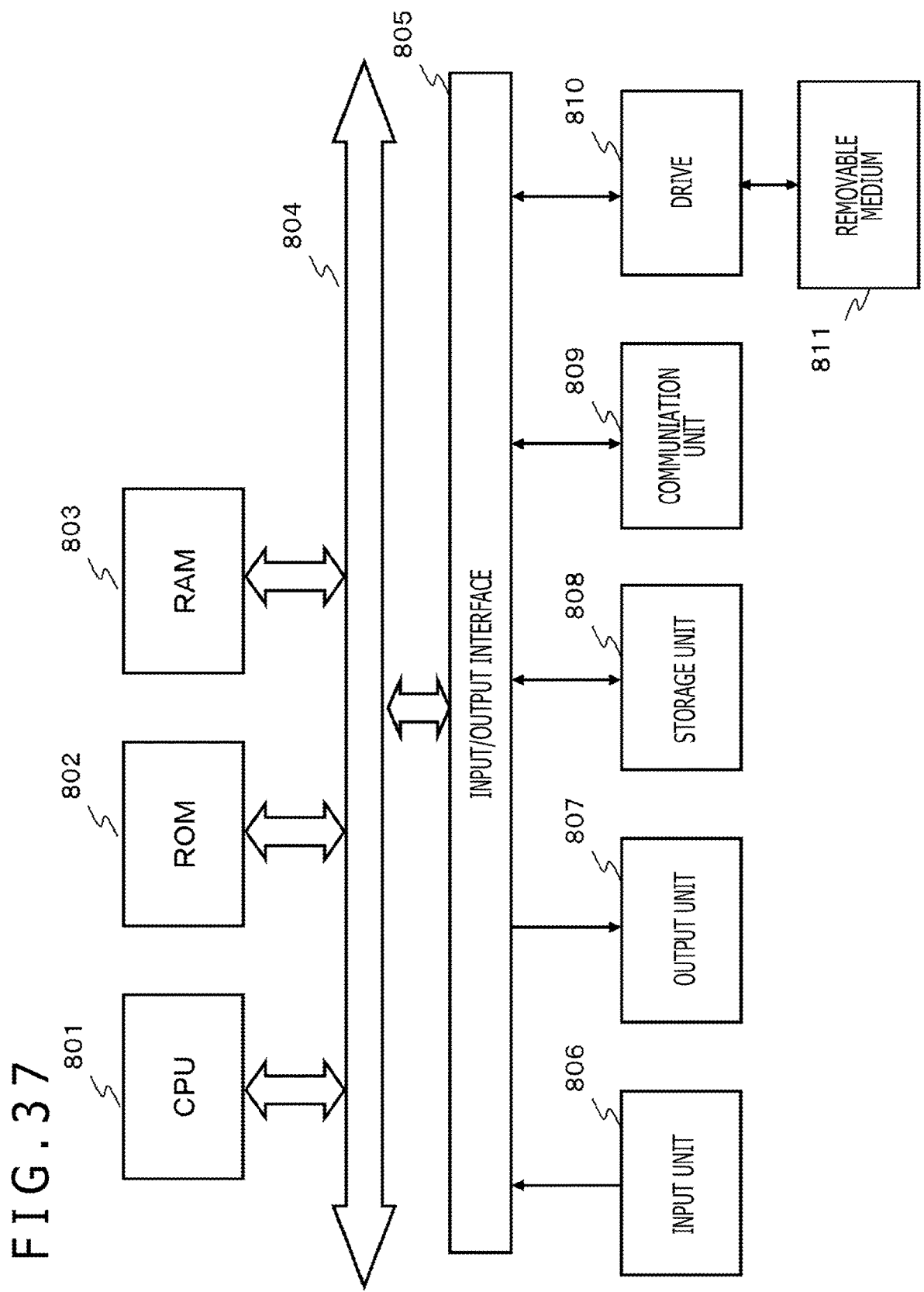
FIG. 37 is a diagram illustrative of a hardware configurational example of the transmitting apparatus and the receiving apparatus which are the communication apparatus.

FIG. 37 depicts a hardware configurational example of a communication apparatus applicable as the transmitting apparatus 20 and the receiving apparatus 30.

A CPU (Central Processing Unit) 801 functions as a data processor for performing various processes according to programs stored in a ROM (Read Only Memory) 802 or a storage unit 808. For example, the CPU 801 performs processes according to the sequences described in the above embodiments. A RAM (Random Access Memory) 803 stores programs performed by the CPU 801 and data therein. The CPU 801, the ROM 802, and the RAM 803 are interconnected by a bus 804.

The CPU 801 is connected to an input/output interface 805 by the bus 804. To the input/output interface 805, there are connected an input unit 806 which includes various switches, a keyboard, a mouse, a microphone, etc., and an output unit 807 which includes a display, a speaker, etc. The CPU 801 performs various processes in response to commands input from the input unit 806, and outputs results of the processes to the output unit 807, for example.

The storage unit 808 that is connected to the input/output interface 805 includes a hard disk or the like, for example, and stores programs executed by the CPU 801 and various data therein. A communication unit 809 functions as a transmitter/receiver for data communication via a network such as the Internet, a local area network, or the like, and also as a transmitter/receiver for broadcasting waves, and communicates with external apparatus.

A drive 810 that is connected to the input/output interface 805 drives a removable medium 811 such as a magnetic disk, an optical disk, a magnetooptical disk, or a semiconductor memory such as a memory card or the like, for recording and reading data.

Incidentally, a process of encoding or decoding data can be performed as a process of the CPU 801 serving as a data processor. However, the communication apparatus may be provided as a codec as dedicated hardware for carrying out an encoding process or a decoding process.

12. A Summary of the Arrangement of the Present Disclosure

Embodiments of the present disclosure have been described in detail above with reference to the particular embodiments. However, it is obvious that the embodiments can be modified or replaced by those skilled in the art without departing from the scope of the present disclosure. In other words, the present invention has been disclosed by way of illustrative example, and should not be restrictively interpreted. The scope of claims for patent should be taken into consideration in order to determine the scope of the present disclosure.

Note that the technology disclosed in the present description may be presented in the following configurations:

(1) A receiving apparatus including:
a communication unit that receives an application and signaling data in which authentication information for the application is recorded; and
    a data processor that executes the application;
    in which the data processor has
    an application verifying unit that performs an authentication process based on the authentication information and confirms the application as authorized, and
    an application executing unit that executes the application that has been confirmed as authorized by the authentication process.

(2) The receiving apparatus according to (1), in which the application is an application used in a process of selecting advertisement contents depending on user information.

(3) The receiving apparatus according to (1) or (2), in which the application is an application for performing a link resolving process for selecting control information for contents corresponding to user information on the basis of user information set data in which the user information is set in a user information setting area in data to be provided to the receiving apparatus.

(4) The receiving apparatus according to (3), in which the control information for the contents corresponding to the user information is a period element in an MPD (Media Presentation Description) as signaling data.

(5) The receiving apparatus according to any one of (1) through (4), in which the authentication information is recorded in an application information table (AIT: Application Information Table) in which control information corresponding to the application is recorded; and
the application verifying unit performs the authentication process as a process of extracting the authentication information from the application information table (AIT) and confirming the application as authorized.

(6) The receiving apparatus according to any one of (1) through (4), in which the authentication information is recorded in an MPD (Media Presentation Description) associated with the application; and
the application verifying unit performs the authentication process as a process of extracting the authentication information from the MPD and confirming the application as authorized.

(7) The receiving apparatus according to any one of (1) through (6), in which the authentication information includes a digest value based on makeup data of the application to be authenticated; and
the application verifying unit performs a process of checking a calculated digest value calculated on the basis of the makeup data of the application to be authenticated and a digest value recorded in the authentication information.

(8) The receiving apparatus according to (7), in which the authentication information includes signature data set for data including the digest value; and
the application verifying unit performs a signature verifying process to which the signature data are applied.

(9) The receiving apparatus according to any one of (1) through (8), in which the authentication information includes an application identifier for the application to be authenticated; and
the application verifying unit identifies the application to be authenticated on the basis of the application identifier.

(10) The receiving apparatus according to any one of (1) through (9), in which the application verifying unit performs an authentication process based on the authentication information, and requests the application executing unit to activate the application on the condition that the application has been confirmed as authorized.

(11) The receiving apparatus according to any one of (1) through (10), in which the application is a script application (ScriptApp) to be executed on a browser.

(12) A transmitting apparatus including:
a communication unit that sends an application and signaling data in which authentication information capable of confirming the application as authorized is recorded.

(13) The transmitting apparatus according to (12), further including:
a data processor that generates the signaling data in which the authentication information is recorded.

(14) The transmitting apparatus according to (12) or (13), in which the application is an application used in a process of selecting advertisement contents depending on user information.

(15) The transmitting apparatus according to (13), in which the data processor records the authentication information in an application information table (AIT: Application Information Table) in which control information corresponding to the application is recorded.

(16) The transmitting apparatus according to (13), in which the data processor records the authentication information in an MPD (Media Presentation Description) associated with the application.

(17) The transmitting apparatus according to any one of (12) through (16), in which the authentication information includes
a digest value based on makeup data of the application to be authenticated,
signature data set for data including the digest value, and
an application identifier for the application to be authenticated.

(18) The transmitting apparatus according to any one of (12) through (17), in which the application is a script application (ScriptApp) to be executed on a browser.

(19) A data processing method to be carried out in a receiving apparatus, in which
a communication unit receives an application and signaling data in which authentication information for the application is recorded; and
a data processor
    performs an application verifying process for carrying out an authentication process based on the authentication information to confirm the application as authorized, and
    executes the application that has been confirmed as authorized by the authentication process.

(20) A data processing method to be carried out in a transmitting apparatus, including sending an application and signaling data in which authentication information capable of confirming the application as authorized is recorded.

Furthermore, the sequence of processes described in the description may be hardware-implemented or software-implemented or implemented by a hybrid of hardware and software. If the sequence of processes is software-implemented, then programs in which the processing sequence is recorded may be installed in a memory in a computer incorporated in dedicated hardware and executed thereby, or may be installed in a general-purpose computer capable of performing various processes and executed thereby. For example, the programs may be recorded in a recording medium in advance. The programs may be installed from the recording medium into the computer, or may be received via a network such as a LAN (Local Area Network) or the Internet and installed into a recording medium such as a built-in hard disk or the like.

Note that the various processes described in the description may be carried out in chronological order in the sequence described above, or may be carried out parallel to each other or individually either depending on the processing capability of the apparatus that perform the processes or as required. In the present description, the term "system" means a logical collection of a plurality of apparatus, and is not limited to the arrangement in which the apparatus are present in the same housing.

INDUSTRIAL APPLICABILITY

According to the arrangement of the embodiments of the present disclosure, as described above, there is realized an arrangement for executing an application on the condition that the application has been confirmed as authorized.

Specifically, a transmitting apparatus sends an application and signaling data in which authentication information capable of confirming the application as authorized is recorded. A receiving apparatus receives these data, performs an authentication process based on the authentication information to confirm the application as authorized, and executes the application that has been confirmed as authorized. The application is an application used in a process of selecting advertisement contents depending on user information. It is possible to provide the user reliably with a proper advertisement according to the user information.

With this arrangement, the receiving apparatus realizes a configuration for executing an application on the condition that the application has been confirmed as authorized.

For example, there is realized a configuration for selecting and outputting contents such as of an advertisement depending on the user of the receiving apparatus without fail, by confirming an application that carries out an advertisement selecting process, as authorized.

REFERENCE SIGNS LIST

10 Communication system
20 Transmitting apparatus
21 Broadcasting server
22 Advertisement server
23 Data distribution server
30 Receiving apparatus
31 TV set
32 PC
33 Mobile terminal
50 Signaling data
60 AV segment
70 Other data
110 Middleware
111 Communication unit (PHY/MAC)
112 Signaling acquiring unit
113 Signaling analyzing unit
114 Segment acquiring unit
120 HTTP proxy server
121 Cache control unit
122 Cache unit
130 Reproduction processor
131 Reproduction control unit
132 Application control unit
133 Output control unit
151 Application verifying unit
152 Application executing unit
201 MPD acquiring unit
202 MPD analyzing unit
203 Segment acquiring unit
204 Segment analyzing unit
211 Decoding unit
212 Output unit
311 to 314 Period information
400 Application file
401 Application information table (AIT)
402 Application authentication information
500 Application file
501 MPD
502 Application authentication information
601 Application verifying unit
751 Data processor
752 Communication unit
753 Storage unit
771 Data processor
772 Communication unit
773 Storage unit
774 Input unit
775 Output unit
801 CPU
802 ROM
803 RAM
804 Bus
805 Input/output interface
806 Input unit
807 Output unit
808 Storage unit
809 Communication unit
810 Drive
811 Removable medium

The invention claimed is:

1. A receiving apparatus, comprising:
processing circuitry configured to
receive a manifest file including authentication information of a target application,
identify the target application based on a reference uniform resource identifier (URI) included in the authentication information,
determine whether the identified target application is authorized based on the authentication information, and
execute the target application in response to the determination that the target application is authorized.

2. The receiving apparatus according to claim 1, wherein the target application is an application used in a process of selecting advertisement contents depending on user information.

3. The receiving apparatus according to claim 1, wherein the target application is an application for performing a link resolving process for selecting control information for contents corresponding to user information, the user information being set in a user information setting area in link information to be provided to the receiving apparatus.

4. The receiving apparatus according to claim 3, wherein the control information for the contents corresponding to the user information is a period element in a media presentation description (MPD), the MPD being the manifest file.

5. The receiving apparatus according to claim 1, wherein
the manifest file includes a media presentation description (MPD) associated with the target application, and
the processing circuitry is further configured to extract the authentication information from the MPD and determine whether the target application is authorized based on the extracted authentication information.

6. The receiving apparatus according to claim 1, wherein
the authentication information includes a digest value generated based on makeup data of the target application, and
the processing circuitry is further configured to
calculate a new digest value of the target application, and
compare the new digest value to the digest value included in the authentication information.

7. The receiving apparatus according to claim 6, wherein
the authentication information includes a signature data set including the digest value, and
the processing circuitry is further configured to perform a signature verifying process using the signature data set.

8. The receiving apparatus according to claim 1, wherein the processing circuitry is further configured to activate the target application in response to the determination that the application is authorized.

9. The receiving apparatus according to claim 1, wherein the target application is a script application (ScriptApp) to be executed on a browser.

10. A transmitting apparatus, comprising:
processing circuitry configured to
send a manifest file including authentication information of a target application to a receiving apparatus, wherein the authentication information allows the receiving apparatus to
identify the target application based on a reference uniform resource identifier (URI) included in the authentication information,
determine whether the identified target application is authorized based on the authentication information, and
execute the target application in response to the determination that the target application is authorized.

11. The transmitting apparatus according to claim 10, wherein the processing circuitry of the transmitting apparatus is further configured to generate the manifest file including the authentication information.

12. The transmitting apparatus according to claim 10, wherein the target application is an application used in a process of selecting advertisement contents depending on user information.

13. The transmitting apparatus according to claim 11, wherein the manifest file includes a media presentation description (MPD) associated with the target application.

14. The transmitting apparatus according to claim 10, wherein the authentication information includes
a digest value generated based on makeup data of the target application,
a signature data set including the digest value, and
the URI associated with the target application.

15. The transmitting apparatus according to claim 10, wherein the target application is a script application (ScriptApp) to be executed on a browser.

16. A data processing method, comprising:
receiving a manifest file including authentication information of a target application;
identifying the target application based on a reference uniform resource identifier (URI) included in the authentication information;
determining, by processing circuitry of a receiving apparatus, whether the identified target application is authorized based on the authentication information; and
executing the target application in response to the determination that the target application is authorized.

17. A data processing method, comprising:
sending, by processing circuitry of a transmitting apparatus, a manifest file including authentication information of a target application to a receiving apparatus, wherein the authentication information allows the receiving apparatus to
identify the target application based on a reference uniform resource identifier (URI) included in the authentication information,
determine whether the identified target application is authorized based on the authentication information, and
execute the target application in response to the determination that the target application is authorized.

18. The receiving apparatus according to claim 1, wherein the manifest file includes a media presentation description (MPD) associated with the target application.

* * * * *